Oct. 29, 1968     L. B. SCOTT ET AL     3,408,485
APPARATUS FOR COUNTING IRREGULARLY SHAPED OBJECTS
Filed Feb. 24, 1965     10 Sheets-Sheet 1

INVENTORS
Larkin B. Scott
Kendall Preston, Jr.

ATTORNEY.

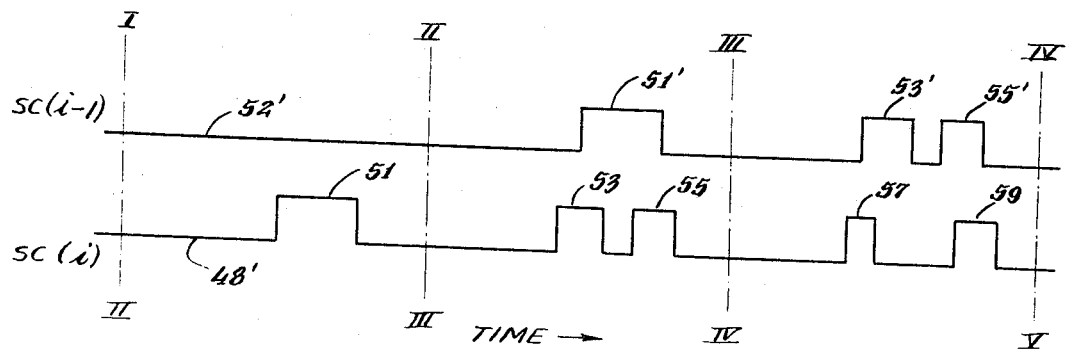
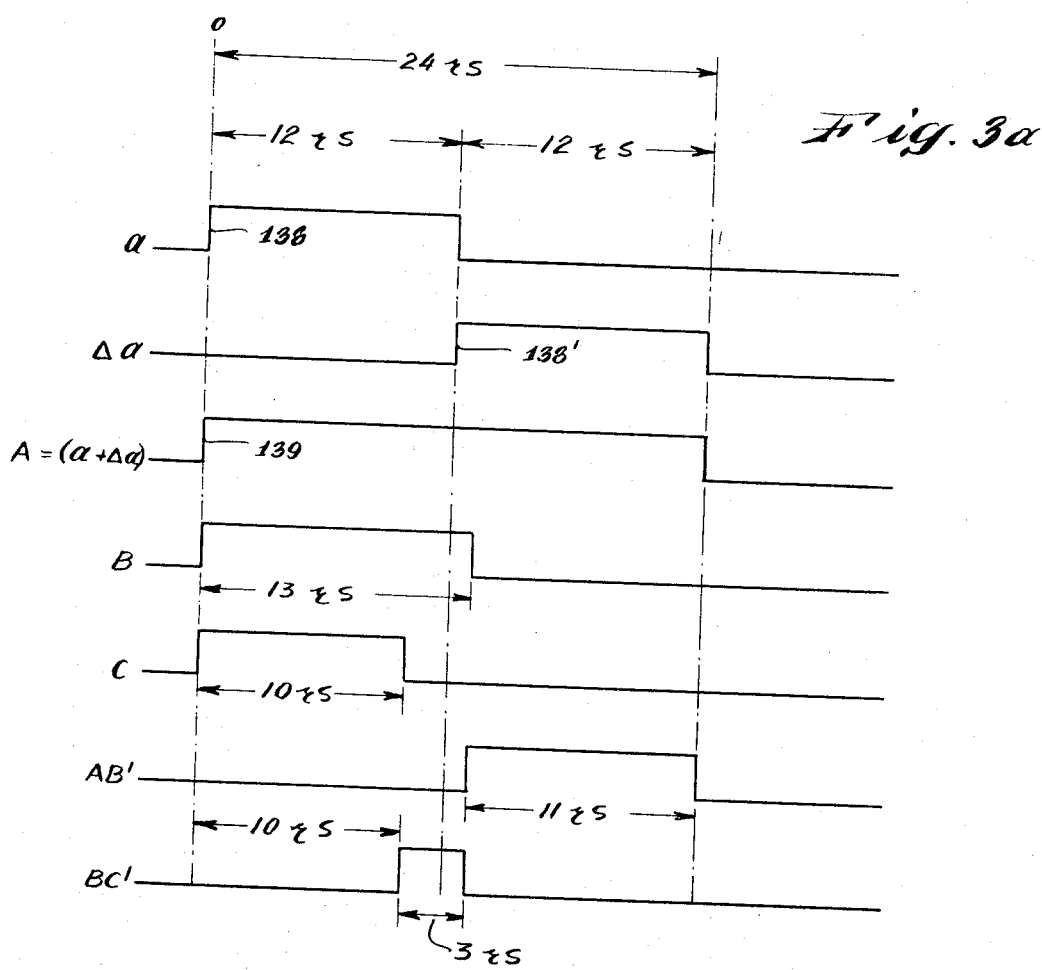

Oct. 29, 1968    L. B. SCOTT ET AL    3,408,485
APPARATUS FOR COUNTING IRREGULARLY SHAPED OBJECTS
Filed Feb. 24, 1965    10 Sheets-Sheet 6

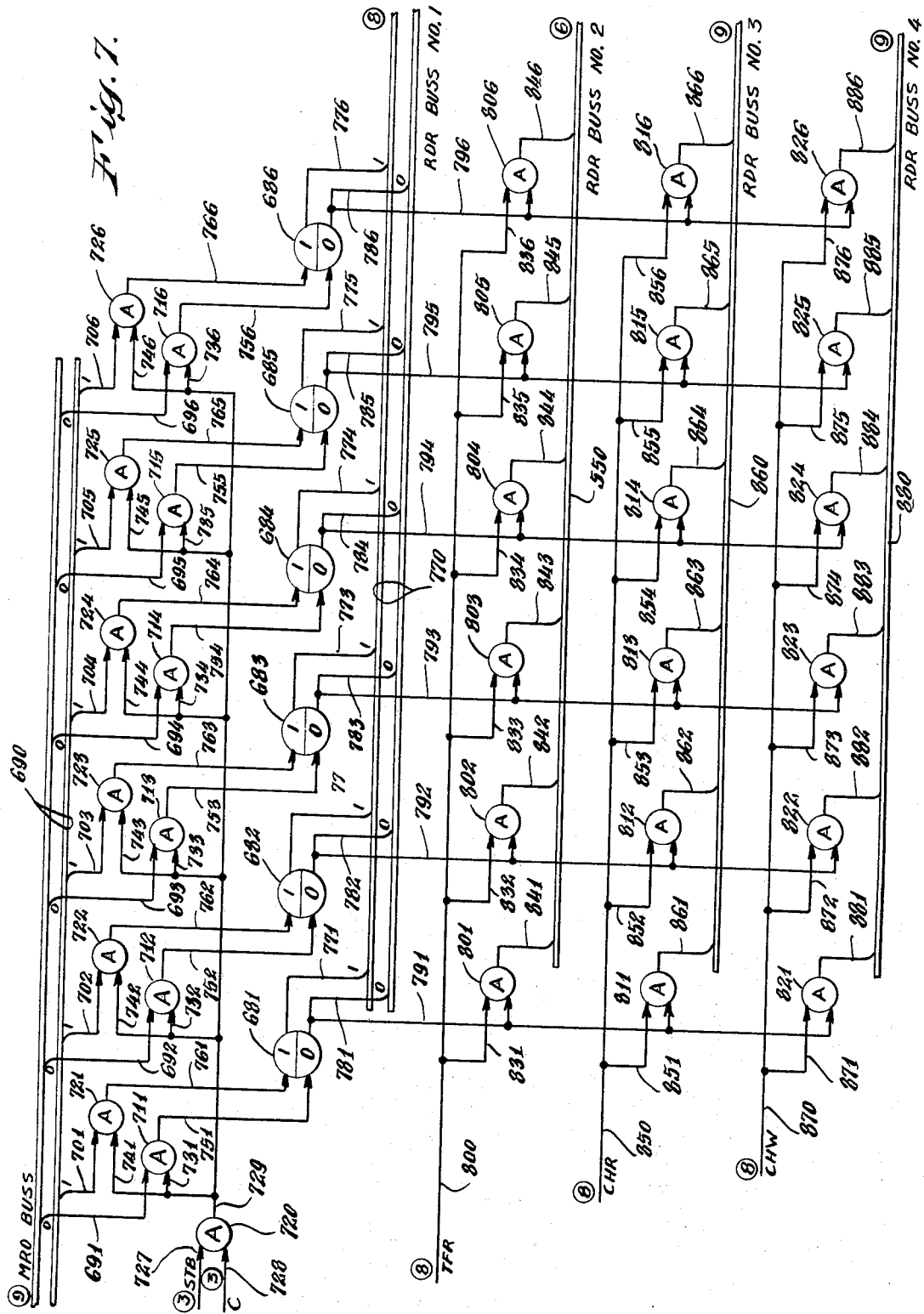

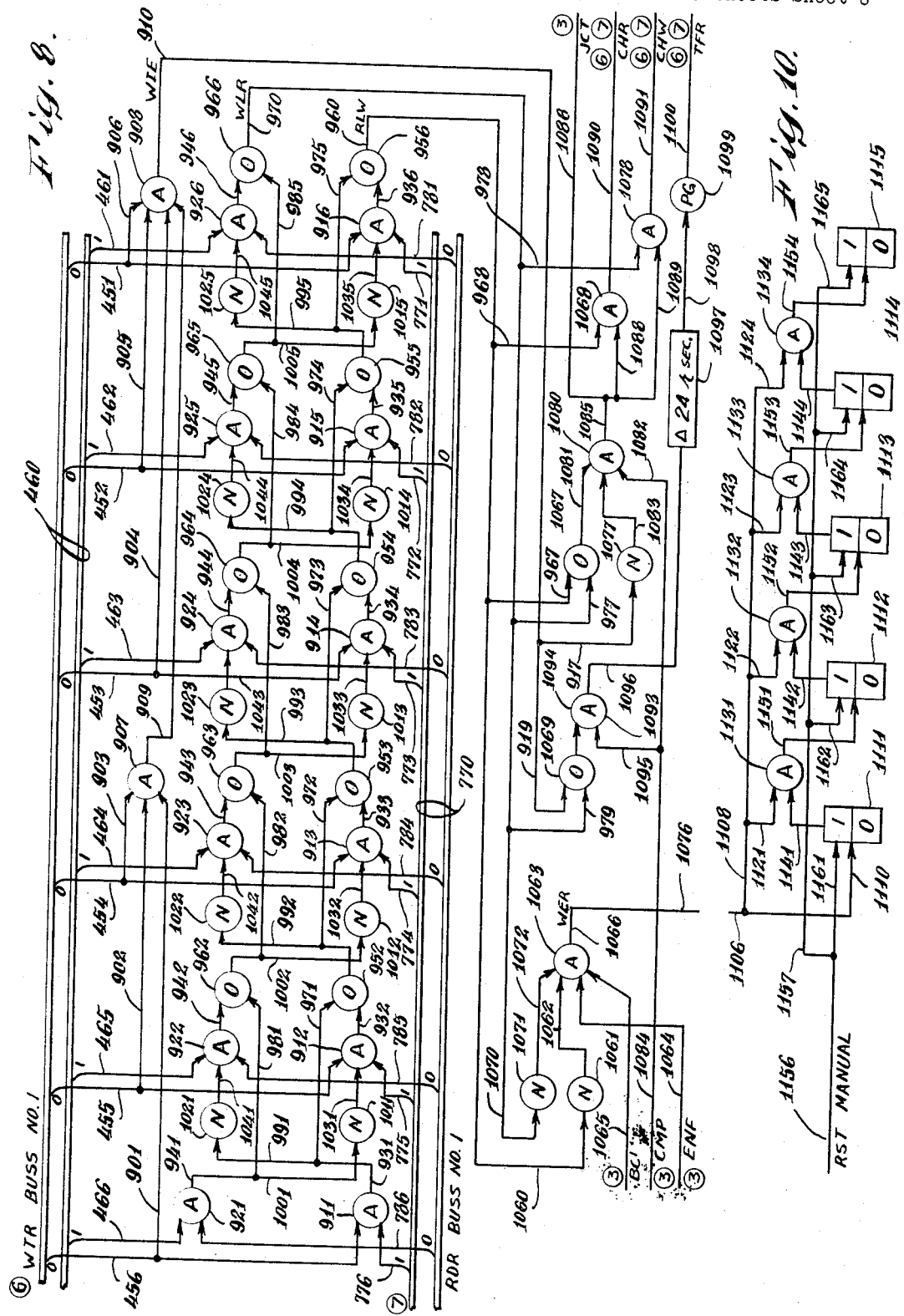

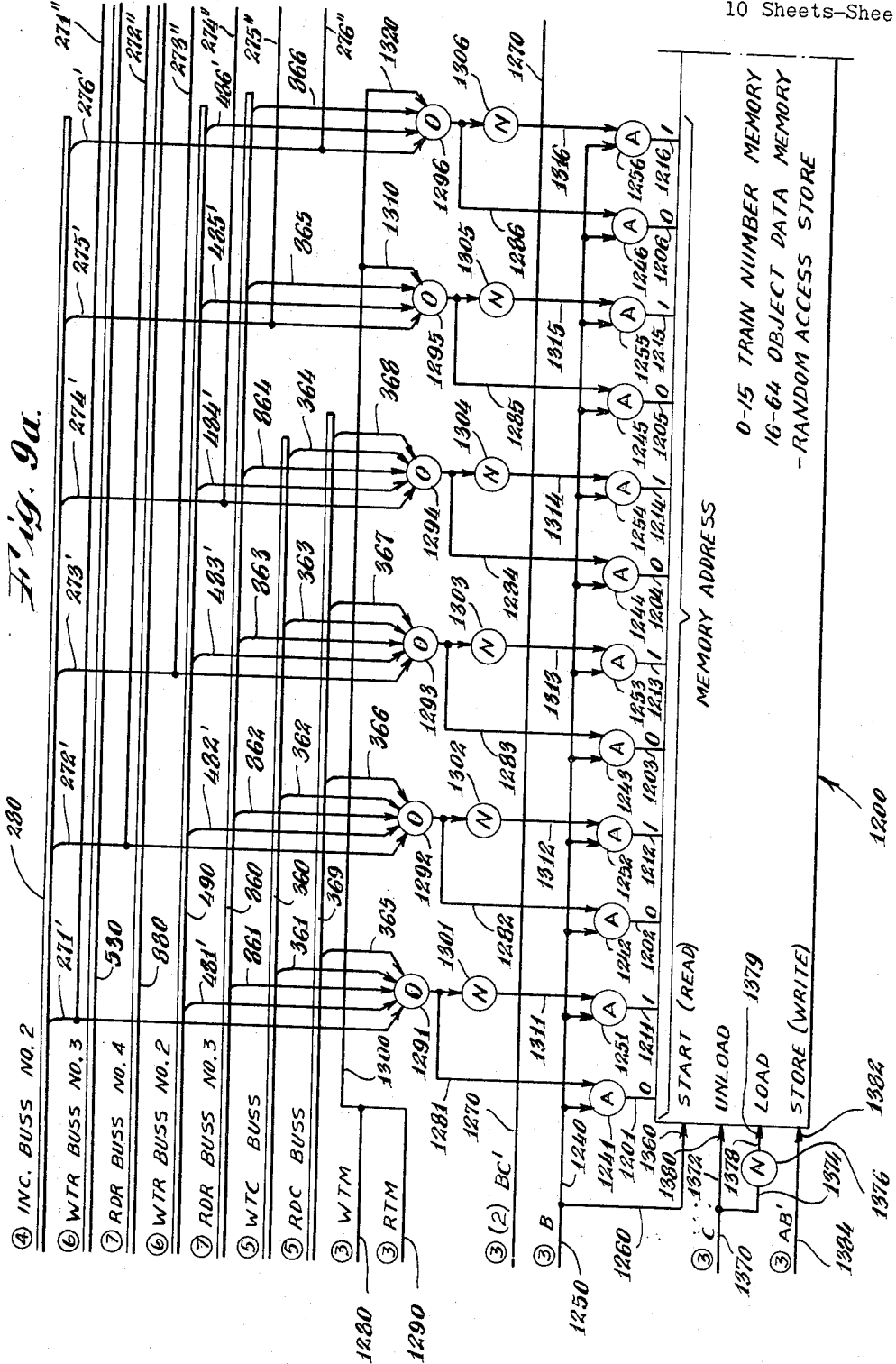

Fig. 9b.

United States Patent Office 3,408,485
Patented Oct. 29, 1968

3,408,485
APPARATUS FOR COUNTING IRREGULARLY SHAPED OBJECTS
Larkin B. Scott, Fort Worth, Tex., and Kendall Preston, Jr., New Haven, Conn., assignors to The Perkin-Elmer Corporation, Norwalk, Conn., a corporation of New York
Filed Feb. 24, 1965, Ser. No. 434,767
5 Claims. (Cl. 235—92)

ABSTRACT OF THE DISCLOSURE

A scanner and computer count all of the particles in a field, regardless of how irregularly shaped these particles are. The field is line scanned, and two adjacent scan lines are compared. The computer assigns a new "train number" to each particle part found, which is not connected to an object part in the immediately preceding scan line, while all continuous parts of already found particles are assigned the same (old) number. Upwardly extending branches of certain types (e.g. V-shaped) particles cannot be immediately identified as parts of a single particle, since these branches join only in a region of the field not yet scanned. The absence of a "continuity" relationship between such branches and any previously found particle part causes each of these branches to be given a new "train number" (i.e., tentatively counted). Another part of the computer determines when such differently numbered branches eventually join. Specifically the lower train numbers are retained to identify the joined parts, and the higher numbers stored as a "junction" signal in the memory part of the computer for subsequent use. After the entire field has been scanned (so that each particle has been assigned at least one train number), the correct count of particles will be the number of train numbers used, less the number of "junctions" found. Because of the positive identification (i.e., tagging with a "train number") of each particle part, the apparatus can distinguish between joining of two previously counted (i.e., different numbered) parts (as in a V-shaped particle) and the joining of two parts already known-to-be of a single particle (i.e., the bottom of an O-shaped particle). Therefore these types (and all other types) of particles are ultimately counted correctly as single particles.

This invention relates to a new technique and apparatus for counting the number of discrete patterns (such as particles) contained in a particular field. More particularly, the invention concerns a scanning and computing technique which is capable of counting all of the discrete particles (regardless of their shape), which are contained in the field in only a single scan of the field. The invention may also be readily adapted to determining the size (area), certain shape characteristics, and the location of various parts of each of the particles as well.

In recent years the problem of automating the counting of discrete particles has been partly solved in various manners. Generally, the techniques and apparatus previously developed, however, are ineffective for counting particles which are irregularly shaped or which contain holes. Most of such prior art devices will make errors in counting such particles, typically by erroneously counting the separate branches of such irregularly shaped particles as separate particles. At least one recently developed system is capable of correctly counting such irregular particles. This system is disclosed in pending U.S. patent application No. 211,935, filed July 16, 1962 (assigned to the assignee of the instant application and having one common co-inventor). Unfortunately, this system requires repeated examination or scanning of the field in order to shrink the particles to a single bit of information each. For this reason this technique, although already demonstrated as feasible, is necessarily relatively slow.

The present invention utilizes an entirely different approach to the problem. Specifically, the present invention scans the entire field only once and is capable of determining from this single scan the total number of discrete particles regardless of their shape. Assuming a conventional rectilinear scan pattern, the scanner supplies information as to the presence or absence of any part of any particle in each part of each horizontal scan line and for all of the horizontal scan lines making up the entire field. The logic or computing part of the apparatus keeps track of any horizontal particle part in any given line by assigning thereto a specific identification number. Since the signal generated by the scanner for each of the elongated horizontal parts of a particle will be an elongated rectilinear pulse, each of these pulses is hereinafter referred to as a "train."

By utilizing a scanner which supplies an output giving all such trains for, not only the presently scanned line (for example, the $i$ line), but also the last previously scanned line (that is the $i-1$ line), the output indicates the presence or absence of a particle part (a train) in both the $i$ and $i-1$ lines simultaneously. The logic part of the apparatus utilizes this dual information to determine whether the various trains in the $i$ line are contiguous to (i.e., directly below) any of the previously noted trains in the $i-1$ line. Whenever such a newly found train is contiguous to any part of a train in the $i-1$ line, it is obvious that the train in the $i$ line is actually part of the same particle which produces the contiguous $i-1$ train. Whenever this relationship is established, showing that the two trains are actually generated by the same continuous particle, the logic and computing circuits will simply label the train in $i$ with the same number as the contiguous $i-1$ train.

The entire field is scanned in this manner, and new numbers assigned to any trains which are not continuous with any train in the next previous horizontal line (i.e., no part of the horizontal section of the particle represented by the new train is directly below any previously found horizontal section). Since these new trains may actually represent only newly found different branches of a single particle (which branches will eventually join at some part of the field yet to be scanned), another function of the logic apparatus is to record all such junctions so that the differently numbered trains will not be counted as two separate particles. Finally, upon completion of the scan, the number of junctions is subtracted from the total number of apparently separate particles, the difference being the actual number of the discrete particles present in the field.

In addition to the above described basic functions of the apparatus, certain additional functions are provided in order to deal with specific problems which may be encountered in various unusually shaped particles. For example, when two branches meet at a junction, the logic circuit must recognize that any sub-branches of either of these branches necessarily are also part of the same particle. Therefore the logic circuits must operate in such a manner that all branches and sub-branches are eventually assigned the same number. The invention also includes various techniques for minimizing the total amount of numbers (and therefore memory size), as will appear hereinafter.

An object of the invention is to provide a method and device capable of counting the total number of particles in a field, regardless of how irregularly shaped they may be (including holes or inclusions), while requiring only a single scan of the field.

A similar object is the provision of a method and device which is capable of counting such irregularly shaped particles in a relatively short time.

Another object of the invention is the provision of a device for counting irregularly shaped particles, which device is relatively inexpensive to manufacture.

A further object of the invention is the provision of a method and device for counting irregularly shaped objects, which with relatively minor modifications, may also determine the presence, number, position, and type of certain shape characteristics of the particle, such as branches or junctions of branches, as well as certain size characteristics (such as area or linear dimensions of the particle).

Another object of the invention is the provision of a method and device for counting irregularly shaped objects, which may be readily adapted to count three-dimensional particles or other objects and to determine the various shape and size characteristics of such three-dimensional objects.

Further objects and advantages of the invention will be apparent to one skilled in the art upon reading the following specification of a single exemplary embodiment of the invention, shown in the accompanying drawings in which:

FIGURE 2a is a graphical representation of a typical output signal from the two-line scanner of FIGURE 2;

FIGURE 3a is a graphical representation of the timing signals generated by the memory timer shown in FIGURE 3;

FIGURE 6 is a schematic of the write register;

FIGURE 7 is a schematic of the read register;

FIGURE 8 is a schematic of the compare logic circuit;

FIGURE 9, which for convenience has been divided into sections 9a and 9b, is a schematic of the random access memory, showing the connections from and to the other parts of the apparatus;

FIGURE 10 is a schematic of the final object counter; and

Figure 11:
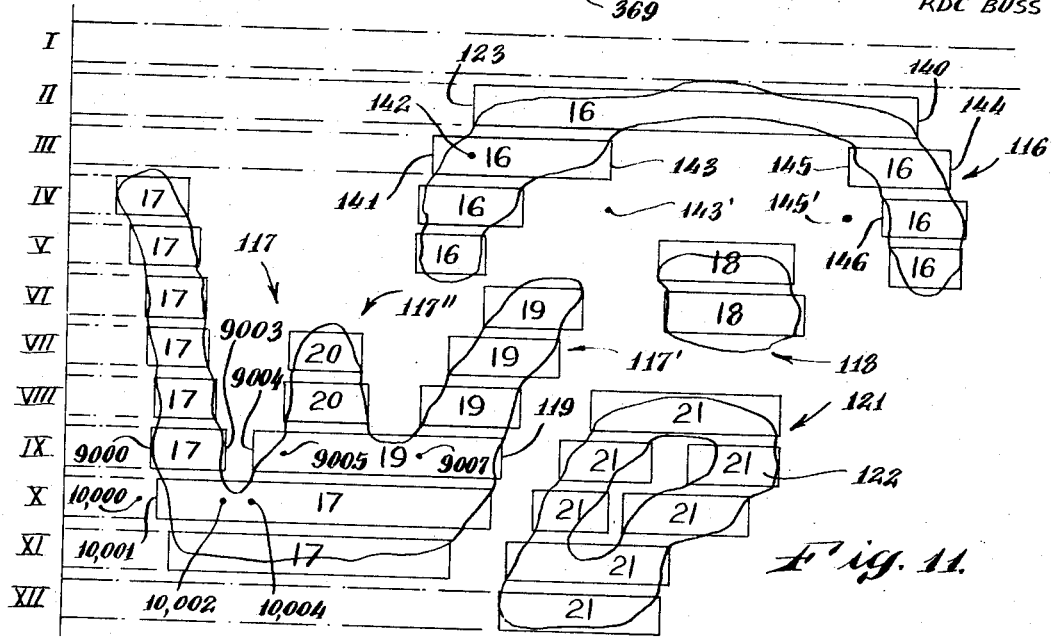

FIGURE 11 is a schematic illustration of an exemplary part of the field including particles, showing the manner in which various numbers would be assigned to the various trains produced by the scanner from these particles.

Figure 1:
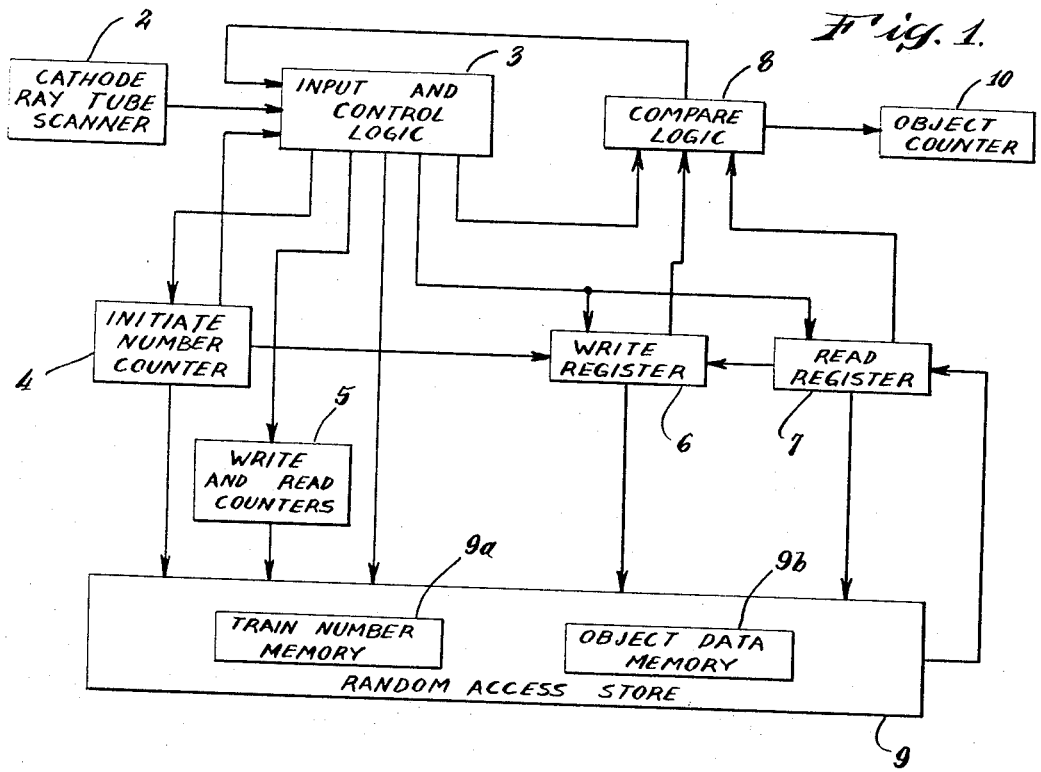
FIGURE 1 is a block diagram of the entire apparatus, showing the various components and the connections therebetween.

I. *General description and description of FIGURES 1 and 11*

FIGURE 1 shows the entire apparatus in block diagram form. Block 2 represents the cathode ray tube scanner and the associated electronics, which scans the entire field. The scanner may use a rectilinear scan pattern so as to scan one line across the field, move down one line on retrace, and then scan the next line, etc. The output supplies not only the contents of the line being scanned but also the contents of the previous line (which may be accomplished by the use of a simple one-scan-line delay). In this manner the scanner output indicates not only the presence or absence of a particle in the line being scanned, but also indicates the presence or absence of the same particle in the previous line all the way across the field.

In addition, the scanner will provide a signal when it has completed scanning the entire field. This information from the scanner is fed to input and control logic 3, which forms the heart of the entire logic circuit shown in the rest of the blocks. Whenever the signal from the scanner indicates that the line being scanned (hereinafter referred to as the *i* line) contains a particle, any part of which lies directly below (i.e., is contiguous to) any part of a particle in the next previous upper line (that is the *i*−*l* line), the control logic will note this continuity of the particle. No new identification (i.e., new number assignment) will then be required for the particle part (or "train") in the *i* line, since the particle has already been assigned a number in the previous scan (that is, when the present *i*−*l* line was the line being scanned).

In order to clarify the relationship between these two adjacent scan-line signals and the operations desired to be performed by the entire apparatus, reference is made to FIGURE 11 showing a part of a field being scanned and the manner in which the various particles and parts of particles will be assigned numbers by the logic circuits. In FIGURE 11, four different shaped particles are shown. The uppermost particle 116 will be encountered first by the scanning mechanism which is assumed to be scanning horizontal lines from left to right and the field from top to bottom. Thus, during the earliest scan shown, when the scanner is scanning line I, no train is generated. During the scan of line II the top of the particle 116 will generate the long train shown in line II. Since only numbers greater than 15 are utilized for train marking for reasons indicated hereafter in the particular embodiment herein disclosed, this first encountered train will be assigned number 16 by the logic circuit. In scan line III, the computer will not assign a new number to either of the new trains encountered, since the existence of the contiguous long train in line II is also being supplied by the line scanner output during the time each of the new parts of the particle are encountered in line III. Thus, the computer receives a signal indicating that each of the trains in line III are at least in part vertically aligned with some part of the train in line II, and therefore recognizes that these line III trains are part of the same particle as previously scanned. Similarly the other parts of this particle 116 encountered in lines IV and V will be recognized as continuous parts of the particle 116 so as to be assigned the same train number. The exact way in which this is accomplished will be subsequently explained.

In line V, the scanner will also intercept the top of particles 117 and 118. When these particles are scanned no train exists in the corresponding part of line IV. Therefore, the output of the scanner will indicate that the trains generated by the top of particles 117 and 118 are not contiguous to any previously scanned particle (including any part thereof). For this reason, the control logic will cause the rest of the logic circuit to assign new numbers (namely 17 and 18) to these trains. During scanning of line VI the apparently new particle 117′ (which in actuality is only a branch of particle 117) will be encountered and will be given a new number (namely 19). This "error" will be caused by the fact that branch 117′ has no continuity with any thing scanned in line V. Similarly, in scanning line VII branch 117″ will be assigned a new train number (20). In line VIII the new particle 121 will be first encountered and assigned a train number (21).

Near the middle of the line IX scan the scanner will indicate that the train 119 is contiguous to and therefore continuous with both of the trains (numbered 19 and 20) appearing near the middle of line VIII. The computing circuit will permanently record this junction of two previously separately numbered branches. At the end of the entire scanning operation the fact that such junctions have occurred (including the exact number of such junctions) will be utilized to determine the actual number of particles encountered in a manner which will be subsequently described. The logic circuit is so designed that it will record as critical only those junctions of branches which have previously been considered separate particles (i.e., only junctions of unlike numbered trains). During the latter part of scan line IX the fact particle 121 branches in a downward direction will cause no difficulty, the situation being exactly analogous to that in regards to particle 116, previously considered. During line X the junction of the two remaining branches of the particle 117 will be noted, and another significant junction notation will be recorded. It may be noted that the particular logic circuit is designed to mark any trains at critical junction points with the lower number of the two trains in the previous lines which have joined, regardless of the geometry of the particle. In the latter part of the line X scan the two separate branches of particle 121 will simply be kept track of as two separate trains which are numbered in the same manner (21), indicating that they both have continuity with a single train and therefore are part of the same particle.

In the beginning of line XI the remaining portion of particle 117 is scanned and is numbered 17 since it is obviously continuous with the train immediately above it. In the latter part of this line the portion of particle 121 just below the hole 122 will be scanned. This will not cause a critical junction notation to be stored in the permanent memory, since the two branches joining are already numbered with the same number (i.e., are already known to be part of the same particle). Line XII, the last scan line considered, produces no new number information.

If this were the entire field scanned, the computer would then determine the total number of particles encountered by counting the total quantity of numbers utilized to mark the various trains and then subtracting from this total the number of critical junctions found. Thus, in FIGURE 11 six numbers (namely 16 through 21) were utilized for marking the various trains found, and two significant junctions were noted and stored (both occurring in particle 117). Thus, the fact that six apparently separate particles were found but that two of these merged with other apparent particles is recognized to mean that only four separate particles existed in the field.

It should be noted that continuity (which is determined by the input and control logic circuit) is established whenever any part of two trains appear at the same (lateral) location in two consecutive scanned lines, and is maintained as long as either of these trains remains present. In other words when the scanner is scanning line III, continuity is established at that point indicated by reference numeral 123 and is maintained by the presence of the long train in line II until the second train in line III is reached (in fact, will then be maintained until the end of this second line III train till point 144). Similarly, the upper part of hole 122 in particle 121 will not break the continuity, so that the computer does not mistakenly assign different numbers to the two branches which straddle this hole. In an analogous manner, when the scanner is scanning particle 121 at the bottom of the hole (i.e., while scanning the end of line XI), the continuity will be established by the beginning of the long train in line XI and will be maintained by the presence of this train until after the beginning of the second train in line X (continuity actually ending in this case only upon reaching the end of the second train in line X). In this manner either branching downward of the particle or included holes will not cause the computer to erroneously assign different numbers to the different parts of the same particle. As illustrated by particle 117, however, the computer will assign different numbers to branches of the same particle where no continuity between these branches is evident from the scanning of the particle up until that time. As previously mentioned and as will be explained in more detail hereinafter, the logic circuit will (by additional functions) determine any subsequent joining of such branches so that these branches will not be counted as separate particles in the final particle count operation.

Returning to FIGURE 1 the block 4 represents the initiate number counter, which provides the numbers utilized for marking each of separate trains (e.g., the exemplary numbers 16 through 21 in FIGURE 11). These numbers are fed to the write register 6, which is also used as an input to the random access store 9. Every time a train which exhibits no continuity with any previously scanned train appears in the scanned line ($i$), the initiate counter will assign a new number, one higher than that previously used. The write and read counters 5 are utilized solely to determine the address of the random access store 9 for storing the number from the write register and for supplying the store contents to the read register 7, respectively. The random access store 9 specifically illustrated is utilized for two purposes, namely, to hold temporarily the train numbers assigned during the scan (train number memory 9a) and to more permanently store indications of any critical junctions which have occurred during the scan of the field (object data memory 9b).

During the scanning, the compare logic 8 is utilized to compare the contents of the write register (which will contain the assigned number of the train in the $i$ line) and the read register (which contains the assigned number of the train from the $i-1$ line) whenever trains are present in both scan lines. When the two trains so compared have the same number, nothing need be done (this being either the common condition of the same part or branch of the particle being present in both lines or the non-critical junction of the type occuring at the bottom of hole 122 in particle 121 in FIGURE 11). However, whenever these two compared trains differ in assigned number, the compare logic circuit will determine that a critical junction has occured. Additionally, the compare logic will determine which is the lower numbered of these two trains so as to discard the higher number, and at the same time will cause the storing in the object data memory an indication of this junction. Specifically, the object data memory 9b will store one of these numbers (for example, store the smaller number) at that memory address which corresponds to the other (larger) number. As will be explained in more detail hereinafter, the object data memory originally contains at each of its addresses a number equal to the address; therefore the presence of a lower number (equal to the lowered numbered train forming the junction) in the higher numbered address (which corresponds to the higher numbered train) will permanently record the existence of a critical junction.

After the entire field has been scanned, the object data memory is inspected to determine those locations which have contents different from (lower than) their addresses. Such unequal "words" are determined by utilizing the (same) compare logic 8 to compare each of the words with its address serially and counting in the object counter 10 only those apparent particles which did not form critical junctions. At the end of the scanning operation, the initiate counter will contain a number, greater by one than the highest number actually used to mark the trains found during the scan (i.e., $M+1$), since this counter will be ready to supply the next number (never used) if the scanning operation had not terminated. This number is then used to address the object data memory (by being supplied to the write register) so as to feed out the word contained in that address ($M+1$) to the read register. The compare logic then determines whether the address (in the write register) and the word located there (in the read register) are equal. If they are equal, the object counter 10 is caused to count up one, since this indicates the presence of a train which did not form a critical junction with any other different numbered train. If they are unequal, the object counter is not stepped so that the particle branches are not counted. By serially repeating this final comparison for each of the train numbers utilized (i.e., $M$, $M-1$, $M-2$, etc.) by stepping down the initiate number counter one unit and repeating the process serially, the number of actual particles present in the field will be indicated by the object counter 10 at the completion of this operation. Since the very first (M+1) comparison will always indicate one more particle than actually present, the object counter should subtract one from the count determined; this is easily accomplished by initially setting the object counter to minus one.

Figure 2:
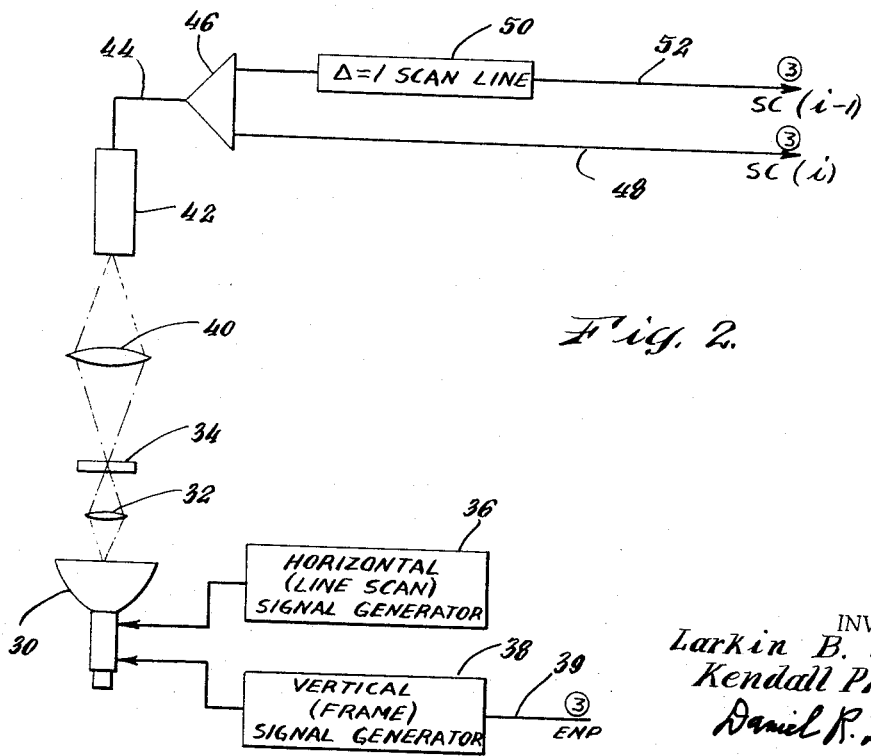
FIGURE 2 is a somewhat schematic diagram of the scanning mechanism utilized to scan the field and to supply simultaneously an output signal representative of the contents of two consecutive scanning lines to the various logic circuits.

*Description of scanner of FIGURE 2*

The specific structure of one preferred embodiment of the inventive device is shown in the various FIGURES 2 through 10. In FIGURE 2 a cathode ray scanning tube of the flying spot type is illustrated at 30, supplying a narrow or spot beam of light through optical system or lens 32 to the object 34 being scanned. This object may comprise a photographic transparency or the actual object including particles having a light transmission substantially different from the empty field. Although the device is shown operating by transmission scanning, it is of course possible to utilize a similar set up in which the flying spot scanner would be directed onto the surface of the field being scanned and the reflected light utilized to determine the presence or absence of objects having a reflectivity different from that of the general field. The beam of light from the flying spot scanner is made to scan horizontal lines by a conventional horizontal line scan signal generator 36. Similarly a conventional vertical signal generator provides the voltage so as to cause the scanning of a slightly different (for example, lower) horizontal line after the completion of each line scan. The scanning beam, as modulated by the object or field 34, is then focussed by lens 40 onto the face of photomultiplier or other radiation detector 42. The electrical signal generated at the output 44 of the detector is therefore proportional to the transparency or opaqueness of the field 34 at the various positions of the scanning beam. This signal is amplified and shaped by amplifier 46, which then supplies a signal directly over output 48 representative of the presence or absence of a particle in the line being scanned. In addition, the output of the amplifier is fed to a relay device 50, which delays the signal an amount equal to the time of one horizontal scan line. For this reason, the signal leaving output 52 is representative of the transparency or opaqueness of the previously scanned line (the $i-1$ line when the $i$ line is being scanned). To indicate this difference between the two outputs of the scanning mechanism, the direct output is labeled SC ($i$) while the delayed output is labeled SC ($i-1$).

FIGURE 2a shows a small portion of the typical signals obtained around the scanner outputs 48 and 52. In particular the two signals shown in FIGURE 2a represent the two outputs of the scanner system when the scanning beam is actually scanning lines II, III and IV of the particle field shown in FIGURE 11. The lower line of FIGURE 2a represents the signals 48' directly from the amplifier at output 48 and is therefore labeled SC ($i$), and the upper signal 52' represents this signal delayed by the length of one scan line, it being the output at 52 and is appropriately labeled SC ($i-1$). As may be seen in FIGURE 2a the signal generated by the line scan II will indicate at 51 the presence of the top of particle 116 in FIGURE 11 by means of a relatively long signal pulse or train. During the third scan (i.e., III–IV), the two signal pulses 53 and 55 will be due to the presence of the two downwardly extending legs of particle 116. On the fourth (IV) scan line, signal pulses 57 and 59 will be produced by these two branches of particle 116.

At the corresponding times output 52 will generate the signal 52' indicated directly above the just described signal 48'. The portion of signal 52' directly above that portion of 48' containing pulse 51 is the delayed output representative of the first scanning line (I) (which contains no particle part) and therefore will be completely blank. Subsequently pulse 51' (which represents the same part of the particle as shown at 51 in signal 48') will be generated in the scan interval representing the second line scan delayed by one scan-line time period and will therefore partially overlap in time pulses 53 and 55 of signal 48'. Similarly, pulses 53' and 55' represent the same parts of the particle as did pulses or trains 53 and 55.

It may thus be seen that when considering the signal 48' representative of the line presently being scanned (that is the $i$ line) that the presence of any contiguous part of the particle in the previous line is immediately indicated by the presence of a pulse in signal 52'. Thus, in the first interval shown in FIGURE 2a when the scanner is scanning line II and the delayed output signal 52' is representing the first scan line (I), the presence of pulse 51 in signal 48' and the absence of any signal corresponding thereto in the immediately above interval of signal 52' indicates that pulse 51' represents a new particle or at least a new part of a particle having no continuity with any previously scanned particle. On the other hand during the interval when the scanner is scanning the third (III) scan line, each of pulses 53 and 55 are present at the same time as some part of pulse 51' is present in signal 52'. This indicates that each of the parts of the particle represented by trains 53 and 55 are in fact, contiguous to the part of the particle represented by signal 51' in the previous line, and therefore that each of these newly found parts are actually merely branches of the particle already found. On the next or IV scan line the new pulses or trains 57 or 59 are found by the scanner and supplied to its output 48. However, since each of these pulses overlaps the pulses 53' and 55' in the $i-1$ line scan, the output of the scanner system indicates to the input and control logic system that these newly found pulses are merely continuations of the branches found in scanning line III (represented by pulses 53' and 55').

In order to show the connections between the various parts of the apparatus previously and yet to be described, each of the outputs are designated not only with a descriptive letter abbreviation, but are also designated with the numeral which corresponds to that figure to which these outputs are connected. Thus, output 48 and 52 of FIGURE 2 are not only designated by the abbreviated designation SC ($i$) and SC ($i-1$) respectively, but are additionally followed by the numeral three to indicate that these signals are supplied to the FIGURE 3 input and control logic circuit.

Figure 3:
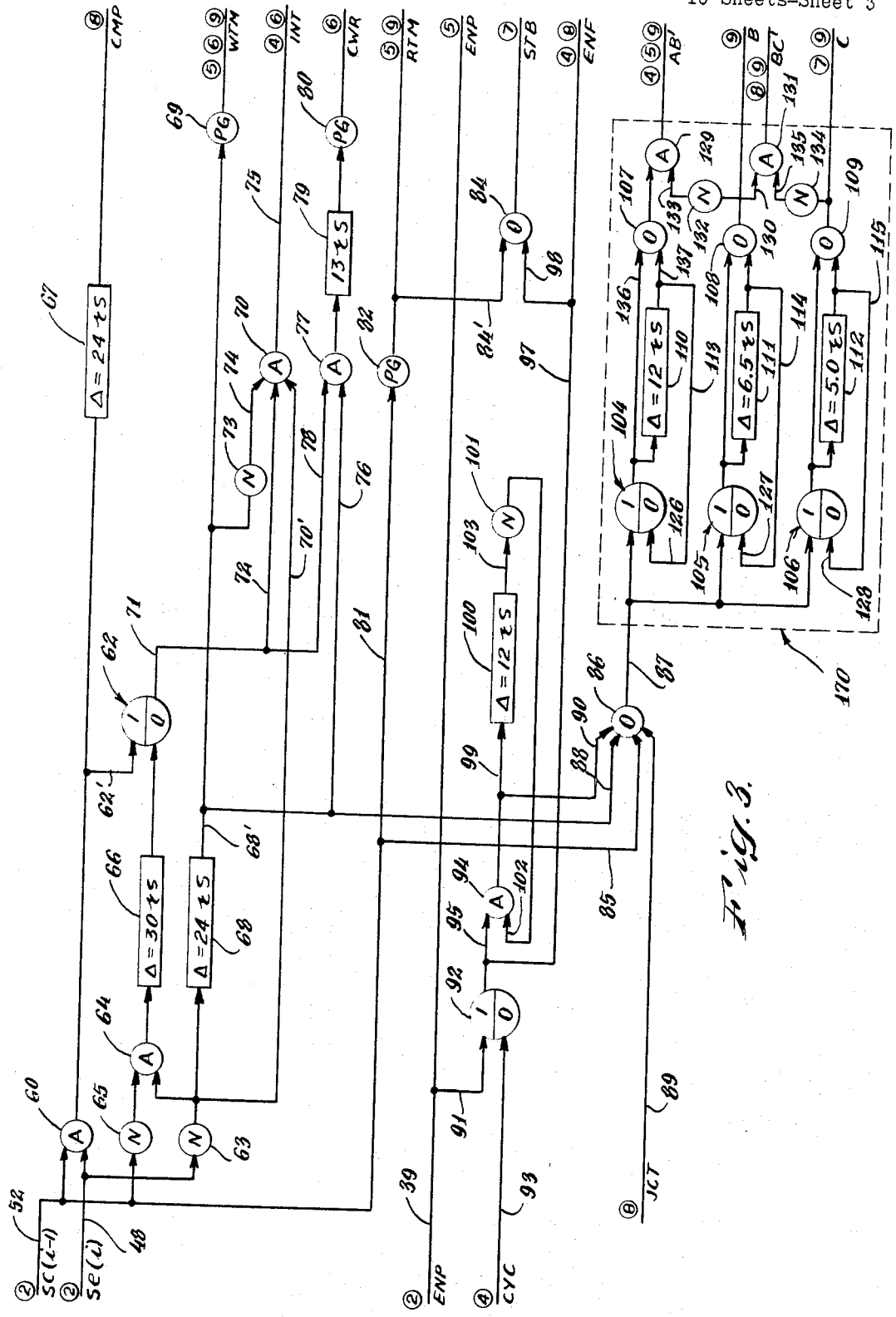
FIGURE 3 is a schematic of the input and control logic circuit, including the memory timer.

*Description of control logic of FIGURE 3*

In FIGURE 3 the scanner outputs 48 and 52 (indicated as coming from FIG. 2 by the numeral 2) are shown as being introduced as the inputs to the same AND gate 60. Throughout the schematic diagrams of the logic circuitry utilized in the apparatus, only conventional AND gates, OR gates and inversion (or negative) gates are utilized. These are represented in the various figures as circles with the symbol A, O or N, respectively, to indicate which of these three types are involved. The only other types of elements utilized in the logic diagrams are bi-stable flip-flops, which are represented by slightly larger circles and horizontal line as indication of the two possible states (0 or 1) in a conventional manner; binary counter flip-flops having carry outputs as well as outputs from its one and zero state, represented by squares with horizontal lines; pulse generators, represented by circles with PG inside; and delay lines or other delay devices, which are represented by relatively long rectangles containing the symbol delta (Δ) and giving the delay time. The above logical sub-assemblies (gates, flip-flops, etc.) are, of course, actually composed of well known combinations of transistors and/or vacuum tubes, electromechanical relays, electrical resistors, capacitors, and other conventional electronic and electrical elements. For convenience in terminology all pulses or signals will be assumed to be positive, so that the terms "present" or "positive" are considered to be synonyms.

Whenever pulses or trains are simultaneously present in the $i$ and $i-1$ lines, the output of AND gate 60 at 61 will be present so as to set the continuity flip-flop 62 to its on or one state. The output 61 of gate 60 is connected to the set input 62' of flip-flop 62. Thus, the presence of a train in two consecutive lines at the same time (and therefore the presence of two parts of a particle in the same horizontal position in two consecutive lines) will always set the continuity flip-flop 62 to its "on" or "one" position. However, the mere subsequent ending of one of these pulses will not cause the bistable flip-flop to return to its off or zero position. However, the $i$ line output signal 48 is also supplied to a negative or inversion gate 63, the output of which is connected to one of the two inputs of AND gates 64. In addition, the $i-1$ signal at 52 is supplied to a similar inversion gate 65, the output of which is connected to the other input of AND gate 64. To more clearly indicate the function derived from the negative or inversion gates 63 and 65, each of these outputs are labeled END and the scan line to which they correspond. Thus, the end of a pulse or train in each of the $i$ and $i-1$ scan lines will be indicated by the existence of a signal at the output of the two inversion gates 63 and 65. Only when both the $i$ and $i-1$ scan signals contains no train or pulse will the AND gate 64 be caused to send a pulse to reset the continuity flip-flop 62 (after a delay caused by delay means 66) to the off or zero position.

It should be noticed that the presence of a train in both lines (as indicated by output 61 of AND gate 60) is also utilized to supply a signal labeled CMP (which is an abbreviation for the logic operation "compare") after a delay supplied by delay means 67. The end of a train in the $i$ line is also utilized to provide two additional functions. Thus, the output 63' of inversion gate 63 is fed to one side of delay means 68, the other side (68') of which causes pulse generators 69 to provide the labeled WTM signal, which stands for "write in train memory." Additionally the output of this same inversion gate 63 is fed directly to one input 70' of AND gate 70. The other inputs of this AND gate 70 are a connection 72 from the off or zero state output 71 of the continuity flip-flop 62, and a connection from the right-hand side 68' of delay means 68 after it passes through an inversion gate 73 as indicated at 74. Thus, the three inputs from AND gate 70 will be simultaneously in their on state only when there is no pulse or train present in the $i$ scan line, when in addition the continuity flip-flop is at the zero state (thereby indicating that their neither is nor was a train in the $i-1$ line which is or was contiguous to the train in the $i$ line which is just ended) and in addition the AND gate is inhibited by input 74 whenever the end of the pulse in the $i$ line has occurred more than twenty-four microseconds previously. The output of AND gate 70 supplies over line 75 the initiate new number signal (INT), which is used to cause the initiate counter (which supplies new numbers) to supply the write register (and thence the train number memory) a new number to mark the $i$ train just ending and then cause this counter to count up one so as to be prepared to give a new number to the next discontinuous new train found. It should be noted that flip-flop 62 is not reset to zero until 30 microseconds after there are no trains in either the $i$ or $i-1$ line and that the input 74 to AND gate 70 is never positive after 24 microseconds following the end of an $i$ line train. Thus, the only time AND gate 70 can have even inputs 72 and 74 positive when the train in the $i$ line ends (making third input 70' positive) is when this train in $i$ was never continuous with any train in the $i-1$ line. In other words, since the continuity flip-flop will be set to its one or on state by such continuity and can be reset to zero no sooner than 30 microseconds after the last of the two contiguous trains disappears, the disappearance of the train in both lines cannot ever cause the flip-flop to be reset as soon as 24 microseconds after the disappearance of the train in the $i$ line. Therefore, the only time the output of AND gate becomes positive (i.e., generates an INT signal) is when the train in the line $i$ just ending never was continuous with a train in the $i-1$ line (so that flip-flop 62 has long been in its zero state).

The delayed end of the $i$ line train at 68' is also feed as input 76 to AND gate 77. The other input 78 to this AND gate is the same zero-condition signal of the continuity flip-flop 62 previously described. The output of AND gate 77 will therefore supply a signal whenever a train in the $i$ line has ended 24 microseconds previously and there is no train in the $i-1$ line which is contiguous to or had continuity with the train in the $i$ line. After a delay of 13 microseconds as illustrated, such a coincidence of signals will cause pulse generator 80 to initiate a "clear write register" (CWR) signal. As previously stated, each of the functions or signals generated by the logic circuits is designated in the drawing by a capital three-letter abbreviation and where appropriate, the figures to which this signal is supplied (when the function appears at the right-hand side of a drawing of a figure) or from which it came (when the function appears on the left-hand side) is given so as to allow tracing of the various functions from figure to figure in a relatively easy manner. Thus, the compare signal (CMP) is fed to FIGURE 8, the write in train memory signal (WTM) is fed to both FIGURES 5 and 6, etc. Similarly, the end pulse signal 39 coming from FIGURE 2 is labeled with numeral 2 as well as the designation ENP at the left-hand side of FIGURE 3; and since it is directly supplied to FIGURE 5 as well, it is so indicated at the right-hand side of FIGURE 3.

In addition to the function previously described, the presence of a pulse or train in $i-1$ line as indicated by signal 52 will also actuate pulse generator 82 (over lead 81) to make a read train memory (RTM) signal and will also cause one of the inputs 84' to OR gate 84 to receive a signal so as to generate the strobe signal (STB). Additionally, the beginning of a train in the $i-1$ line will cause (over lead 85) the actuation of OR gate 86, the output of which at 87 will initiate a memory timer cycle pulse (MTP). The other inputs to OR gate 86 which will initiate a cycle of the memory timer include 88, which is merely the delayed end of train in the $i$ line indication obtained at the output 68' of delay means 68; the junction signal (JCT) provided from FIGURE 8 over line 89; and the end of frame input 90, about to be described.

The memory timer shown within the dash lines in the lower right-hand corner of FIGURE 3 is, as its name implies, utilized to time the operations performed by the memory or store as well as some of the other associated operations. The three inputs (85, 88, and 89) to the controlling OR gate 86 just described will cause the memory timer to operate at the appropriate times during the scanning operation. The remaining input 90 to the control OR gate 86 is only used during the final counting operation subsequent to the scanning the entire field. However, the connections and functions necessary to cause the input at 90 to carry a signal will be described at this time since these functions and connections are included in FIGURE 3 for purposes of convenience of illustration.

The end of scanning pulse (ENP) at 39 from the scanning system of FIGURE 2 is fed to the end of frame (ENF) flip-flop 92 at that input 91 which causes the flip-flop to go to its on or one state. Thus, flip-flop 92 will be set to its one state whenever the entire scanning operation is completed. The cycle completes (CYC) from FIGURE 4 (yet to be described) will be fed to flip-flop 92 at input 93 so as to reset the flip-flop back to its zero or off state at the completion of the final count of the particles present in the field (which final count is accomplished subsequent to the scanning operation as previously described). Thus, the end of frame flip-flop 92 is merely an on-off switch determining the time when the final count of the objects previously scanned are made (i.e., when the device determines whether the previously counted trains form critical junctions, so as to be part of the same particle or are in actuality separate particles). The on state of flip-flop 92 will cause a signal to be fed to AND gate 94 over lead 95 and will also give an end of frame signal as indicated at the right-hand end of lead 97. Additionally, this output will be fed over lead 97 to the second input 98 of OR gate 94 so as to cause a strobe signal (STB). The output of AND gate 94 is feed as input 99 to delay means 100, the output of which is feed (as input 102) to inversion or negative gate 101. The other end of inversion gate 101 is feed back as a second input 102 to AND gate 94.

Elements 94, 100 and 101 and their connections will operate as a clock. Thus, whenever the flip-flop 92 is initially turned on, the presence of a signal at 95 and the presence of a signal at 102 (because of the action of the inversion gate 101 which causes a signal at 102 whenever there is none present at its input 103) will cause a signal to be generated at the output 99 of the AND gate 94. After a delay of twelve microseconds caused by the delay means 100, a positive signal will be supplied to inversion gate 101 so as to cause its output to become negative or off. This will then cause one of the two inputs (102) to the AND gate 94 to be in the off condition so as to turn its output 99 off. However, twelve microseconds later the off signal will reach the input to inversion gate 101 so as to cause the inversion gate output at 102 to become an on signal again, thus reactivating the AND gate and repeating the entire cycle. The effect of this repetitive time pulse generation is to cause the signal at 99 to become on for twelve microseconds, then off for twelve microseconds, and then on for twelve microseconds in a repetitive manner. Thus, the input 90 to the OR gate 86 will cause an output at 87 to appear every twenty-four microseconds as long as the end-of-frame flip-flop 92 is in its on or one position, while the other inputs 85, 88, and 89 will normally cause only a single output pulse or signal at 87. For this reason, the input 90 will cause repetitive actuation of the memory timer (now to be described) during the final counting operation following the scanning operation.

A memory timer cycle pulse (MTP) appearing at 87 (caused by the presence of a signal at any one of the inputs to OR gate 86) will change each of the three flip-flops 104, 105, and 106 from one of its bistable positions to the other one. Each of the flip-flops 104–106 has its on or one state output connected both directly to one of the OR gates 107, 108, and 109, respectively, and also through one of the different delay means 110, 111, and 112. In addition the output from each of the delay means 110, 111, and 112 is connected over leads 113, 114, and 115, respectively, as an input to the zero (i.e., off or reset) side of the flip-flops 104, 105, and 106, respectively, as shown at inputs 126, 127, and 128, respectively. The output signals of OR gates 107, 108, and 109, respectively, are labeled A, B, and C. The output A from OR gate 107 is fed as one of the inputs to AND gate 129 while the output B from OR gate 108 is not only fed out directly to FIGURE 9 (as indicated at the right) but also is fed as input 130 to AND gate 131. The other input to AND gate 129 is taken from the output (B) of OR gate 108 after passage through inverter 132 as indicated by lead 133. The other input to AND gate 131 is taken from the output (C) of OR gate 109 after passage through inverter 134 as indicated at 135.

Since the internal operations of each of the groups of elements (104, 107, and 110; 105, 108, and 111; and 106, 109, and 112) are substantially identical except for the exact timing of the operations, caused by the different times of delay introduced by the delay means, an explanation of how one of these units works should suffice. In order to facilitate understanding of the action of each of the individual timing units, an illustration of the various outputs of OR gates 107, 108, and 109 (labeled A, B, and C, respectively) is given in FIGURE 3A. In addition an example of the signal appearing at inputs 136 and 137 of OR gate 107 is labeled $a$ and $\Delta a$ in both FIGURES 3 and 3$a$. Flip-flop 104 (as well as 105 and 106) is originally in its off or zero position when a positive memory timing cycle pulse (MTP) is supplied thereto by the output 87 of OR gate 86. For this reason, the output of OR gate 107 will be zero or off as neither of its connections can be on since they are both derived from the on or one position of flip-flop 104. As soon as the MTP signal causes the flip-flop 104 to assume its one position, a signal will be supplied to the upper or $a$ input 136 to OR gate 107 (as shown at 138) thereby causing the output thereof (at A) to assume its positive or one value as shown at 139 in FIGURE 3$a$. If the zero or reset input 126 were not present, the flip-flop 104 would of course remain in its one position thereby continuing to supply a signal at 136 to OR gate 107 so as to maintain signal A at its positive or one value indefinitely. However, twelve microseconds after the flip-flop 104 is turned on, a pulse will appear at the output of delay means 11. This $\Delta a$ output, occurring at 138' in FIGURE 3$a$, will be immediately supplied over lead 113 to the reset input 126 of flip-flop 104 (FIGURE 3) so as to turn it off twelve microseconds after it has been turned on. However, the $\Delta a$ signal itself will continue for twelve additional microseconds, since it is merely signal $a$ delayed by this amount. Thus, as shown in FIGURE 3$a$, output A of OR gate 107 will continue for an additional twelve microseconds until $\Delta a$ also disappears, at which time A will also go back to zero.

Thus, the effect of the entire unit consisting of elements 104, 107, and 110 is to produce a twenty-four microsecond pulse a single time and then to shut itself off by resetting flip-flop 104 back to the zero state. Similarly, elements 105, 108, and 111 will cause a single thirteen microsecond pulse to appear at output B of OR gate 108, and elements 106, 109 and 112 will cause a ten microsecond pulse to appear at output C of OR gate 109. In each case the pulse is equal to twice the delay line time since the pulse comprises the sum of two equal length components analogous to small $a$ and $\Delta a$ shown in FIGURE 3$a$. The actual memory timing pulses desired for the particular memory store utilized and the associated operations consists of four different pulses. In addition to using the B and C signals for these timing operations two additional signals derived from A, B, and C are used. These are the signals or pulses designated AB' and BC' at the bottom of FIGURE 3$a$. The priming of the second letter in each of these symbols is equivalent to the use of bar thereover and means the absence (or negative) of the signal designated by the letter which is primed. In other words AB' means a signal which is equivalent to that part of A not coincident to signal B which may be seen by a comparison of signals A, B and AB' in FIGURE 3$a$. Similarly, signal BC' designates a pulse which occurs during that part of the B pulse when the C pulse does not exist. Another way of defining AB' is that it is the time when A is on but B is not. This signal AB' is readily derived at the output of AND gate 129 by utilizing an invertor at 132 to invert or negate the B signal before its being feed at 133 to the lower input of AND gate 129. Thus, the signal present at 133 is the inverse or negative of B (i.e., a pulse or positive signal B' will be present at 133 whenever B is not present at the output of OR gate 108). Obviously then the output of AND gate 129 is desired signal AB'. Similarly, signal BC' is readily derived by feeding the C signal through invertor 134 to the lower input 135 of AND gate 131, and feeding the B signal to the other or upper input to this AND gate as shown at 130. The output of AND gate 131 will therefore be the desired signal BC'.

*Basic operation of FIGURE 3*

Although a complete description of the operations performed by the input and control logic must await description of the various other assemblies and circuits of the device, a brief explanation of the time of occurrence and the basic significance of the various outputs at the right of FIGURE 3 will be given here so that a better understanding of the function of the entire device may be obtained before the details of the various other circuits are described. Referring to FIGURE 11 as well as FIGURE 3, scanning of line II will cause the SC (*i*) output of the scanner at 48 to become positive at point 123. This will cause no change in the output of AND gate 60, since the scanner output SC (*i*−1) at 52 contains no (positive) signal because the first or I scan line is empty. Similarly, the pulse starting at the scan position 123 will not cause any positive signal to appear at the output side of inverter 63, which output becomes positive only when a signal in the SC (*i*) output ends. Therefore, no immediate action is initiated by the beginning of the train in the II line. However, at the end of this train or pulse at 140 the output of inverter 63 will become positive. Since the other input to AND gate 64 contains a positive signal at this time, this would cause a resetting of flip-flop 62 (after a 30 microsecond delay) so as to put it in its zero or reset state if it were in its continuity or one state. However, since flip-flop 62 has not yet been set to its continuity or one state by the simultaneous appearance of a SC (*i*) and SC (*i*−1) train, no actual resetting is necessary.

The ending of the SC (*i*) train in line II immediately causes an "initiate" (INT) operation, since flip-flop 62 is already in its zero state (so that input 72 to AND gate 70 is positive) and input 74 is still positive because delay means 68 keeps its output 68' from becoming positive yet. The INT (initiate) function labels the train just ending with the number (16 in this case) presently in the initiate number counter (shown in FIG. 4 and soon to be described) by transferring this number to the write register, and then steps this counter to the next higher number (17 here) so as to be ready for future use. It should be noted that the inputs to AND gate 70 and the delay (66) in the resetting of flip-flop 62 cause the initiate function to occur only when the train ending in the *i* line is not and never was contiguous with any train in the *i*−1 line; for this reason, new numbers are assigned only to those trains which are, at least potentially, parts of new particles.

After the 24 microsecond delay caused by element 68, the output at 68' becomes positive, thus making input 74 to AND gate 70 negative and stopping the initiate function. At the same time the "delayed end of train in *i*" (Δ END (*i*)) at 68' will actuate pulse generator 69 so as to cause a "write in train memory" (WTM) function and also cause a cycling of the memory timer by generating a "memory timer pulse" (MTP) at OR gate 86. This causes the number (16) now present in the write register to be "written" or stored in the train number memory. Since flip-flop 62 is in its zero state, input 78 to AND gate 77 is positive; therefore, the Δ END (*i*) signal at input 76 will also actuate this AND gate. This causes, after a 13 microsecond delay effected by element 79, the actuation of pulse generator 80, thereby creating a "clear write register" function signal (CWR). In general, such a clearing of the write register will be accomplished whenever the train ending in the *i* line is not then contiguous to a train in the *i*−1 line; in other words, the write register will be cleared (after a delay to allow a "writing" or storage operation) whenever the train in *i* ends and no train is then present in the *i*−1 line. It should be noted that for an end of a train in the *i* line (END (*i*)), which train is not and never was contiguous to any train in the *i*−1 line, the following order of signals occurs: (1) INT; (2) WTM (and end INT); and (3) CWR. This sequence causes (1) the associating or labeling of this independent train with a new member (by supplying it to the write register); (2) storing this number in the train number memory; and (3) clearing the write register so as to allow subsequent operations.

During scanning line III, the beginning of the train in the *i* line at point 141 will cause no activation of the output of either AND gate 60 or 64 for the same reason that no activation occurred at point 123 in the previous (II) line scan. However, when point 142 (which is directly below point 123 in the previous line II) is reached, a number of significant signals are generated. The first in time will be a "read train memory" (RTM) signal from pulse generator 82, caused directly by the SC (*i*−1) input 52 over lead 81. The RTM signal causes the read register to be supplied with the train number (in this case), 16 previously associated with the train just starting in the *i*−1 line from the train memory (by addressing the train memory with the appropriate number from the read counter, as will be subsequently explained). Input 84' of OR gate 84 will also be actuated by pulse generator 82 at this time so as to generate a "strobe" (STB) pulse, which assists in gating this transfer of the information from the memory into the read register, as will be further explained hereinafter. Concurrently, a signal is supplied to input 85 of OR gate 86 so as to supply a memory timing pulse (MTP) at the output of this OR gate to start a memory timer cycle, which times the operations associated with this reading of the train number (as will be subsequently explained). At the same time, the output 61 of AND gate becomes positive for the first time upon the appearance of a signal on input 52, since input 48 is already positive because of the presence of a SC (*i*−1) signal. The presence of a train in both the *i* (III) line and the *i*−1 line (II) at the same time will therefore cause the continuity flip-flop 62 to be set to its one state (by the signal at its "set" input 62') even if, as in this case, the flip-flop has been in its zero state. Twenty-four microseconds after the above signals (i.e., RTM, STB and MTP) are generated, a "compare" (CMP) function will be generated by the output 61 of AND gate 60 as delayed by element 67. Because of the fact that the write register is now empty, the compare logic circuit (FIG. 8) will cause a transfer (TFR) signal to be generated in a manner later to be described. This will cause the contents (16) of the read register to be transferred into the empty write register. Generally speaking, a compare operation will determine whether the two trains (in the *i* and *i*−1 line), which are now known to be contiguous, were previously thought to be parts of different particles (i.e., whether a "junction" has occurred). An explanation of the operation of the device at such a junction (e.g., those occurring in lines IX and X in particle 117) will be deferred until the other parts of the apparatus have been described.

*Resume of FIGURE 3 function signals*

At a point such as point 143 in FIG. 11 when the input at 48 no longer is positive or present, the AND gate 60 will no longer have an input; however, the continuity flip-flop 62 will not be reset merely by the absence of a signal at either 48 or 52 and therefore at 61. On the contrary, resetting requires that there be no signal present at both 48 and 52 simultaneously (so that there will be a signal present at the outputs of each of inverters 63 and 65 and therefore both the inputs to AND gate 64). Thus, the continuity flip-flop will not be moved from its one state (corresponding to the presence of continuity) until both inputs at 48 and 52 have ceased to be positive. In FIGURE 11 it is seen that the first time that this will occur during the line III scan will be at point 144. At this time the input of 52 will already be absent or non-positive so that the output of inverter 65 is already in the positive condition. At point 144 the output at 48 will go from positive to negative or zero, and therefore the output of inverter 63 will go from zero (or negative) to its positive value, thus causing the output of AND gate 64 to become positive. Therefore, after the delay caused by means 66, the continuity flip-flop will be reset into its zero or no continuity position. Thus, it may be seen in general that the continuity flip-flop is set to the one position by the initial presence of trains in both the $i-1$ and the $i$ line at the same time, and is reset to the zero position by the ending of the train which is last to terminate. Thus, the continuity flip-flop indicates the presence of a train (in either line) which is known to be overlapping with another train in the other line.

On the other hand, the compare (CMP) signal will occur whenever trains are present in both of the lines simultaneously and will disappear when either of the lines contains no train. As will be seen in detail subsequently, the compare signal causes comparison of the contents of the write register and the contents of the read register so as to determine whether some indication must be sent to the memory store to indicate that two previously differently numbered trains have now been found to be parts of the same particle (i.e., like the two junctions of the branches of particle 117 previously described).

The write in train memory signals (WTM) occurs at the end of every train in the line being scanned (that is, the $i$ line) regardless of whether or not a train is present at the same time in the $i-1$ line. This simply stores in the train memory (at the particular address supplied by the write counter as will be subsequently described) the contents of the write register, which contains the number assigned to the train just ending. It is this mechanism which allows (in conjunction with other mechanisms to be described) the ability of the computing circuits to keep track of a plurality of different trains (which may or may not be parts of the same particle) in any given scan line (for example the scan line V in FIGURE 11).

The initiate signal (INT) will occur at the end of a train in the $i$ line if no continuity exists or has ever existed during the train in the $i$ line just ending (i.e., the continuity flip-flop is in a zero state). In other words, the INT signal will be produced during the II scan line at point 140 but will not be produced in the III scan line at point 144, and of course will not be produced during the third scan line at such points as 143. The third input 74 to AND gate 70, which consists of the inverted delay end of the train in $i$ signal, is utilized merely as a means to turn the INT signal off 24 microseconds after the end of a train the $i$ line. This avoids mistaken maintaining of the INT signal indefinitely, which may cause undesirable, additional functions to occur, as will appear subsequently. The INT signal causes the initiate number counter to be gated into the write register, and subsequently (as actuated by timing signal AB') causes the initiate number counter to go to the next higher number.

The clear write register signal (CWR) occurs soon after the end of a train in line $i$ if at the same time, there is no continuity (i.e., there is no train in line $i-1$ either). It will therefore occur at point 144 as well as at point 140. The additional delay means 79 assures that the clearing of the write register does not occur until after the contents thereof have been written into the train memory (because of the WTM signal).

The read train memory (RTM) signal occurs at the beginning of trains in the $i-1$ line, regardless of the presence or absence of any trains in the $i$ line at the same time. The pulse generator 82 is used so that the RTM signal appears only at the beginning of such train and is not continuously generated by a long train in the $i-1$ line. The function of the RTM signal is to connect the read counter to the train memory address, thereby making available the contents of that particular address to the read register. The purpose of obtaining at the read register the contents of the train memory at the particular address in question is to allow for comparison of that number with the contents of the write register as soon as an overlapping train in the $i$ line is encountered. In other words, it makes available the number previously assigned to the train in the $i-1$ line so that if a train appears in the $i$ line, the compare logic can determine whether or not these trains are known to be part of the same particle, and if not can actuate the necessary logical operations to either note that this is a junction or perform some other operation, as will appear subsequently.

The end pulse (ENP) is merely the signal from the scanner which occurs when the scanner has completed a scan of the entire field. As previously noted, it is used to set the end of frame flip-flop 92 (ENF) to its one or on state and is also used to clear both the write counter and the read counter.

The strobe signal (STB) occurs whenever an RTM signal occurs during the scanning operation and is held on by the ENF during the counting operation thereafter. As previously noted, the RTM pulse will occur at the beginning of any train in the $i-1$ line. Since the ENF signal is present constantly after the end of the scanning process, the strobe signal will be continuous during the counting operations done after the complete scanning of the field. It is utilized to allow the transfer of the contents of the particular address of the memory requested to be transferred to the read register.

As previously mentioned, the end of frame (ENF) signal is present whenever the flip-flop 92 has been positioned to its one or on state by the end pulse (ENP). Its purpose is to allow the sequential examination of all of the numbers stored in the memory to determine whether the numbers assigned to the various trains were later found to be redundant (i.e., whether those trains so identified eventually formed critical junctions with other trains). This is accomplished by using the same initiate counter which was used to supply the original train numbers to extract in sequence from the various memory addresses the contents, and by using the compare logic to determine whether or not any of these contents represent trains that formed critical junctions.

As previously mentioned, the memory timer will be actuated by any one of its four actuating inputs (85, 88, 89, or 90). These inputs correspond to the four operations of (at 88) a WTM signal (which corresponds to the end of a train the $i$ line); a RTM or read train memory signal at 85 (which occurs at the beginning of a train in the $i-1$ line); the presence of a junction (JCT) signal at 89 which will occur whenever a critical junction (such as previously described in regards to particle 117 in FIGURE 11) occurs; and finally a repetative signal every 24 microseconds from the clock composed of elements 94, 100, 101 when the end of a frame flip-flop (ENF) is set to its on or one position during the final count operation subsequent to the scanning of the entire field.

As previously explained, the signals actually used from the memory timer consist of the four timing pulses, B, C, AB' and BC', shown in FIGURE 3a and previously described. These signals are used for timing the particular memory device utilized in the following manner. Pulse B is used for gating the memory address and for reading out the contents of the memory. The C timing pulse is utilized for unloading the memory (into the read register) and for suppressing the loading thereof during the time that this pulse exists. In other words, it allows the reading of the contents contained at the address requested but inhibits the loading of any contents into that address. The BC' timing pulse is utilized to gate the memory input with the information to be supplied to the memory. Finally, the AB' timing pulse is used for actually writing the contents of memory input into the memory. It also times the causing of the initiate, read and write counters to count up one during the scanning operation, and the initiate counter to count down one during final counting operation, as will be explained in the description of the operation of FIGURES 4 and 5. The BC' timing pulse additionally is utilized to time the final counting into the object counter of the number of particles actually encountered during the final counting operation that follows the entire scanning operation.

The cycle complete (CYC) signal appears after the final counting operation has been completed, as will be indicated by the initiate number counter having returned to its original state subsequent to the entire counting operation accomplished after the scanning operation.

Finally the junction (JCT) signal will occur whenever the compare logic (FIG. 8) determines that two differently numbered trains (therefore previously thought to be separate particles) are determined to be parts of the same particle (such as occurs twice in particle 117 in FIG. 11), in a manner which will be subsequently described.

Figure 4:
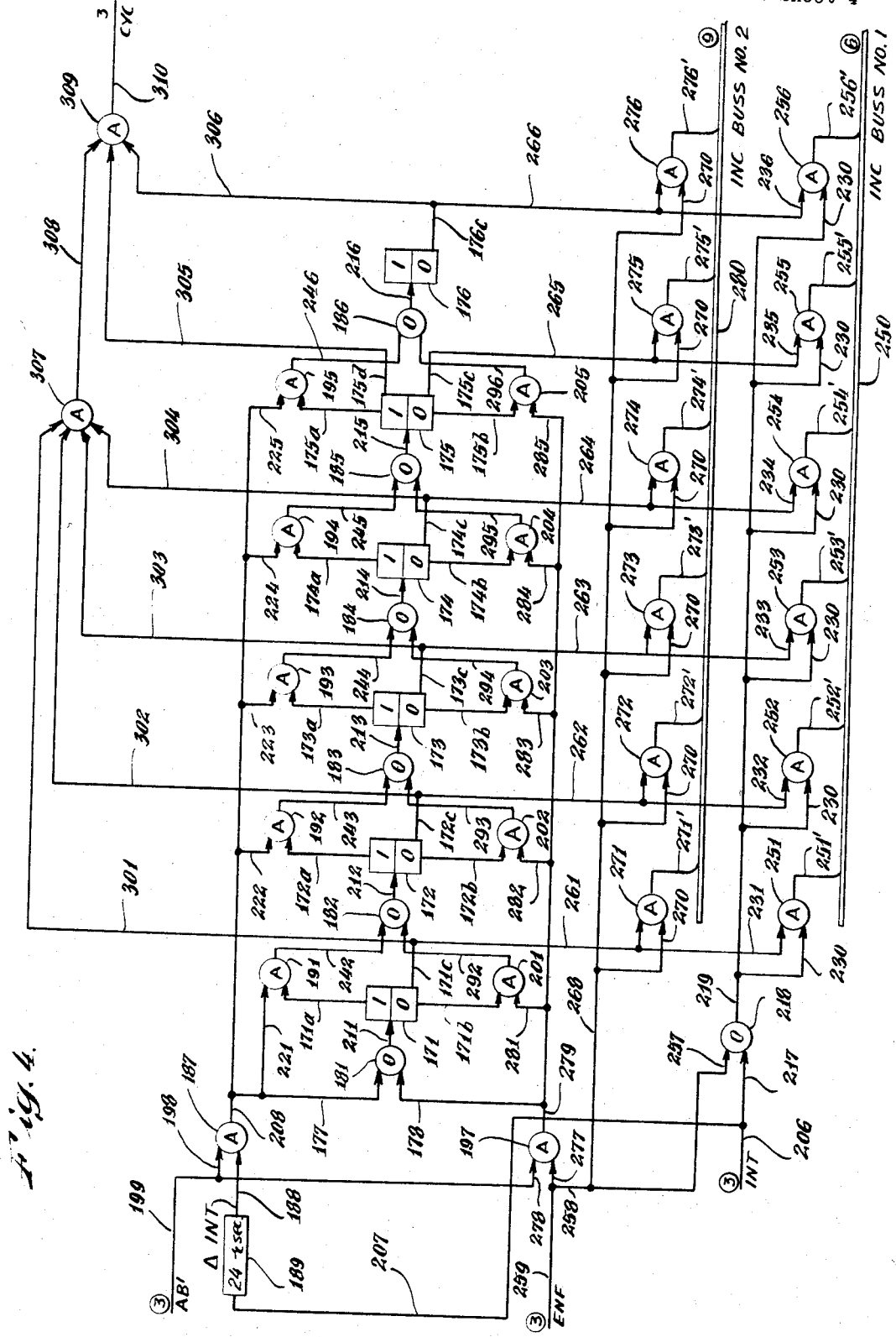
FIGURE 4 is a schematic of the initiate number counter.

Initiate number counter of FIGURE 4

The initiate number counter and the associated inputs, logical elements and connections and outputs are shown in FIGURE 4. The counter proper comprises a series of flip-flops 171–176, and the associated OR gates 181–186. In order to better illustrate the various functions of flip-flops 171–176, each is represented by a rectangle, divided into the one and zero sides or states. The only utilized input to these flip-flops is of the type which will cause the change thereof from either one of its bi-stable states to the other, and is represented by a central input (211–216). Each of the first five flip-flops (171–175) has outputs indicating when a change in the state of the flip-flops occurs. In particular, upper outputs 171a–175a will contain a short signal or pulse whenever the corresponding flip-flop goes from its one state to the zero state. Analogously, lower input (171b–175b) will contain a signal pulse whenever the respective flip-flop changes from its zero state to its one state. It should be noted that these outputs are shown as coming from the side of the flip-flop labelled with that state from which the flip-flop must change to generate the pulse on output 171a–175a or 171b–175b, respectively. In addition, each of the various flip-flops 171–176 have additional outputs, extending to the right from one or both of the zero or one sides. These outputs correspond to those previously described for the flip-flops of FIGURE 3, and represent the state of the flip-flops. Thus, each of outputs 171c–176c from the right-hand edge of the zero side of the respective flip-flops 171–176 will have a signal present thereon whenever the corresponding flip-flop is in its zero state (and will carry no signal when the respective flip-flop is in its one state); and output 175d from the right-hand edge of the one side of flip-flop 175 will have a (positive) signal whenever this flip-flop is in its one state (and no signal when flip-flop 175 is in its zero state). In sum, upper outputs 171a–175a are "carry" outputs, indicating the change from the one to the zero state of their respective flip-flops; lower outputs 171b–175b are "carry" ouputs representing the opposite (zero to one) change in the corresponding flip-flop; state or "contents" outputs 171c–176c are present when the corresponding flip-flop is in its zero state and contents output 175d is present if flip-flop 175 is in its one state.

A series of AND gates 191–195 are provided between the upper carry output (171a–175a) of each flip-flop (except the sixth flip-flop 176) and one of the inputs to the OR gate (182–186) associated with the next (i.e., the one to the right) flip-flop (172–176). As will be explained hereinafter, AND gates 191–195 will cause the next flip-flop to change its state whenever the previous (i.e., left) flip-flop changes from its one state during the time a signal is provided to the other input of these AND gates (191–195). In an analogous manner a series of lower AND gates (201–205) are provided, having one input connected to the lower carry output (171b–175b) of each flip-flop (except the last) and having its output connected to the activating OR gate of the next (i.e., righthand) flip-flop. As may be gathered from the description so far, flip-flop 171 would contain the least significant (i.e., the unit digit) in the binary number represented by the contents of flip-flops 171–176. Similarly, 172 would represent the next higher (i.e., the two-unit digit) in the binary number, flip-flop 173 the four-unit, 174 the eight-unit digit, 175 the 16-unit digit, and 176 the 32-unit digit in the binary number.

As may be readily seen in FIGURE 4, the output of OR gate 181 is connected as input 211 to flip-flop 171 in such a manner as to cause the flip-flop to change from that one of its bi-stable states in which it is at present to the other bi-stable state whenever OR gate 181 is actuated. Similarly, the output of OR gate 182 will cause at 212 flip-flop 172 to change its state whenever OR gate 182 is actuated. Obviously the respective output over leads 213–216 will affect flip-flops 173–176 in this same manner whenever OR gates 183–186 are actuated by either of their inputs. The OR gate 181 which controls the first or lowest value flip-flop 171 has its inputs supplied from different sources than the inputs to the other OR gates 182–186. Specifically, inputs 177 and 178 of OR gate 181 are derived from the outputs of AND gates 187 and 197 respectively.

As may be seen from the left-hand side of FIGURE 4, the lower input 188 to AND gate 187 is derived from the INT (initiate) signal from FIGURE 3, after it has passed through delay means 189. Specifically, input 206, which is the INT output of the control circuit of FIGURE 3, is supplied over lead 207 as an input to 24 microsecond delay means 189, the output of which, ΔINT, is the lower input 188 to AND gate 187. The other input 198 to AND gate 187 is the AB' timing signal at 199 derived from the memory timer of FIGURE 3. Thus AND gate 187 will be activated so as to have a signal at its output 208 whenever both the delayed initiate (ΔINT) signal and the timing signal AB' are present. As may be recalled from the previous description, a memory timer pulse (MTP) signal will always occurs 24 microseconds after an initiate signal, since the write in train memory signal (WTM) always follows 24 microseconds after an INT signal. For this reason an AB' signal will occur 37 microseconds after the INT signal and will last for 11 microseconds (see FIG. 3a). AND gate 187 will therefore always be activated by the presence of the timing pulse AB' 37 microseconds after an initiate operation has occurred, so that output 208 thereof will cause activation of OR gate 181 at its input 177. Additionally, the AND gate 187 output 208 will be supplied as the upper input 221–225 to each of the AND gates 191–195.

Because of the above connections, the first flip-flop 171 will always change its state after an initiate operation, and each of the other flip-flops (172–176) will change their states if the just preceding (i.e., left-hand) flip-flop changes from its one state to its zero state. For example, if flip-flop 171 is in its one state when the initiate operation occurs, then during (the last 11 microseconds of) the 24 microsecond interval starting 24 microseconds thereafter, input 211 to the flip-flop (171) will cause it to be reset to its zero state. At the same time the actuation of AND gate 191 (because of the presence of a signal at both of its inputs 221 and 171a) will cause the output of this AND gate to actuate OR gate 182 at its upper input 242 and therefore change the state of flip-flop 172. If flip-flop 172 was in its one state prior to this change, then a pulse at 172a will be generated so as to cause AND gate 192 to generate an output, thereby actuating the upper input 243 of OR gate 183. This will cause the next higher flip-flop (173) to be made to change its state. Thus, for each of those flip-flops 171–175 which are in their one state and are changed to their zero state, their upper carry output 171a–175a will cause the associated AND gates (191–195) to be actuated so that the outputs thereof actuate the next succeeding flip-flop (172–176) through the upper inputs 242–246 of OR gates 182–186. As may readily be understood by one skilled in the art, AND gates 191–195 and their associated inputs and outputs will therefore cause the actuation of such of those OR gates (182–186) as is necessary to cause each of the flip-flops 172–176, which follow a flip-flop which changes from its one condition to its zero state, to change their state. The overall effect of this operation is therefore to cause the initiate number counter as represented by flip-flops 171–176 to assume the next higher binary number whenever a signal is present at both inputs 188 and 198 of AND gate 187. In this manner the initiate number counter is caused to count up one unit subsequent to an initiate operation.

The initiate signal at 206 (without any delay) is directly supplied at input 217 of OR gate 218. The output 219 of this OR gate is supplied as the lower input 230 to each of AND gates 251–256. The upper inputs 231–236 to each of AND gates 251–256 are supplied from the corresponding zero contents output (171c–176c) of respective flip-flops 171–176 over leads 261–266. The outputs of AND gates 251–256 will therefore be positive as soon as an initiate (INT) signal is present if the corresponding flip-flop 171–176 is in its zero state, but will be negative (or zero) for each of those AND gates 251–256 for which the corresponding flip-flop is in its one state. In other words, the output 251' of AND gate 251 will be positive during the presence of INT signal if and only if flip-flop 171 is then in its zero state; similarly, the output 252' of AND gate 252 will be positive if flip-flop 172 is in its zero state, and so on for outputs 253'–256' of AND gates 253–256 according to whether flip-flops 173–176 are in their zero state or not. Each of these outputs 251'–256' is shown as being connected to initiate counter (INC) BUSS No. 1 (labelled 250). The illustration of INC BUSS No. 1 is schematic in that this buss is in fact made up of six individual leads, each carrying one of the outputs 251'–256', respectively. As is indicated at the extreme right-hand side of INC BUSS No. 1 (250), this buss is connected to the FIGURE 6 apparatus, which comprises the write register. Thus, every time the INT function is generated, the contents of the flip-flops 171–176 will be introduced over INC BUSS No. 1 to the write register (as shown at the top of FIGURE 6). As previously noted, the INC BUSS No. 1 will actually carry a signal representative of whether or not each of the flip-flops 171–176 is in its zero state. The manner in which this input to the write register is utilized will be more fully explained in conjunction with FIGURE 6.

It should be noted that OR gate 218 has in addition to the INT input at 217, an additional input at 257. Input 257 is applied over lead 258 with the ENF signal 259 from the input and control circuit of FIGURE 3 whenever this end of frame signal exists. As previously described in conjunction with FIGURE 3, this ENF signal will be present during the period, subsequent to the scanning operation, in which the final particle counting operation takes place. This sustained signal will therefore cause OR gate 218 to have a positive output at 219 during the whole end of frame operation, thereby supplying continuously a signal over INC BUSS No. 1 to the write register representative of the contents of the initiate number counter (i.e., the state of each of the flip-flops 171–176). The reason for supplying the contents of the initiate number counter to the write register during the final counting operation will be explained subsequently.

In addition to being supplied to input 257 or OR gate 218, the ENF signal, when present, will also be supplied over leads 258 and 268 to the lower inputs 270 of each of AND gates 271–276. The other inputs to AND gates 271–276 are supplied from the respective zero state content outputs (171c–176c) of the flip-flops 171–176 over leads 261–266 in a manner identical to that described for AND gates 251–256. The outputs 271'–276' of these AND gates (271–276) will therefore have a signal representative of whether or not the corresponding flip-flop (171, 172, etc.) is in its zero state or not in a manner essentially identical to that previously described concerning AND gates 251–256 at their respective outputs 251'–256'. The outputs 271'–276' of AND gates 271–276 are connected to initiate counter (INC) BUSS No. 2 in a manner analogous to that described concerning the corresponding connections to INC BUSS No. 1 INC BUSS No. 2 (referenced 280) is connected, as indicated at the extreme right in FIGURE 4, as an input to the random access memory shown in FIGURE 9. As will be more fully explained hereinafter, the contents of the initiate number counter as given by INC BUSS No. 2 at 280 is used to address the memory during the final count operation accomplished after the scanning operation (i.e., during the end of frame period).

The ENF input at 259 is also connected at the lower input 277 of previously mentioned AND gate 197. The other input 278 of this AND gate 197 is supplied over lead 199 with the timing signal AB', previously mentioned, so that the output 279 of AND gate 197 will be positive during the end of frame period whenever this timing pulse is also present. As will be recalled from the description of FIGURE 3, this timing pulse AB' will be repetitively present during the end of frame operation (for a period of eleven microseconds at a repetition rate of 24 microseconds) so that output 279 will become positive repetitively every 24 microseconds during the final counting operation. This output 279 is connected both to input 178 of OR gate 181, and as the lower input 281–285 of each of AND gates 201–205. The other or upper inputs to these AND gates are supplied with the respective carry or change from zero output 171b–175b of the immediately preceding of the first five flip-flops 171–175. The output of each respective AND gate 201–205 is supplied respectively to the lower input 292–296 of the OR gate (182–186) associated with the input of the following flip-flop (172–176), which contains the next higher or more significant binary digit.

Because of the various, just described connections, the occurrence of the AB' timing pulse during the end of frame period will cause (by actuation of OR gate 181 at input 178) the first flip-flop 171 to be changed from its existing state to its other possible state. In addition, each of those of the succeeding flip-flops which immediately follow a flip-flop which changes from its zero state to its one state will be caused to change their state. For example, assuming that flip-flop 171 was in its zero state, input 171b to AND gate 201 will become positive when flip-flop 171 changes to its one state; and since input 281 is receiving a signal, this will cause the output of AND gate 201 to actuate OR gate 182 over input 292 so as to cause the output at 212 of this gate to change the flip-flop 172 to its other state. Similarly, flip-flop 173 would change its state if and only if flip-flop 172 has been in its zero state and is changed to its one state. Similarly each of the more significant flip-flops will change their state if the just lesser significant flip-flop (i.e., the one immediately to its left in FIG. 4) changes from its zero to its one state, but will not change if the just preceding flip-flop either does not change at all or else changes from its one state to the zero state. Since this operation is the converse or mirror image of the previously described counting up caused by upper AND gates 191–195, it will be seen that the overall effect of lower AND gates 201–205 and their operative connections is to cause the flip-flops 171–176 to count down one unit every time a pulse is present at 279. For example, the binary number 001010 (meaning no one, two, eight and 32-unit digit, but the presence of the four and 16-unit digit; and therefore being equal to the decimal number, twenty) would be counted down to 110010 (presence of one, two, and 16-unit digit only; and, therefore, equal to nineteen). In this example, the one-unit flip-flop 171 would be changed from its zero to one state by operation of OR gate 181. The two unit flip-flop 172 would also be changed to its one state, because AND gate 201 would receive an input from the countdown carry output 171b of the one-unit flip-flop. Similarly, the change from the zero to one state of two-unit flip-flop 172 would cause its carry output 172b to cause AND gate 202 to be actuated. For this reason, four-unit flip-flop 173 would be changed, but in this case the change is from its one state to its zero state. Therefore, the eight-unit flip-flop 174 would not be changed, since its actuation AND gate 203 will not receive any actuating signal at its upper input from count-down carry output 173b (which of course occurs only when the four-unit flip-flop changes from zero to one). Since there is no change in eight-unit flip-flop 174, its count-down carry output 174b is not present; therefore it is obvious that AND gate 204 is not actuated so that sixteen-unit flip-flop 175 is not changed. Similarly, the state of 32-unit flip-flop 176 will, of course, not be changed since the preceding flip-flop 175 undergoes no change of its state. Leads 301–304 connect the zero contents outputs 171c–174c of the first four flip-flops to the inputs of AND gate 307. For this reason the output 308 of this AND gate will become positive or present only when all of the first four flip-flops (171–174) are in their zero state, but will not be present if any of these flip-flops are in their one state. In an analogous manner the zero contents output of flip-flop 176 at 176c is connected as an input to AND gate 309 by lead 306. It should be noted that lead 305, which forms another input to AND gate 309 is not connected to the zero contents output 175c of flip-flop 175, but rather is connected to the one state contents output 175d. Because of these just described connections, the output 310 of AND gate 309 will become positive only when each of the first four flip-flops (171–174) is in its zero state (so that AND gate 307 is actuated so as to supply a positive signal at 308 to AND gate 309) and at the same time flip-flop 175 is in its one state and flip-flop 176 is in its zero state. For this reason the output 310 of AND gate 309 will become positive only when the binary number (000010) equivalent to the decimal number 16 is contained in the initiate number counter made up of flip-flops 171–176. The presence of a signal at this output 310 is utilized to show that the final counting operation (which will follow the scanning operation) is complete, and therefore is termed a cycle-complete signal (CYC). As represented by the numeral 3 following this abbreviation of its function, the CYC signal is connected as an input to the input and control logic circuit of FIGURE 3. Its function, as may be recalled, is to return the end of frame flip-flop 92 in FIGURE 3 to its zero state, thus stopping the repetitive operation of the clock composed of elements 94 and 99–102. Therefore during the final counting operation, when the initiate number counter has been counted back to 16 from the higher number that it would normally contain after a scanning operation, the cycle complete signal will cause the clock to stop thereby stopping the repetitive actuation of the memory timer composed of elements 104–137.

*Operation of initiate number counter*

From the foregoing description of the initiate number counter of FIGURE 4, it may be seen that this counter has two distinct functions. Specifically, these include the supplying of a number (to the write register of FIGURE 6) over INC BUSS No. 1 whenever an initiate (INT) signal is received from the input and control circuit of FIGURE 3. Immediately after the contents of the initiate number counter is supplied to the write counter, the initiate counter will be stepped up to the next higher number by means of the delayed INT signal and timing pulse AB'. The next time an initiate signal occurs, the initiate number counter will therefore apply the next higher number to the write register. As mentioned above and as will be more fully explained hereinafter, the initiate number counter will always start with its contents equal to the number 16. For this reason the initiate number counter will supply number 16 to the write register upon the first occurrence of an initiate signal during the scanning operation, will supply number 17 upon the occurrence of the second INT signal, and so on. It is this mechanism which causes the association with the first particle counted of number 16, the association of the number 17 with the next apparently separate particle (or discontinuous train), and so on, as may be seen in FIGURE 11.

The other major function of the initiate number counter is performed during the end of frame period following the scanning period. During the scanning period, the initiate number counter will be conuted up from 16 to a number one higher than the last number utilized for labelling trains. Thus if FIGURE 11 represented the entire field actually scanned, the initiate number counter would have supplied to the write register number 21 during the scanning of particle 121, and then would have been made to count up to 22 during the period that started 24 microseconds thereafter by means of the delayed INT signal and the AB' signal. The end of frame (ENF) signal will cause the contents of the initiate number counter to be made available over the previously mentioned INC BUSS No. 1 to the write register, and at the same time will cause the contents to be made available over INC BUSS No. 2 as an address to the object data memory part of the random access store schematically shown in FIGURE 9. Prior to the occurrence of the first timing signal AB', the two busses 250 and 280 will therefore supply to the write register and as an address to the memory, respectively, a number one greater than the highest number utilized for marking trains during the scanning operation. The AB' signal will then cause the flip-flops to count down one, so that the next lower number is then presented to both the write register and random access memory as an address.

As will be explained in more detail hereinafter, the supplying of the number to the address of the memory will cause the contents of that particular address to be fed to the read register so that the number in the initiate number counter (now in the write register) may be compared by the comparison logic circuit (FIGURE 8) with the contents of the object data memory at that address. Since this address is also supplied by the initiate number counter, this process (as will be more fully explained hereinafter) causes the various addresses of the object data memory to be compared with their contents for each of those addresses corresponding to numbers actually used during the scanning operation for marking trains. It is this process which allows the discarding of any numbers (such as 19 and 20 in the FIGURE 11 example) which have been utilized to mark trains later determined to represent parts of the same particle identified by a different number. A complete description of this process must await description of the write and read registers of FIGURES 6 and 7, respectively, and the compare logic of FIGURE 8. However, it might be mentioned here that for all numbers assigned to the trains which did not form junctions during the scanning operation, the object data memory will contain at its address equal to that train number, a contents also equal to that train number (or in other words, the contents of the object data memory at such addresses will equal its address). On the other hand, at those addresses representing numbers utilized for trains which were later determined to form parts of the same particle identified by different train numbers, the contents of the object data memory will be different (specifically, lower) than its address so that the compare logic may determine that these particular numbers should not be counted as separate particles.

In this manner, only those train numbers stored in the object data memory which equal their addresses (and therefore represent actual separate particles) will be counted in the object counter of FIGURE 10. Those train numbers used to identify merged particle parts (contained in non-matching addresses) will not be counted into the object counter, so that, in effect, train numbers representing such merged particle parts are disregarded (or subtracted from the total of train numbers utilized). Since the initiate counter always contains a number one higher than actually used to mark trains, the highest number contained therein should not be counted. For this reason, the object counter is originally set to minus one (or 31 where it is a five-digit binary counter, as illustrated in FIG. 10) so that the first count sets it to zero (i.e. from 11111 to 00000 in binary digits) and only subsequent train numbers will be counted.

Figure 5:
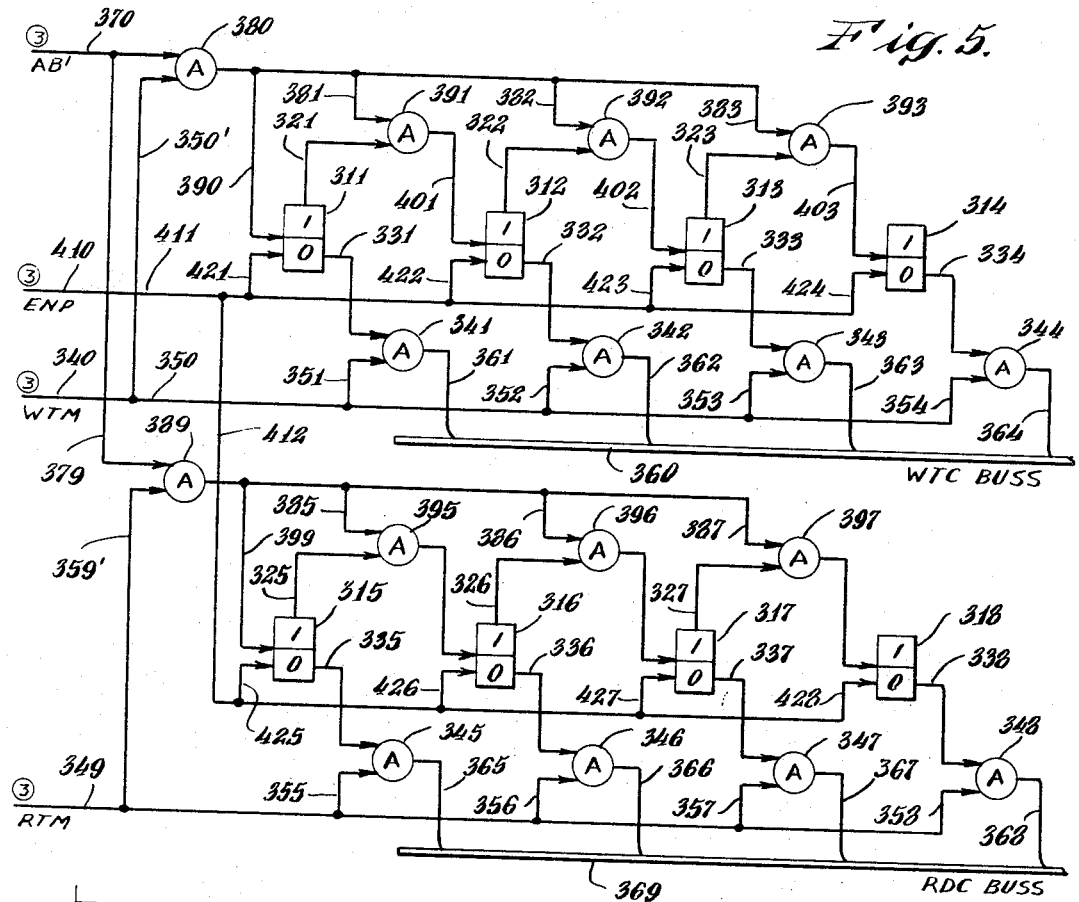
FIGURE 5 is a schematic of the write and read counters.

Write and read counters of FIGURE 5

Both the write counter and the read counter are shown in FIGURE 5. The write counter, in the upper part of this figure, comprises four flip-flops of the counting type 311–314; the read counter includes four similar flip-flops 315–318. Each of flip-flops 311, 312 and 313 include a count-up carry output from the one side, illustrated as emerging from the upper surface of the one side of the flip-flop at 321, 322 and 323. Similarly, the first three flip-flops of the read counter, 315–317 each have a count-up carry output 325–327. In addition, all eight of the flip-flops 311–318 have a contents output representing the condition of the zero side of the flip-flop, which is illustrated as extending from the right side of the lower or zero side of these flip-flops at 311–338, respectively. Each of these contents outputs 331–338 is fed as an input to respective read-out AND gates 341–348. The other inputs 351–354 of read-out AND gates 341–344 are supplied over lead 350 from the write in train memory output (WTM) from FIGURE 3 introduced at 340. Because of these connections, the contents of the write counter flip-flops 331–334 will be supplied to the write counter buss (WTC BUSS) 360 whenever a WTM signal is present at 340. In particular when a WTM signal is present, the outputs of AND gates 341–344 will supply to WTC BUSS 360 an indication of whether or not each of flip-flops 311–314 is in its zero state and therefore the binary number representing the contents of the write counter. As in the case of the busses described in FIGURE 4, buss 360 comprises an individual wire or lead to carry separately each of the outputs 361–364 representing the condition of flip-flops 321–324.

Thirteen microseconds after the occurrence of any WTM signal, an AB' timing signal will be generated by the memory timer of FIGURE 3, and this is supplied to the FIGURE 5 apparatus at input 370. This timing signal is introduced at the upper input of AND gate 380, the lower input of which is supplied with the WTM signal over lead 350'. The output of AND gate 380 is connected by leads 381, 382 and 383 to the upper inputs of count-up carry AND gates 391, 392, 393, the lower input of which supplied by the count-up carry outputs 321, 322 and 323 of flip-flops 311–313. The output of AND gate 380 is additionally fed over lead 390, as the switching input to flip-flop at 311. As previously described in conjunction with the flip-flops of FIGURE 4, an input to a flip-flop represented as extending into its center lines is utilized to indicate that this input will cause the flip-flop to change its state from whichever bi-stable condition it is in to the other bi-stable state. Thus, the presence of the timing signal AB' during a WTM signal will cause the flip-flop 311 to be switched from its existing state to the other state. If flip-flop 311 was just previously in its one state, then an output at 321 representative of a change from a one state to a zero condition will be supplied to count-up carry AND gate 391 during the period that the AND gate 380 output is still present at the other input 381 of AND gate 391. Under such conditions AND gate 391 will have an output at 401 so as to change the state of the succeeding flip-flop 312. In a similar manner if flip-flop 312 is thereby changed from its one state to a zero state, it will acuate carry AND gate 392 so as to cause its output to change the condition of flip-flop 313 by means of lead 402; likewise, a change in the state of flip-flop 313 from one to zero will acuate the output 403 of carry AND gate 393 so as to change the state of flip-flop 314. Thus count-up carry AND gates 391, 392 and 393 operate to cause the binary counter represented by flip-flops 311–314 to count up one when the timing signal AB' occurs during a WTM signal.

The operation of the write counter so far described is more or less self-evident, being similar to, but considerably simpler than, the more complex operation of the initiate number counter of FIGURE 4. Thus, whenever a WTM signal is present, the contents of flip-flops 331–334 will be supplied over leads 361–364 to the four-wire WTC BUSS 360 as an input to the FIGURE 9 memory circuit as a train number memory address, so as to determine where a train number will be temporarily stored, as will be subsequently moe fully explained. Thirteen microseconds after the start of the WTM signal, the occurrence of the AB' timing signal will cause actuation of the AND gate 380 and the resulting stepping up of the appropriate ones of the flip-flops 311–314 of the write counter. The next WTM signal will therefore cause writing in the train number memory at the next higher numbered address.

The structure and operation of the read counter shown in the lower part of FIGURE 5 is almost exactly analogous to that of the write counter except for the signal which will actuate it and the use of its final output. To indicate this correspondence, each of the elements in the read counter which are analogous to elements in the write counter are merely labelled by the use of reference numerals four greater. Thus, flip-flops 315–318, their zero contents outputs 335–338, read-out AND gates 345–348, and the count-up carry outputs 325–327 of the first three flip-flops (315–317) all correspond to the analogous parts of the write counter. In addition, count-up carry AND gates 395–397, their output connections as the switching inputs 405–407 to flip-flops 316–318, and the outputs 365–368 of AND gates 345–348 also correspond to those elements of the write counter which are labelled with numbers four lower.

The basic difference between the write and read counters therefore comprises only the original actuating inputs and the final disposition of the outputs thereof. Thus, the outputs 365–368 of AND gates 345–348 are fed to a four-lead cable or buss at 369, which may be termed the read counter buss (RDC BUSS), utilized as a different input to the train number memory (as an address) in FIGURE 9. Additionally, the lower inputs to read-out AND gates 345–348 (the upper inputs being supplied by the zero contents outputs 335–338 of flip-flops 315–318) are supplied by the read train memory (RTM) signal of FIGURE 3, introduced as an input at 349 in FIGURE 5. Since these lower inputs to AND gates 345–348 are the same in structure (and analogous in function) to the lower inputs of the write counter AND gates 341–344, these lower inputs to AND gates 345–348 are numbered 355–358. Thus, the presence of this RTM signal over lead 359 at inputs 355–358 of AND gates 345–348 will cause the contents of the read counter flip-flops 315–318 to be made available at the RDC BUSS 369.

The RTM signal will also be supplied by lead 359' to the lower input of AND gate 389, the upper input of which is supplied with the AB' input by lead 379. For this reason the occurrence of the AB' signal (which always occurs 13 microseconds after the start of an RTM signal) will cause the output of AND gate 389 to be supplied as a switching input at 399 to flip-flop 315 and in addition as the upper input (385–387) to each of the respective count-up carry AND gates 395–397. Therefore the occurrence of the AB' signal will cause the read counter flip-flops 315–318 to count up one immediately after the RTM signal has occurred.

It should be noted that each of the write and read counters contain only four flip-flops, and therefore are capable of representing only sixteen different numbers (namely, 0–15). Each of these two counters is utilized solely to supply addresses to the random access memory of FIGURE 9 during the scanning operation. Thus, the read and write counters are capable of giving addresses for only the first sixteen positions in the random access memory. Since the illustrated embodiment is assumed to have a memory capacity of 64 different positions or addresses (each of which is capable of containing any number up to 64), it will be immediately apparent that the write and read counters can never allow access to those addresses of the random access memory greater than 15. As will be explained more fully hereinafter, the reason for this is that it is only the first 16 addresses (0–15) that are utilized during the scanning period to keep track of the various trains being scanned at any one time, this part of the memory being schematically illustrated (see FIGURES 1 and 9) as the "train member memory" 9a. The remaining 48 addresses or locations of the random access memory form the "object data memory" 9b which is utilized to store indications of junctions between parts of the particle previously assigned different numbers (e.g., junctions of branches of the particle 117 in FIGURE 11). Thus the previously utilized terms "write in train memory" (WTM) and "read from train memory" (RTM) have referred to writing and reading operations in the train number memory or first 16 locations of the entire random access store 9, the last 48 locations being termed the "object data memory" part of the entire memory or store.

The function of the write counter is to supply a train number memory address (from 0 to 15) which is one higher than that previously utilized to store temporarily that number corresponding to the train just ending in the $i$ line (at such points as 140 in the II line scan and 143 and 144 in the III line scan in FIGURE 11). The function of the read counter is to supply the address at the beginning of every train in the $i-1$ line (such as point 123 during the III line scan and points 141 and 145 during the IV line scan in FIGURE 11) at which the train number information stored will be read out from the train memory. In order to insure that the write and read counters both start at zero at the beginning of the scanning of the object field, both are reset back to zero by means of the end pulse (ENP) at input 410 in FIGURE 5, supplied from the input and control logic circuit of FIGURE 3 (and actually originating from the scanner of FIGURE 2). This ENP signal is fed over leads 411 and 412 as a resetting pulse to the zero input 421–428 of each of the flip-flops 311–318. These resetting inputs will cause each of the flip-flops to be reset to their zero state after the entire scanning operation is completed so as to be prepared to start from zero for the next scanning operation (which will be preceded by a final counting operation for the scanning operation just completed).

Write register of FIGURE 6

The write register, shown in FIGURE 6, comprises a series of six flip-flops of the noncounting type (i.e., of the same type as utilized at 62, 104, 105 and 106 in the input and control logic of FIGURE 3). Each of these bistable flip-flops 431–436 has an output from the one side (at 441–446) as well as from the zero side (at 451–456). The one outputs 441–446 form six of the leads (461–466) to a twelve-lead cable which comprises the write register buss No. 1 (WTR BUSS No. 1) at 460. The outputs from the zero side (451–456) of these flip-flops form the other six leads of the twelve-lead cable or buss 460, and are also supplied by leads 471–476, respectively, as lower inputs to the corresponding one of both sets of readout AND gates 481–486 and 491–496. Because of the connections so far described, the contents of flip-flops 431–436 will be supplied continuously to the twelve-lead WTR BUSS No. 1 at 460 to the compare logic of FIGURE 8, to be described hereinafter.

Additionally, the contents (as represented by the presence or absence of an output at the zero side of the flip-flop outputs) will be presented to each of AND gates 481–486 and to AND gates 491–496. Because of these latter connections, WTR BUSS No. 2 at 490 (which is a six-lead cable or buss leading to the memory circuit of FIGURE 9) will be supplied with the contents of the flip-flops whenever the upper inputs 501–506 of readout AND gates 481–486 are supplied with a signal. Such a signal will be present over lead 500 whenever the change write register (CHW) signal from the compare logic circuit of FIGURE 8 is present at input 509. Similarly the contents of the flip-flops, as represented by their zero output state, will be supplied to WTR BUSS No. 3 whenever the upper input of the second set of readout AND gates 491–496 are energized. Specifically, these upper inputs 521–526, being connected to the output lead 520 of OR gate 527, will be energized when either a change read (CHR) signal is present at input lead 528 from the compare logic circuit of FIGURE 8, or when the previously described write train memory (WTM) signal is present at input 529 from the input and control logic circuit of FIGURE 3. Because of last-mentioned connections, the contents of flip-flops 431–436 will be gated to WTR BUSS No. 3 at 530 whenever either of the CHR or the WTM signals are present. WTR BUSS No. 3 is a six-lead cable or buss leading to the memory inputs of FIGURE 9, as will be subsequently explained.

Thus the contents of the flip-flops forming the write register are continuously supplied as an input to the compare logic over WTR BUSS No. 1 at 460, which is a twelve-lead cable; are supplied as an address to the memory of FIGURE 9 over WTR BUSS No. 2 at 490 whenever a CHW signal is present from the compare logic circuit of FIGURE 8; and are supplied over WTR BUSS No. 3 at 530 whenever either a CHR signal from the compare logic of FIGURE 8 or a WTM signal from the input and control logic of FIGURE 3 is present.

The inputs to the write register flip-flops may come from either of two cables or busses, shown at the top of FIGURE 6. The first of these input busses is the INC BUSS No. 1, labelled 250, which is one of the outputs from the initiate number counter of FIGURE 4, previously described. As may be recalled from the description of FIGURES 3 and 4, the INC BUSS No. 1 at 250 represents the contents of the initiate number counter whenever either an initiate (INT) or an end of frame (ENF) signal has been supplied to the FIGURE 4 circuit. The various leads 531–536 emerging from the INC BUSS No. 1 represent, respectively, the least to the greatest or most significant binary flip-flop outputs from the initiate number counter. In other words, lead 531 is in actuality a continuation of lead 251' (see FIGURE 4); lead 532 is the continuation of lead 252' in FIGURE 4, etc. The contents of the initiate number counter as represented by the signals carried by leads 531–536 is fed as the lower input to a series of input OR gates 541–546 respectively.

The other input to the write register circuit of FIGURE 6 comprises the read register output buss No. 2 (RDR BUSS No. 2) designated 550, which is one of the outputs from the read register of FIGURE 7. This RDR BUSS No. 2 will carry a signal representing the contents of the read register only when a transfer signal (TFR) from the compare logic circuit is also present (as will be explained in the description of FIGURES 7 and 8 hereinafter). At present it is sufficient to note that whenever a signal is carried by the RDR BUSS No. 2 at 550 in FIGURE 6, it will represent the contents of the read register and will be supplied as a possible input to the write register. Specifically leads 551–556 will carry respectively (when they are carrying an operative signal) an indication of the contents of the least through the most significant of the binary flip-flops forming the read register of FIGURE 7. Thus the outputs 561–566 of OR gates 541–546 will carry signals representative of the contents of the initiate number counter whenever an initiate (INT) signal is present during the scanning period and continuously during the end of frame (ENF) interval, or whenever a transfer signal (TRF) is present in the scanning period, a representation of the contents of the read register.

Since each of the busses 250 and 550 (and in fact all of the busses so far described except for WTR BUSS No. 1 at 460, described with reference to this FIGURE 6) only carry a signal representing the state of the zero side of the flip-flops of the initiate number counter and the read register, respectively, these signals may not be directly utilized to set the write register flip-flop 431-436 to corresponding states. In other words, the absence of a signal at lead 561 during an initiate, end of frame or transfer operation necessarily means that the least significant flip-flop of the initiate number counter or read register, as the case may be, is in its one state; but this signal cannot be used directly to set flip-flop 431 in such a one state since there is no signal present at 561 to actuate the flip-flop 431. For this reason leads 561-566 are not only supplied as the upper input to the zero input control AND gates 571-576, but are also supplied, after inversions by negative gates 581-586, as the upper inputs to the one input control AND gates 591-596. The lower inputs to both sets of these input AND gates (i.e., zero input control AND gates 571-576 and one input control AND gates 591-596) are supplied by the output of OR gate 600 over leads 601-606. Input actuating OR gate 600 will have an input so as to potentially actuate each and every one of AND gates 571-576 and 591-596 whenever any of its three inputs are actuated. Specifically, the uppermost input 597 to actuating OR gate 600 will carry the initiate (INT) signal whenever present from FIGURE 3; the middle input 598 will carry a transfer signal (TFR) from FIGURE 8 whenever it is present; and the lowermost input 599 will carry a continuously generated end of frame (ENF) signal from FIGURE 3 during the final counting operation (which follows the completion of the scanning of the entire object field or frame). Thus the initiate, transfer or end of frame signal, when present, will cause both sets of the input control AND gates (571-576 and 591-596) to transfer to its output the signal present at its upper input, if any. Therefore for those leads 561-566 which carry a signal, the corresponding zero input control AND gates 571-576 will be actuated so as to supply at their outputs 611-616 a signal capable of setting the corresponding flip-flops 431-436 to their zero position. Specifically these outputs are led as upper inputs 611-616 to the corresponding zero-setting OR gates 621-626. Therefore the presence at 611-616 of a signal will cause a signal at the corresponding output 631-636, respectively, of the zero-setting OR gates 621-626 so as to set the corresponding flip-flops 431-436 to their zero state.

At the same time (when OR gate 600 is actuated) any of those leads 561-566 which do not contain a signal (and therefore represent flip-flops that are in their one state in either the initiate counter or read register, whichever acts as the source of the signal over the two input busses 250 and 550) will produce, because of the operation of inverters 581-586, an actuation of the outputs of AND gates 591-596. Specifically, for each of those leads 561-566 which contain no signal, a signal will be generated at the output of the corresponding inverter gate 581-586 and therefore at the corresponding upper inputs 641-646 to the one state control AND gates 591-596. Such actuated AND gates will therefore supply output signals over leads 651-656 to the setting input of the one side of the corresponding flip-flop 431-436, so as to set such corresponding flip-flops to their one state.

The final actuating signal to the FIGURE 6 circuit is supplied over input lead 660 and comprises the clear write register (CWR) signal from the input control circuit of FIGURE 3. Whenever this clear write register signal is present, it will be carried by lead 660 to the lower inputs 661-666 of each of the OR gates 621-626 in the zero reset control connection to flip-flops 431-436. Thus the presence of the CWR signal will cause an output for all of these OR gates at 631-636 so as to reset all of the flip-flops 431-436 to their zero state.

The operation of the write register and associated circuits shown in FIGURE 6 is relatively simple and is as follows. Whenever an initiate (INT) signal is present or during the end of frame period (ENF), the INC BUSS No. 1 will supply a representation of the contents of the flip-flops making up the initiate number counter through the input OR gates 541-546 to the input network comprising the two sets of input control AND gates 571-576 and 591-596, inverter gates 581-586, and OR gates 621-626. For each of those leads 531-536 which has no signal (therefore indicating that the corresponding flip-flop of the initiate counter is in its one state), inverter gates 581-586 will supply to the respective associated AND gate 591-596 a signal at its upper input 641-646. Since at the same time the initiate signal is being supplied at input 597 to OR gate 600 or else the end of frame period is being indicated by the presence of a continuous signal at input 599 to this OR gate, each of AND gates 591-596 corresponding to those flip-flops in the initiate number counter which are in their one state will contain a positive output so as to set the corresponding flip-flops 431-436 to their one state by means of the signal supplied over leads 651-656, respectively. At the same time the INT signal or the continuous ENF signal will also cause activation of the lower inputs of the zero control AND gates 571-576 over leads 601-606. Therefore, for each of input leads 531-536 which carry a signal (indicating that the corresponding flip-flop of the initiate number counter is in its zero state), the corresponding AND gate 571-576 will be actuated to supply over lead 611-616 an input to the corresponding OR gate 621-626, so as to reset the corresponding flip-flop 431-436 to its zero state by means of the input lead 631-636. Thus, whenever an initiate (INT) or end of frame (ENF) signal is present, the flip-flops (431-436) will be positively driven either to their one or zero state so as to assume the value of the corresponding flip-flop in the initiate number counter. Therefore, these flip-flops of the write register will act to temporarily store the value of the initiate number counter in binary form.

In a similar manner, whenever a transfer signal (from the compare logic circuit of FIGURE 8) is present at input 598 of OR gate 600, the flip-flops 431-436 of the write register will be driven so as to correspond to the flip-flops (soon to be described) of the read register of FIGURE 7, by means of the signals present on the individual leads 551-556 of RDR BUSS No. 2 at 550, which leads carry signals representative of the conditions of each of the flip-flops in the read register. The presence of a clear write register (CWR) signal on lead 660 will cause an input to each of OR gates 621-626 over input leads 661-666 so as to cause the outputs 631-636 of these OR gates to reset all of the flip-flops 431-436 to their zero state regardless of their condition prior to this CWR input signal.

In sum, an initiate (INT) signal during the scanning operation or the presence of the end of frame (ENF) signal (indicating that the scanning operation is finished so as to cause the final counting operation) will cause the write register flip-flops to assume the values of the initiate number counter. On the other hand, a transfer signal (TFR) (which will occur only during the scanning operation as will be subsequently explained) will cause a transfer of the contents of the read register (FIGURE 7) to the write register. Finally, the presence of a clear write register signal (CWR) will cause the flip-flops of the write register to be all reset to zero.

The outputs from the write register are of two types. First, there is the twelve-lead WTR BUSS No. 1, the individual leads of which directly carry not only each of the zero state outputs of flip-flops 431-436, but also each of the outputs of the one state of these flip-flops. For this reason the twelve-lead cable or buss 460 will constantly carry a representation (somewhat redundant) of the state of each of the flip-flops at all times. This WTR BUSS No. 1 is connected as one of the two major or informational inputs to the compare logic of FIGURE 8, the utilization of which will be described subsequently. On the other hand, the output cable designated WTR BUSS No. 2 at 490 does not always carry an indication of the contents of the write register flip-flops 431–436. Rather it will carry a signal representing whether each of the write register flip-flops are in their zero state only when a change write register (CHW) signal is present at input 509 so as to actuate the upper inputs 501–505 of the readout AND gate 481–485. Whenever this CHW signal is supplied by the compare logic circuit of FIGURE 8 (in a manner to be described hereinafter), the WTR BUSS No. 2 will carry on its individual six leads a signal representing whether each of the flip-flops 431–436 is in its zero state. This signal is introduced as a memory addressing input to the random access store shown in FIGURE 9. In other words, whenever the CHW signal is present the contents of the write register flip-flops will be supplied to the memory store of FIGURE 9 as an address so as to make that address available for putting information in the store at that location. In particular the contents of the read register would then be stored at the memory address given by the write register. The significance of this operation will be described later. In an analogous manner the six-lead WTR BUSS No. 3 will carry a representation of the contents of the write register flip-flops 431–436 whenever either a change read register signal (CHR) or a write in train memory (WTM) signal is present at the inputs 528, 529, respectively, of OR gate 527. The presence of either of such signals will actuate the upper inputs (over leads 521–526) of all of the output AND gates 491–496 so as to allow passage on the individual leads of buss 530 of a signal representing whether or not each of the flip-flops 431–436 is in its zero state. The WTR BUSS No. 3 is connected as an input to the memory store of FIGURE 9 as indicated in that figure. In particular, it is utilized to feed the contents of the write register into one of the locations or addresses of the memory (which is given by the contents of the read register during a CHR signal, as will be later described, or by the write counter of FIGURE 5 during a WTM signal).

Thus, the WTR BUSS No. 2 and the WTR BUSS No. 3 cables differ not only in what operational signal (at 509 and at 528, 529, respectively) will cause them to carry the information representing the contents of the write register, but also in their ultimate utilization even though both of these busses are connected to the memory. In particular, the WTR BUSS No. 2 is utilized only for supplying addresses to the memory so as to choose a location upon the appearance of a change write register (CHW) signal, while the WTR BUSS No. 3 will supply the contents of the write register flip-flops to the memory for utilization as an actual storage input for a particular location or address (supplied by another input) whenever a change read register (CHR) or a write in train memory (WTM) signal is present. The significance of the operations caused by the CHW, CHR, and the WTM signals will be more apparent after the remaining parts of the apparatus have been fully described.

Read register of FIGURE 7

The read register, shown in FIGURE 7, has somewhat analogous structure to the write register of FIGURE 6. Thus the read register proper comprises a series of six flip-flops of the noncounting type, shown at 681–686. As in the corresponding flip-flops 431–436 of the write register (FIGURE 6), the read register flip-flops 681–686 have inputs such as to set the flip-flops to either their zero or one state and outputs indicating the condition of both their zero and one states or sides. The memory readout buss (MRO BUSS) at 690 is a twelve-lead buss or cable, carrying an output from the random access memory of FIGURE 9 indicating the contents of a particular address therein. In particular, this memory output buss 690 will carry on its twelve leads either an indication of zero on leads 691–696, or else an indication of one on its respective leads 701–706 for each of the six binary bits of information that may be contained in any given location or address of the random access memory. For example, if the number 20 were being read out of the contents at a particular memory address or location, then both of leads 691 and 692 (representative of the one and two unit binary bits) would carry a signal to indicate that the contents of the memory at this particular location contains a zero in the least two significant binary bit positions. On the other hand, the third lead 693 would not carry any signal but rather the lead 703 (representing the binary "yes" or one bit in the four-unit bit or position in the binary code number) would carry a signal. Similarly lead 694 (but not 704) would carry a signal indicating that the eight-unit binary bit was a zero. The fourth pair of leads would have a signal on output 705 to indicate that the fifth (i.e., the 16-unit binary) bit was a one or present, and the paired zero lead 695 would have no signal. Finally it would be the lead 696 rather than lead 706 which contained a signal, since the sixth binary position (representing the 32-unit bit) would be zero or not present.

For convenience of terminology each of the leads 691–696 will be referred to as the "no," "zero" or "absence" lead, while each of the leads 701–706 will be referred to as the "yes," "one" or "presence" lead or input, since these leads indicate whether an actual bit (i.e., the value one) is absent or present in each of the binary bit locations making up the word at the particular memory location or address. Each of the absence or zero input leads 691–696 are fed to a corresponding absence input control AND gate 711–716 as its upper input. In a similar manner, each of the presence or one input leads 701–706 is fed as an upper input to the presence input control AND gates 721–726. The lower inputs to each of AND gates 711–716 and 721–726 are supplied from the output of input operation control AND gate 720, having inputs at 727 and 728. The input at 727 is the strobe signal (STB) from the input and control logic circuit of FIGURE 3; and the signal fed to input 728 of AND gate 720 is the timing pulse C derived from the memory timing portion 170 of the input and control logic (FIGURE 3). Therefore, when both the strobe signal and the timing pulse C are simultaneously present at the inputs to AND gate 720, the output at 729 thereof will become positive. This positive output signal at 729 is supplied both to the lower or actuating inputs 731–736 of the absence or zero input control AND gates 711–716 and also at the same time to the lower or actuating inputs 741–746 of the presence or one input control AND gates 721–726. Because of these connections the contents of the memory output of FIGURE 9 will be transferred to the read register flip-flops 681–686 by the presence of a signal at one of each of the pairs of outputs of the AND gates, namely, 751 or 761, 752 or 762, 753 or 763, etc. Signals at any of outputs 751–756 will set its controlled flip-flop to the zero state, and output signals at 761–766 will set the flip-flop to the one state. Because of the preceedingly described input network to flip-flops 681–686, the contents of the particular chosen memory address, which is therefore available at the memory output of FIGURE 9, will be transferred in binary form so as to be registered by flip-flops 681–686 whenever the timing pulse C occurs during the time that a strobe signal is also present.

As may be seen in the lower part of FIGURE 7, the outputs of the read register flip-flops 681–686 are somewhat analogous to those of the write register of FIGURE 6. In particular, the twelve-lead read register buss No. 1 (RDR BUSS No. 1) at 770 will constantly carry a signal representative of the condition of both side or states of each of the flip-flops 681–686. Thus, each of leads 771–776 will carry a signal whenever the corresponding associated flip-flop (of 681–686) is in its one state, while each of leads 781–786 will carry a signal whenever the associated flip-flop is in its zero state. Because of these connections the read register buss No. 1 (at 770) will carry on its twelve leads a signal representing (with redundancy) the condition of each of the flip-flops 681–686. As indicated at the right of FIGURE 7 this read register buss No. 1 is connected as an input to the compare logic of FIGURE 8. In fact, as may be seen from a brief glance at FIGURE 8, this read register buss No. 1 (RDR BUSS No. 1) forms, along with the previously described write register buss No. 1, the two major informational inputs to the compare logic of FIGURE 8. How the information contained in the read register buss No. 1 (i.e., representation of the contents of the read register) is utilized in the compare logic circuit will be described in the next section.

In addition to the direct connection of the zero side outputs 781–786 to the read register buss No. 1, the same zero side outputs are applied over respective leads 791–796 as the lower input to three series of output control AND gates 801–806, 811–816, and 821–826. The upper or actuating input to each of AND gates 801–806 is supplied at 831–836 when a transfer (TFR) signal is present at input 800. As previously mentioned, this transfer signal is generated by the compare logic of FIGURE 8, and its significance will be more fully described hereinafter. Thus the presence of a transfer signal will cause actuation of the AND gates 801–806 so as to allow the passage therethrough and to the respective outputs 841–846 of a signal if the corresponding flip-flop 681–686 is in its zero state. Therefore the read register buss No. 2 (RDR BUSS No. 2), which has been previously referred to in the description of FIGURE 6, indicated at 550, will carry a signal on its six leads representative of whether or not each of the flip-flops 681–686 is in its zero state. Thus, the read register buss No. 2 will supply to the write register (as previously described) a signal representative of the contents of the read register whenever a transfer signal is present at input 800. As may be seen by reference back to FIGURE 6 a transfer signal will therefore take the contents of read register (i.e., flip-flops 681–686) and store them in the write register (i.e., flip-flops 431–436).

The presence of a change read register signal (CHR) at input 850 to the read register output control network will cause actuation of each of the upper inputs 851–856 of AND gates 811–816 so as to supply at the outputs thereof (at 861–866) an indication of the presence or absence of the zero state of each of the flip-flops 681–686. The combined outputs 861–866 will form another six-lead cable or buss, namely the read register buss No. 3 (RDR BUSS No. 3) at 860. This read register buss No. 3 is supplied as an addressing input to the random access store of FIGURE 9 whenever the change read register signal is present, as will be subsequently described.

Finally, the upper or actuating inputs of AND gates 821–826 are supplied from input 870 with a signal over individual input leads 871–876 whenever a change write register signal (CHW) is supplied by the compare logic of FIGURE 8. Whenever such a change write register signal occurs, the outputs 881–886 of AND gates 821–826 will carry an indication of whether each of the respective flip-flops 681–686 is in its zero condition or state. These signal outputs 881–886 together form a six-lead cable or buss indicated at 880, which may be termed the read register buss No. 4 (RDR BUSS No. 4). This read register buss No. 4 is then supplied as one source of the possible inputs to the memory or store of FIGURE 9 for storage therein (at an address or location chosen by the write register buss No. 2 at 460) whenever a change write register signal is generated. In an analogous manner the read register buss No. 3 at 860 will supply the address for storage of the binary number carried by write register buss No. 3 at 530 wheneve a change read register signal is generated. The significance of the operations just described, which will occur on either a change write register or change read register signal being supplied from the compare logic, will become apparent when the compare logic and memory circuits of FIGURES 8 and 9 are subsequently described.

Reviewing the relatively simple functions of the read register circuit of FIGURE 7, it may be noted that the sole input to the register proper (i.e., flip-flops 681–686) is the memory output as introduced over the twelve-lead memory readout buss 690. This input will be read into the read register flip-flops only during the period that a strobe signal is present and will be timed by the memory timing pulse C. It might be noticed that, since the strobe signal is present (see FIGURE 3) during the read train memory (RTM) signal and during the entire end of frame (ENF) interval, the read register will receive information from the memory or store during the scanning operation only when requested to do so by the read train memory (RTM) signal but will be potentially connected to the memory output during the entire end of frame period. However, since the timing pulse C must also be present in order for the memory output to be supplied to the read register flip-flops, the read register will in fact receive the memory output only during the repetitive short intervals that the memory timing pulse C is present during the final count in during the end of frame interval. Again, fuller explanation of this will be given after a description of the remaining circuit in FIGURES 8 and 9.

The first of the possible outputs of the read register (namely, the read register BUSS No. 1 at 770) is constantly connected to all outputs of flip-flops 681–686 and to the input compare logic of FIGURE 8 so as to render available the contents of the read register for comparison with the contents of the write register, as will be described hereinafter. The first of the switched outputs of the read register (namely, the read register BUSS No. 2 at 550) is connected to the input of the write register so as to cause the contents of the read register to be available thereto whenever a transfer signal occurs. The read register BUSS No. 3 is connected as an addressing input to the memory or store of FIGURE 9 whenever a change read (CHR) signal is generated by the compare logic of FIGURE 8, so as to choose the address at which the contents of the write register (over write register BUSS No. 3) will be supplied as an input to the memory store. Finally the read register BUSS No. 4 at 880 will be supplied as an input to the memory whenever the compare logic generates a change write (CHW) signal so as to store at the address given by the contents of the write register (over write register BUSS No. 2) the contents of the read register. Although the exact significance of the transfer, change read register, and change write register operations will be more apparent after a full description of the compare logic circuit of FIGURE 8, it should be noted that all three of these operations are directed towards the problem of determining of junctions in the particles being scanned (such as occurs between branches 117' and 117" in lines VIII and IX of FIGURE 11).

Compare logic of FIGURE 8

The two major or informational inputs to the compare logic of FIGURE 8 are the write register BUSS NO. 1 at 460 and the read register BUSS NO. 1 at 770. As previously described, write register BUSS NO. 1 will constantly carry on its twelve leads a somewhat redundant indication of the contents of the write register at all times. Since the leads in FIGURE 8 from this buss 460 are really nothing more than continuations of the leads into the same buss in FIGURE 6, the same reference numerals (namely 451–456 and 461–466), are used to indicate the same leads in both figures. However, in order to make the inputs to the compare logic network (which comprises all of the various types of gates between the write register BUSS NO. 1 and read register BUSS NO. 2 in FIGURE 8) enter at the left so as to conform to the general scheme utilized throughout the drawings, it is necessary to illustrate the original inputs over leads 451–456 and 461–466 as being in inverse order from left to right. Thus, it should be noted that leads 456 and 466 leaving the write register BUSS NO. 1 on the left-hand side of the drawing represent the most significant or highest binary flip-flop of the write register shown in FIGURE 6. Similarly the individual leads from the read register BUSS NO. 1 at 771–776 and 781–786 also are in inverse order from left to right so as to indicate that it is the highest or most significant flip-flop output that is shown at the left in FIGURE 8, in contradistinction to the opposite arrangement of the illustration of the read register itself in FIGURE 7.

It may be recalled that lead 456 from the write register BUSS 460 will carry a signal whenever the most significant flip-flop to the write register is in its zero state, while lead 466 from the one side of the same most significant flip-flop will carry a signal whenever that flip-flop is in its one state. Similarly, each of the zero output leads 455–451 will carry a signal when the corresponding flip-flop of the write register is in its zero state, while its paired one output lead 465–461 will carry a signal if the flip-flop is in its one state. The branch lead 901–903 from each of the three most significant zero output leads 456–454 from the write register flip-flops are connected as inputs to a first uppermost AND gate 907. In a similar manner a branch lead 904–906 from each of the three lesser significant zero output leads 453–451 is connected as an input to a second upper most AND gate 908. AND gate 908 has an additional input at 909 which is the output of the first AND gate 907. It is obvious that only when there is a signal on all three of the three most significant zero inputs 454–456 from the write register will AND gate 907 have a positive output. Similarly the output 910 of the second AND gate 908 will contain a signal only when the three lesser significant zero outputs 451–453 are simultaneously carrying a signal and in addition there is a signal present at 909 (which means that all of the most significant zero outputs are also carrying a signal). Thus, the final output 910 of the second AND gate 908 will be present only when all of the zero output leads from the write register simultaneously carry a signal, so that this output 910 indicates a zero-ed or empty write register. It may be mentioned that the more straightforward utilization of a single AND gate with each of the six branch leads 901–906 being utilized as an input would obviously be equiavlent to the elements 907–909, the illustrated arrangement being utilized solely as a way of avoiding utilizing and AND gate requiring six inputs.

The remaining AND, inverter and OR gates shown in FIGURE 8 between the write register BUSS NO. 1 (at 460) and the read register BUSS NO. 1 (at 770) comprise two very similar horizontal rows of gates. In fact, as will be seen subsequently, each of these rows is exactly analogous to or, in a sense, a mirror image of the other row. Thus the first lower AND gate 911 has as its two inputs the most significant zero output 456 from (the highest valued flip-flop of) the write register and the most significant one output 776 from the highest valued flip-flop of the read register. Conversely, the first upper AND gate 921 has as one of its two inputs the one output lead 466 from the most significant flip-flop of the write register, and as the other lead the zero output lead 786 from the most significant flip-flop in the read register. The output 931 of the lower AND gate 911 will therefore be positive or contain a signal only when the most significant flip-flop of the write register is in its zero state and the most significant flip-flop of the read register is in its one state. Under such conditions it is always necessarily true that the number represented by the contents of the read register must be larger than the number represented by the write register. This is of course intrinsic in the binary system of representing numerical quantities (as indeed it is true of most systems, including the conventional decimal system). Similarly a signal at the output 941 of the upper AND gate 921 will occur if and only if the most significant flip-flop (and therefore the entire contents of the write register) is larger than the contents of the most significant flip-flop of the read register. Therefore if the most significant flip-flop in either the write register or the read register is different from the most significant flip-flop in the other register, either output 931 or output 941 will contain a signal (but never both). On the other hand, if both of the most significant flip-flops in the read and write registers are in their zero state, or if both are in their one state, there will be no output at either 931 or 941.

Since the purpose of the compare logic is basically to determine whether there is a difference between the contents of the write register and the read register (and if so which is the larger), the presence of a signal at either 931 or 941 is in itself a complete answer to the question. Thus, if the most significant of the flip-flops of the write register and read register differ, no additional information is necessary to determine which is the larger. For this reason the outputs at 931 and 941 are brought out to the right of FIGURE 8 by passing through a series of OR gates (952–956 and 962–966). Specifically, output 931 of the lower AND gate 911 is introduced as the upper input to OR gate 952 as shown at 971. The output at 992 of the first lower OR gate 952 is fed as an input 972 to the next OR gate 953, the output 993 of which is fed over lead 973 to OR gate 954. Similarly, the output 994 of OR gate 954 is fed as input 974 to OR gate 955, the output 995 of which is fed as input 975 to the final lower OR gate 956. Because of these connections of OR gate 952–956, the output 960 of the last lower OR gate 956 will contain a signal whenever there is one at the input 971 of the first OR gate 952 or, in other words, whenever there is an output at 931 from the first AND gate 911. Thus, a signal will appear at the final lower OR gate output 960 whenever the most significant flip-flop of the read register has larger contents than the most significant flip-flop of the write register (i.e., the read register most significant flip-flop is one while the write register most significant flip-flop is zero). In an exactly analogous manner the fact that the output 941 from the first upper AND gate 921 is fed over input lead 981 to the first upper OR gate 962 causes the output of this OR gate to supply a signal over lead 982 to the second upper OR gate 963. Similarly, input lead 983 to OR gate 964, lead 984 to the lower input of OR gate 965, and lead 985 to the lower input of the last upper OR gate 966 will cause the signal to be transmitted to the output 970 of this final OR gate. Thus whenever an output appears at 941 from AND gate 921 (signifying that the most significant flip-flop of the write register is greater than the contents of the most significant read register flip-flop), this signal will be carried directly through the upper series of OR gates so as to present at the final output 970 of the last OR gate 966 a signal indicating that the write register is larger than the read register.

The output 931 of the first lower AND gate 911 is also connected by lead 991 as an input to the first upper inverter gate 1021. The output of this inverter at 1041 is fed as an input to AND gate 922. The other two inputs to AND gate 922 comprise the one output 465 of the second most significant (i.e., the 16-unit bit) flip-flop (435, see FIGURE 6) of the write register, and the zero output lead 785 from the second most significant flip-flop (685, see FIGURE 7) of the read register. Since the output 1041 of inverter gate 1021 will become positive only when there is no signal present at its input lead 991 (and therefore no signal present at the output 931 of AND gate 911), AND gate 922 can be actuated only if AND gate 911 has not already determined that the contents of the read register is necessarily larger than the contents of the write register. In other words the presence of a signal at 931, indicating that the read register necessarily is larger than the write register contents, will inhibit operation of AND gate 922. For this reason the output 942 of AND gate 922 will carry a signal only when three conditions exist. Thus, not only must the second significant flip-flop in the read register be zero cated by input 785) and at the same time the most significant flip-flop of the write register contain a one (as indicated by input 465) but at the same time the contents of the most significant flip-flop of the read register cannot be larger than the contents of the most significant of the write register (as determined by the absence of a signal at 941 and therefore the presence of a signal at 1041). Therefore there will be a signal present at the output 942 of the second AND gate 922 if and only if the second significant flip-flop of the write register is larger in contents than the second most significant flip-flop of the read register and at the same time it has been determined that the contents of the most significant flip-flop of the write register is at least as large as the contents of the most significant flip-flop of the read register (i.e., the contents of the most significant flip-flop of the read register is either equal to or smaller than the most significant flip-flop of the write register). Since this necessarily means that the write register must contain the larger number (since the most significant binary bit of the write register is at least as large as the most significant binary bit in the read register and the second most significant write register binary bit is larger than the second most significant binary bit in the read register) an output at 942 necessarily means the contents of the write register is, in fact, larger than that of the read register. Such an indication will carry through the first upper OR gate 962, lead 982 to the next upper OR gate 963 and so on through leads 983–985 and upper OR gates 964–966, so as to result in a signal at the final output 970 of the last upper OR gate 966 of a signal representative of the fact that the write register is larger than the read register.

In a directly analogous manner the output 941 of the first upper AND gate 921 is carried by lead 1001 as the input to the first lower inverter gate 1011, the output of which at 1031 is connected as the central input to the second lower AND gate 912. The other two inputs to AND gate 912 comprise the second most significant one output from the read register at 775 and the second most significant zero output from the second highest valued flip-flop of the wire register as indicated by lead 455. Thus, AND gate 912 will have a signal at its output 932 only if all three of these inputs are positive simultaneously. This will happen if and only if the second most significant flip-flop of the read register has a contents larger than that of the second most significant flip-flop of the write register, while at the same time the most significant flip-flop of the read register is no smaller than the most significant flip-flop of the write register. Therefore, the presence of a signal at output 932 necessarily means that the contents of the read register is numerically larger than the contents of the write register. Lower OR gate 952 will allow this indication that the read register contents is larger than that of the write register to be carried by lead 972 to second lower OR gate 953, so as to be carried by lead 973 to lower OR gate 954, lead 974 to OR gate 955, and finally by lead 975 through the last lower OR gate 956 so as to cause an output at 960. Thus, the fact that the read register has been determined to be larger than the write register will again cause an output at 960.

The absence of a signal at the output 992 of the first lower OR gate 952 therefore will indicate that the following conditions have been determined. First, that the most significant flip-flop of the read register is not one while the most significant flip-flop of the write register is zero (i.e., that the most significant binary digit of the read register is not larger than the most significant binary bit in the write register); secondly, if the most significant binary bit in the write register is not larger than the most significant binary digit in the read register (which coupled with the first statement means that the most significant binary bits in the write and read register are necessarily the same), then it cannot be true that the second most significant binary digit in the read register is larger than the second most significant binary bit in the write register (or else there would have been a signal at 932 and therefore would have been a signal at 992). Therefore the absence of a signal at output 992 means that it is possible that the write register may be larger than the read register contents, and conversely the presence of a signal at 992 necessarily proves that the read register contents is in fact the larger. For this reason a connection from output 992 to the second upper inverter gate 1022 will cause the output of this inverter gate at 1042 to become positive (i.e., carry a signal) only if it is still possible that the write register has the larger contents; but the presence of a signal at 992 will cause the absence of a signal at 1042 so as to inhibit the next succeeding upper AND gate 923 whenever it has already been determined from the first two pair of flip-flop contents that the read register is in fact the larger. Therefore, a signal at the output 943 of AND gate 923 will occur only if it has not already been established that the read register is larger than the write register and at the same time the third most significant binary bit in the write register is larger than the third most significant binary digit in the read register. In other words, output 943 becomes positive only when, in fact, the write register contains a larger number than the read register (and this is established by comparison of differing third most significant binary digits, the two most significant binary digits being equal). Similarly because of the inhibiting effect of a positive signal at 1002 as inverted by the second lower inverter 1012 (so as to cause no signal at its output 1032), the next succeeding lower AND gate 913 will have a signal at its output 933 only when it has not been already established that the contents of the write register is larger than the contents of the read register and, at the same time, the third most significant binary digit in the read register is larger than the third most significant binary bit in the write register. Again, therefore, an output at 933 is also fully determinative of which of the two registers contain the larger number (i.e., in this case there will be a signal at 933 only if the read register is larger than the write register contents).

In a like manner, the remaining connections, AND gates, OR gates and inverters will perform the overall general function of allowing signals to appear at the outputs 944–946 of upper AND gates 924–926 if and only if the binary number contained in the write register is determined at that stage to be larger than the binary number contained in the read register, with each of the upper AND gates being inhibited by a determination in the just previous lower stage (or any other previous stage) that the read register is in fact larger than the write register. It might be noted that since, once it has been determined that the read register in fact contains a larger binary number than the write register, this information is carried forward (i.e., to the right in FIG. 8) to the OR gates 952–955, the output of these lower OR gates will inhibit all subsequent stages of the upper AND gates (i.e., those of upper AND gates 923–926 which are to the right of the first of those lower OR gates 952–955 which have signals at their outputs 992–995). Similarly, the presence of a signal at either 941 (1001) or at outputs 1002–1005 of upper OR gates 962–965 will cause inhibition of all of the lower AND gates (912–916) which follow the first occurrence of such a signal indicating that the write register in fact is larger in contents than the read register.

Thus, in review, it may be noted that the first pair of upper and lower AND gates 911 and 921 will generate a signal (at either 931 or 941) if the first binary digit of the read register is larger than that of the write register (or vice versa). If such a signal is generated at either of these two outputs of the AND gates, all of the succeeding AND gates of the other series are inhibited; that is, if first lower AND gate 911 has a positive output at 931, all of succeeding upper AND gates 922–926 are inhibited; and conversely if output 941 of upper AND gate 921 has a positive signal, each of the succeeding lower AND gates 912–916 is inhibited. At the same time, a signal at 931 will be passed through the lower OR gates 952–956 and the appropriate leads (971–975) so as to appear at the final lower output 960, thereby indicating that the read register is larger in contents than the write register. In a similar manner, if a signal exists at 941, it will be passed by upper OR gates 962–966 because of leads 981–985 so as to appear at the final upper output 970, thereby indicating that the write register is larger than the read register. If no signal appears at either 931 or 941, none of the succeeding AND gates of either the upper or lower horizontal row will be inhibited, so that AND gates 912 and 922 will determine whether the second most significant binary digit in the write and read registers differ. Then, if the read register second digit is larger, a signal will be generated at 932 which, besides being passed through the lower series of OR gates to final output 960, will also inhibit (because of the upper inverter gates) all of the subsequent upper AND gates 923–926. Conversely, if the second most significant digit in the write register is larger than that of the second highest binary digit in the read register, a signal will appear at output 942 of upper AND gate 922. This signal will be passed through the upper series of OR gates (962–966) to final output 970, and will in addition inhibit all of the subsequent lower AND gates 913–916.

Should no signal appear at either 932 or 942 (assuming that no signal has appeared at either 931 or 941), the next set of AND gates (913 and 923) will both be potentially operative since they will not be inhibited by the absence of a signal at their central inputs 1032 and 1042. For this reason AND gate 913 or AND gate 923 will produce an output signal (833, 943, respectively) if the third most significant digit in the write and read registers differ. Again, in addition to the preservation of this output by the series OR gates in one horizontal row, the cross-linked inverter inhibiting gates will cause the inhibition of all succeeding AND gates in the other row. Thus, if the two most significant digits in the write and read registers are the same, but the third most significant digit in, say, the read register is larger than that in the write register, a signal will be generated at 933 and therefore at 973 and ultimately at 960, and additionally all of the remaining upper AND gates 924–926 will be inhibited. Conversely, an output at 943 will be passed to final output 970 as well as causing the inhibition of the remaining lower AND gates 914–916.

This operation will continue in the next succeeding AND gates, the rule of operation being simply that an AND gate will be inhibited if any previous AND gate in the opposite row (i.e., an AND gate that is toward the left in the drawing and in a different row) has a positive output. If any AND gate is not so inhibited and if the appropriate condition exists (i.e., the binary flip-flop of one of the registers is in a different state than the binary flip-flop of the other register), then the corresponding one of the vertically related pairs of AND gates will generate a signal so as to inhibit all of the succeeding AND gates in the opposite row and also energize the final output (i.e., 960 or 970) in its own row. Thus, each vertical pair of AND gates (i.e., one of 911–916, on the one hand, and a corresponding one of 921–926 on the other) having no output will cause no effect (other than to allow the next succeeding pairs of AND gates to be actuated because of the presence of a signal at their central inputs).

On the other hand, the left-most pair of AND gates which monitor a pair of flip-flops from the write and read registers that differ, will not only indicate in which register is the first (most significant) higher valued state flip-flop so as to determine that that register contents is in fact larger, but will also inhibit the possibility of an incorrect evaluation being made by the lesser significant monitored flip-flops by the succeeding AND gates in the opposite row. For this reason only one of the final outputs 960 or 970 can ever contain a signal for any possible conditions of the write and read register contents. Finally, it should be noted that since it requires a difference in the state of the corresponding flip-flops of the write register and read register to actuate any of the AND gates, when the write register and read register contain exactly the same binary number, none of the AND gates in either row will be actuated. In other words, since all of the AND gates 911–916 and 921–926 will find no mismatching flip-flops in the write and read register, none of the outputs (931–936 and 941–946) will contain a signal. Therefore there is no signal present at either 960 or 970.

In summation, a signal will occur at the uppermost right hand AND gate 908 at output 910 only if all of the flip-flops of the write register are in their zero state (i.e., the write register is empty, indicated by signal WIE). There will be an output at 970 from the last upper OR gate 966 only if the contents of the write register is larger than the contents of the read register (indicated as WLR), and there will be a signal at output 960 of the lower last OR gate 956 only if the read register contents is larger than the write register contents (i.e., signal RLW).

The various AND, OR and inverter gates, more or less directly below the RDR BUSS No. 1 in FIGURE 8, utilize the described three primary outputs (910, 970 and 960, carrying WIE, WLR and RLW signals, respectively) of the primary stage of the compare logic to derive secondary signals. In particular, these various second stage gates and interconnections derive the following signals: JCT (junction); CHR (change read register); CHW (change write register); TFR (transfer contents of read register into the write register); and WER (write register contents equals read register contents). Of these signals, all but the last (WER) occur only during the scanning operation and have been previously referred to in the description of the various FIGURES 3, 6 and 7. The WER signal, on the other hand, occurs only during the final counting period (i.e., during the end of frame interval), which follows the entire scanning operation. For this reason, the derivation of the first four signals is described first, since a complete explanation of the function of WER signal requires an understanding of the JCT, CHR, and CHW signals and their significance. In addition, these three signals are closely related functionally, and they are derived by interconnected logic elements. For this reason they are described together immediately below. The TFR signal, while not as closely related to these three signals as they are to each other, nevertheless, occurs in timed relationship to the CHW signal whenever the latter occurs. For this reason, a description of the structure deriving this function and its meaning will be given before the WER structure and function is described. As above stated, all of these function signals are derived from the primary outputs of the just described first stage of the compare logic.

Branch leads 967 and 968, respectively, carry the RLW output from 960 as upper inputs to OR gate 1067 and AND gate 1068, respectively. Branch leads 977 and 978 carry the output WLR 970 to the other lower input to OR gate 1067 and to the uppermost input of a different AND gate 1078. In addition, the WIE output 910 is carried by branch lead 917 to an inverter gate 1077. Because of these connections OR gate 1067 will have an output at 1081 whenever either the read register contents is larger than the write register contents or the write register contents is larger than the read register contents. In other words, an output will appear at 1081 whenever the contents of the write register and the contents of the read register are different. Inverter gate 1077 will have an output at 1083 whenever its input 917 is not positive or present. Since WIE output 910 and therefore input 917 will be present whenever the write register is empty or zero, there will be a signal present at the output 1083 of inverter gate 1077 only when the write register is not zero. The outputs 1081 of OR gate 1067 and 1083 of inverter 1077 form two of three inputs to AND gate 1080, the last input thereof being a branch at 1082 of an input lead 1084, carrying the compare (CMP) signal from the input and control logic circuit of FIGURE 3. As may be recalled from the description of FIGURE 3 this CMP signal is generated whenever a scanned train is present in both the $i$ and $i-1$ line simultaneously. The output 1085 of AND gate 1080 will therefore carry a signal when the contents of the write and read register are unequal (signal at 1081) and at the same time the write register is not empty (signal at 1083), when the input and control logic circuit of FIGURE 3 sends a compare signal to the comparison logic of FIGURE 8. This output at 1085 is carried by lead 1086 out to the right as one of the derived output signals of the comparison logic circuit and is labelled JCT, indicating that it is a "junction" signal. As will be more apparent subsequently, the fact that the write register contains a train number (i.e., is not empty) which is different from the read register contents (which represents a train number also) will signify that a junction between differently numbered (and therefore previously deemed separate and distinct) particles has occurred, such as shown in particle 117 in the IX and X scanning lines (see FIGURE 11) has occurred. In particular, the read register always contains a number equal to the train number assigned to the particle part in the $i-1$ line and the write register will generally contain the train number tentatively assigned to the particle part in the $i$ line. When these differ, it necessarily means that a junction of previously presumed separate particles has occurred.

Output 1085 is also introduced as inputs 1088 and 1089, respectively, to AND gates 1068 and 1078. AND gate 1068 will therefore contain a signal at its output 1090 only during a compare signal interval when the write register is neither empty nor equal in contents to the read register (i.e., a signal exists at 1088), and in addition the read register is larger than the write register (because only at such times will a signal exist at input 968). In other words, a change read register (CHR) signal will exist at the output of 1090 of AND gate 1068 only when a junction has occurred and at the same time the read register contains the larger number. As will become more fully apparent hereinafter, this will occur at those junctions (at which unlike numbered trains are found to be part of the same particle), in which the two parts of the particle having different train numbers join in one particular sense. In particular, the higher numbered train is at the later-scanned or right-hand side of the lower numbered train, as occurs in the junction in line X of FIGURE 11. Similarly, AND gate 1078 will contain a (CHW) signal at its output 1091 only if there is both a junction signal at input 1089 (meaning that a compare signal occurs when the write and read registers are unequal and the write register is not empty) and a signal at input 978, indicating that the write register contains the larger number. This change write register (CHW) signal at 1091 will occur when the unlike numbered trains representing two parts of the same particle join, and the numbering of them prior to the junction has been in the opposite sense. In particular, the higher numbered train is in the earlier scanned part of the scan line (i.e., to the left) as occurs in the junction in line IX in FIGURE 11. In other words, as may be seen from particle 117 in FIGURE 11, it is possible for the higher numbered branch to be either on the left or on the right of the junction (the first type of junction occurring in line IX and the other type of junction occurring in line X), and the CHW and CHR operations, respectively, are designed to take care of both types of junctions.

The signals and outputs 1090 and 1091 (CHR and CHW, respectively) are utilized as previously explained in conjunction with description of FIGURES 6 and 7 to store, respectively, the contents of the write register at the address given by the contents of the read register (CHR), and vice versa (CHW). In particular the higher numbered register will be utilized for the address and the contents of the register having the lower number will be stored at that address for each of a CHR or CHW signal. Thus, for every junction signal by AND gate 1080, there will be either a change read or change write register signal at one of the outputs 1090 or 1091 (but never both simultaneously). This will cause the storage in the object data memory (since numbers 16 or larger are necessarily contained in both the read and write registers, the address to the memory will be at least 16 and therefore be in the object data memory rather than the train memory part of the store shown in FIGURE 9) of the smaller register contents at the address given by the larger contents of the other register. The exact purpose of the storage of the smaller register contents in the object data memory at the address of the larger contents of the other register will be explained later. However, it should be noted that prior to the scanning operation the entire object data memory is set so that at each location the contents equal the address. Therefore, storage at an address (corresponding to the larger register contents) of a number smaller than that address (corresponding to the smaller register contents) changes this preset matching relationship and acts as a technique for storing the occurrence of a junction between trains numbered with the (larger) object data address number and the (smaller) object data contents number in a unique manner. This information is later retrieved during the final counting operation (during the end of frame period) to avoid counting as separate particles joining branches of the same particle (which when initially encountered during the scanning were thought to be separate particles). How this is done will be explained very soon hereinafter.

The transfer signal (TFR) is derived from a relatively simple arrangement including an OR gate and an AND gate, near the center of FIGURE 8. Branch lead 919 carries the WIE signal from output 910 as the upper input to OR gate 1069. The lower input to this OR gate 1069 is branch lead 979 from the WLR output 970. The associated AND gate 1093 receives as its upper input the output 1094 of OR gate 1069 and as its lower input a branch lead 1095 carrying the compare signal from input lead 1084 when it is present. Since input 1094 to AND gate 1093 will become positive or present whenever the write register is empty (WIE) (since this actuates OR gate 1069 by means of input 919) or whenever the write register is larger than the read register (WLF) (causing actuation of OR gate 1069 by its input 979), the output 1096 of AND gate 1093 will carry a signal whenever either of the two just mentioned conditions exist at the times a compare signal occurs. Output 1096 of AND gate 1093 is fed to 24 microsecond delay means 1097, the output 1098 of which forms the input of a pulse generator 1099. The delay means 1097 will therefore cause the pulse generator 1099 to have an output at 1100, 24 microseconds after a signal at 1096 occurs. For this reason the output at 1100, which is the transfer signal (TFR) previously referred to in connection with FIGURES 6 and 7, will be generated only after the change write register signal has had an opportunity to cause it attendant operation. In other words, a transfer of the contents of the read register into the write register will not be allowed to occur until after the possible change write register operation has occurred. The pulse generator additionally inhibits the continuation of the transfer signal so as to avoid any possibility of this transfer of the contents of the read register into the write register except soon after there is an output at 1098 of the delay device.

It should be noted that, because of the existence of OR gate 1069, the presence of a compare signal (CMP) during the scanning operation in concurrence with either of two conditions will cause a transfer signal (TFR). Thus, whenever the write register is empty, the contents of the read register will be supplied thereto when a compare (CMP) signal is generated (i.e., when there is a train in the $i-1$ and $i$ line simultaneously). It should be noted that the write register normally contains the train number associated with the train in the $i$ scan line when one is present, and the read register contains the train number associated with the train existing in the $i-1$ line. Therefore during the scan of the $i$ line when a train exists and continues in the $i-1$ line and a train starts in the $i$ line subsequently, it is logically obvious that the train starting in the $i$ line forms part of the same particle as the train in the $i-1$ line. For example, at point 142 in FIGURE 11 when the scanner is scanning line III (that is, III in the $i$ line), the read train memory signal will cause the read register to contain the train number 16 at the beginning (123) of the long train in the $i-1$ line (line I). The write register will still be empty at point 142, however. Nevertheless, it is obvious from inspection of particle 116 in FIGURE 11 that the part of the particle in line III between points 141 and 143 is necessarily continuous with the part of the particle represented by the long train in the $i-1$ line. This continuity is indicated by asigning to the train in line III, after continuity has been established at point 142, the same train number (16).

The mechanism utilized to accomplish this involves the transfer signal (TFR) just discussed. In particular, at point 142 the overlapping of the train in the $i$ line with the train beginning in the $i-1$ line will cause a signal at both of the inputs to AND gate 60 in FIGURE 3. The existence of these two inputs to the AND gate will therefore cause (after a 24 micro-second delay occasioned by delay means 67) a compare signal (CMP) to occur. Since the write register is still empty, the WIE signal will exist at 910 in FIGURE 8 so as to actuate input 919 of OR gate 1069. Therefore, the compare signal generated will arrive at input 1095 to AND gate 1093 when there is a signal at its upper input 1094. For this reason AND gate 1093 will have an output at 1096, which when further delayed by delay means 1097 will cause pulse generator 1099 to make a transfer signal (TFR) at its output 1100. As may be seen in FIGURES 6 and 7, this transfer signal will be introduced to actuate the write register (FIGURE 6) input AND gates 571–576 and 591–596, so as to allow transfer into the write register of any signal appearing on read register BUSS No. 2 at 550. At the same time the transfer signal introduced to the read register at 800 (FIG. 7) will cause the uppermost set of read register readout AND gates 801–806 to allow transfer of the contents of the read register to this same read register BUSS No. 2 (550). By this mechanism the contents of the read register will be transferred into the write register. Thus, whenever the train in the $i$ line has not been assigned a train number yet (i.e., the write register is empty), the existence of an overlapping train in the $i-1$ line will cause a transfer into the write register of the contents of the read register. Since the read register will be supplied with the train number of any train existing in the $i-1$ line as soon as it occurs, the write register, whenever empty, will be supplied with an appropriate train number whenever part of the same particle appears in both the $i-1$ line and the $i$ line simultaneously.

It might be noted that the read register will always contain a train number corresponding to the trains in the $i-1$ line when such a particle part exists in the $i-1$ line, since the read from train memory signal (RTM) is generated as soon as the train starts in the $i-1$ line (because of elements 52, 81, 82 in FIGURE 3). As will be more completely explained hereinafter, each RTM signal will cause the train number assigned to the train in the $i-1$ line in the previous scan (i.e., that train number assigned when the train in the upper $i-1$ line was previously scanned in the preceding line when it was in the then lower scanned line) to be read from the memory into the read register. For example, when the scanner is scanning line III as the lower line, the reaching of point 142 in the $i$ line (that is, line III) will cause the existence of a signal at 52 since the long train in the $i-1$ line starts at the corresponding point 123. This will cause a reading from the train number memory of the train number 16 into the read register.

The exact mechanism by which the number 16 previously assigned (i.e., recorded in the train number memory) to the long train in the II line, is caused to be read out from the correct train number memory location so as to be available to the read register at point 123 during the III line scan will be more apparent from the illustrative examples of operation of the device given following the full description of all its parts and its related functions. At present it is sufficient to note that the transfer function (TFR) will cause the transfer from the read register of the number 16 (associated with the long train in line II) to the write register associated with the train in line III which is bordered by points 141 and 143, soon after there is an overlapping of the two trains. This point of overlapping is obviously at point 142 during the scanning of line III. As may be noted from FIGURE 3, the compare signal (representing the overlapping of trains in the $i-1$ and $i$ lines) is delay 24 microseconds by element 67, and the transfer signal will be delayed an additional 24 microseconds (by element 1097 in FIGURE 8) subsequent to the occurrence of the compare signal (which is required to actuate AND gate 1093). For this reason any RTM signal will necessarily have occurred prior to the transfer operation. In other words the RTM signal generated by the beginning of the $i-1$ train at 123 in FIGURE 11 will cause a reading into the read register of number 16 before the transfer signal will cause the write register to receive the same number 16 from the read register. The delay occasioned by element 1097 in FIGURE 8 additionally allows the occurrence of a junction signal (JCT) and a change write register (CHW) signal (if either are to occur) before the transfer operation takes place. The just previously explained example of the transfer operation illustrated the most common use of it, namely, to transfer to the write register the same train number included in the read register whenever an overlapping of trains occur and the write register is empty. This operation corresponds to identifying trains in the $i$ line which have no apparent continuity with anything previously scanned as soon as they overlap a train in the $i-1$ line.

Another similar but somewhat different example of when the transfer signal performs this single function will occur in line IV, at point 145′. Previously, at point 143′, during the scanning of line IV the write register will be cleared. This is caused by the CWR signal generated by the FIGURE 3 input and control logic circuit. Specifically referring to that figure, the end of the $i-1$ train at 143 will cause the generation of a signal by inverter gate 65 (meaning that there is no longer a particle present in scan line $i-1$) while inverter gate 63 will already contain such an output. For this reason AND gate 64 will generate a signal which, after delay by element 66, will reset the continuity flip-flop 62 to its zero position. Therefore, a signal will be generated at output 71 so as to activate the upper input 78 of AND gate 77. Since the other input 76 to this AND gate 77 will contain a signal (since the $i$ line has been empty for quite some time, inverter gate 63 will have had an output for some time so as to be supplying an output signal at 68′ on the other side of delay means 68). For this reason AND gate 77 will have an output, which delayed by element 79 will cause pulse generator 80 to make a CWR pulse signal. For this reason the write register will be empty by the time that the scanner reaches point 145′ in line IV. It should be noted that although a RTM signal will be generated at point 145′ (corresponding to the beginning of the train in the *i*−1 line at 145), nevertheless, the write register will remain empty until point 146 since there will be no compare signal to actuate the transfer until that point. Thus, at point 145′ the read register will contain the train number 16 (identifying the train in the *i*−1 line bounded by points 145 and 144) and the write register will be empty. For this reason as soon as the compare signal is generated 24 microseconds after the start of the overlapping train in the *i* line at 146, the AND gate 1093 in FIGURE 8 will generate a signal so that 24 microseconds later a transfer of the read register contents (16) to the write register will be effected.

In addition to this relatively simple transfer from the read register to the write register of the train number whenever an unmarked train in the *i* line overlaps with an *i*−1 train and is therefore recognized as being part of the same particle and therefore given the same train number, there will be a transfer whenever two dissimilarly numbered trains overlap, and the one in the *i* line (and therefore the write register contents) is identified by a larger number than the one in the *i*−1 line (which corresponds to the read register contents). An example of this type of transfer occurs in line IX during the scanning of particle 117 in FIGURE 11 at the junction of branches 117′ and 117″. Prior to reaching the transfer point at 9007, there will have been a clearing of the write register at point 9003, since at that point no train in either the *i*−1 line (VIII) or the *i* line (line IX) exists. At point 9005 the start of the train in the *i*−1 line will cause an operation substantially the same as described for point 142 in line III above. That is, the read register will be supplied by the train number memory with the number 20 assigned (in the last previous scan line) to the central branch particle 117 in line VIII; and, since the write register is now empty, this number will be transferred to the write register in the same manner as previously described.

Since the continuity flip-flop 62 in FIGURE 3 will not be reset to its zero position after the occurrence of the two trains starting at point 9005 set it to its one position, the write register will not be cleared at any time between points 9005 and 9007. For this reason, when the scanning operation reaches point 9007 and the RTM signal causes number 19 to be placed into the read register (since 19 is the train number of the part of branch 117′ contained in line VIII), a junction signal (JCT) will take place. That is to say, as soon as the read register is made to contain 19 while the write register still contains 20, AND gate 1080 in FIGURE 8 will have an output. Specifically, OR gate 1067 will have an output since the write register and read register are unequal (namely, a WLR signal exists at input 977) and at the same time inverter gate 1077 will have an output at 1083 (because the write register is not empty). Therefore, the compare signal occurring 24 microseconds after the start of the train in the *i*−1 line will cause a junction signal (JCT) at the output 1085 of AND gate 1080. Additionally, since the write register contains a 20 while the read register contains a 19, there will be a WLR signal over lead 978 to AND gate 1078, which combined with the junction signal being fed at input 1089, will cause AND gate 1078 to have an output at 1091, this being the change contents of write register signal (CHW). The junction signal introduced back to FIGURE 3 at 89 will therefore cause actuation of OR gate 86 so as to make the signal at its output 87 so as to cause the memory timer 170 to undergo a cycle to actuate the gating to the memory store of FIGURE 9. The significance of a memory timer cycle, partly explained previously, will be fully explained in conjunction with the store of FIGURE 9. At the same time the change write register signal will cause the contents of the read register (19) to be positioned at the address of the write register (20) in the object data memory part of the store of FIGURE 9. Twenty-four microseconds subsequent to these operations, the transfer signal will be generated by pulse generator 1099, since AND gate 1093 will be actuated by the concurrents of the compare signal at input 1095 with an output of OR gate at 1094. OR gate 1069 will have an output at this time since it will be actuated by the write register larger than read register (WLR) signal on input 979. Thus, when a junction of particle branches occurs in which the write register includes the larger train number, the junction signal and the change write register signals will occur concurrently so as to cause the operations they control; and then the transfer signal will be generated 24 microseconds later, so as to allow the other two operations to be completed. It should be noted in this particular example that the effect of the transfer signal is to number the continuance of the train in the *i* line (that is, line IX) beyond the point 9007 with the lower number (19) rather than the previously utilized higher number (20) by transferring the number 19 into the write register. Thus, the transfer operation in this case assures that a train in an *i* line which is contiguous to two differently numbered trains in the *i*−1 line will eventually be assigned the smaller of the train numbers, which lower number (19) will be recorded in the train number memory as the identifying train number of this train when it ends at point 119.

For purposes of comparison, the behavior of AND gates 1080, 1068, 1078 and 1093 will be now described when a junction of a somewhat different type occurs, namely, between the leftmost and central branches of particles 117 in FIGURE 11. During the scanning of line X, the number 17 will be placed into the read register when the scanner reaches point 10,000 (corresponding to the beginning of the train in the *i*−1 line at point 9000) and will be transferred into the write register at point 10,001 (in a manner analogous to that described for the operation at point 145′ in line IV). Therefore just before 10004 is reached, the write and read registers both contain train number 17. At this point 10004 the number (namely, 19) previously assigned (in the manner just previously described) to the train in line IX just starting at point 9004 will be read from the train memory into the read register. Therefore the contents of the read and write registers will not be equal although both registers contain train numbers. Therefore, the junction AND gate 1080 will contain an output at 1085 so an to cause a junction signal at 1086 to occur. Additionally, since the read register contents are larger than the write register contents (i.e., a RLW signal exists), the upper input 968 to AND gate 1068 will contain a signal, as will the lower input 1088 from the junction AND gate. For this reason, AND gate 1068 will generate at 1090 a change contents of read register signal (CHR). This will cause the storage (in the object data memory part of the memory store) of the smaller contents of the write register (namely 17) into the larger address (19) given by the read register. Since the write register already contains the smaller of the two numbers (namely 17) neither input to OR gate 1069 will be positive so that transfer AND gate 1093 will not cause a transfer signal to take place. Therefore, the write register will continue to contain the numeral 17 so that at the end of the first long train in line X, the write register will supply (upon a write train memory signal, WTM) the numeral 17 to the train number memory, thereby marking this train with that lower number.

In summary, therefore, it may be said that the transfer operation will cause the contents of the read register to be put into the write register whenever there is an overlapping of trains in the *i* and *i*−1 line, and at the same time the write register is either empty or larger in contents than the read register. However, this transfer is delayed so as to allow any junction and change write register operation which may be actuated at the same time. The junction signal will occur as soon as the trains overlap (i.e., cause a compare signal) if the two trains (as represented by the read and write register contents) have been up to this point considered to be parts of different particles, or in other words, are identified by non-identical train numbers. If the train in the $i-1$ line (as represented by the read register) has been assigned the larger number, the change read register signal (CHR) will be generated by AND gate 1068 and no transfer signal will subsequently be effected. If, on the other hand, the train in the $i$ line (as represented by the write register) is identified by the higher train number, the AND gate 1078 will cause a change write register signal (CHW) and shortly thereafter the transfer signal (TFR) will appear at the output of pulse generator 1099. Thus, whenever there is a junction between two unlike numbered trains, the larger numbered one will be used as an address to store a number equal to the train number of the lower numbered one in the object data memory, and thereafter the lower of these two numbers will be stored in the write register (if it is not already contained therein) to insure that the particle will thereafter be assigned the lowest number which any of its branches had. Thus, in line IX the preserved train number (of the 20 and 19 previously assigned to the branches) is the lower one, 19; and in line X, the lower number, 17, is preserved of the two (17 and 19) which join.

The remaining undescribed structure of the FIGURE 8 compare logic circuit is utilized solely during the final counting operation to differentiate between train numbers utilized to mark trains actually forming discrete particles (such as 16, 17, 18 and 21 in FIGURE 11) and those (such as 19 and 20) utilized to mark what was later determined to be only branches of a particle already identified by another train number. As has been previously explained in part, the technique for recording the fact that two different train numbers were found to have been utilized for marking different joining parts or branches of the same particle is to store in the object data memory the smaller of these at the address given by the larger (caused by either a CHR or CHW signal along with a JCT signal). The three gates at the lower left of FIGURE 8 perform the function (in the final counting operation) of subtracting, from the total number of train numbers utilized, those numbers which were found to have been utilized for mere branches of an already numbered particle. In order to understand how this function is performed, a description of the relatively simple structure involved is first given.

The RLW output 960 of OR gate 956 is connected as an input 1060 to inverter gate 1061. Similarly, the WLR output 970 of OR gate 966 is connected as an input 1070 to inverter gate 1071. Since there will be a signal at input 1060 of inverter 1061 if the contents of the read register are larger than the contents of the write register (RLW), there will be a signal at the output 1062 of this inverter gate only if the contents of the read register are not larger than the contents of the write register (i.e., either the read register contains a number smaller than or equal to the number in the write register). Similarly the output 1072 of inverter 1071 will contain a signal only if the contents of the write register are no larger than the contents of the read register (again including the possibility of equality). For this reason there will be a signal present at both outputs 1062 and 1072 simultaneously if and only if the write and read registers are in fact equal. The outputs of inverters 1061 and 1071 at 1062 and 1072 form two of the four inputs to AND gate 1063. The other two inputs comprise the end of frame signal (ENF) from the input and control logic circuit of FIGURE 3, introduced at 1064, and the timing pulse BC′ from the memory timer circuit of FIGURE 3, shown as input 1065. Thus, AND gate 1063 will have an output at 1066 only during the end of frame interval (which follows the entire scanning operation and corresponds to the final counting period) when, at the same time, the write and read registers contain equal numbers and the actuating timing pulse BC′ is also present. Thus, during the final counting period, a signal will appear at the output 1066 whenever the timing pulse BC′ occurs and there is equality between the write and read registers. This output 1066 is carried by lead 1076 to the object counter of FIGURE 10 to cause it to count up one whenever such equality is found. Since the presence of a signal at 1066, 1076 indicates that the write register contents equals the read register contents, this signal may be abbreviated as WER.

The purpose of the AND gate 1063, its inputs, and its output (WER) will be explained. Prior to the scan, all locations in the data object memory are set to the same value as their address (i.e., address number 16 contains the number 16 in binary form address contains the number 17, etc.). As has been explained above, during the scanning operation every time the various logic circuits (and in particular the compare logic of FIGURE 8) determines that a junction has occurred between two differently numbered particle parts or trains (such as for particle 117 in lines IX and X in FIGURE 11), this is recorded in the object data memory by storing in the location or address corresponding to the larger numbered train a number equal to the lower numbered train. For example, in FIGURE 11 for the junction in line IX between branches 117″ and 117′ of particle 117 involving trains numbered 20 and 19, respectively, the number 19 is stored at location or address 20 in the object data memory during the scan period. Similarly, any other junctions involving unlike numbered trains (such as in line X) would cause a similar storing of a number (e.g., 17) in a nonmatching (larger) address (i.e., 19). At the end of the scanning operation, the number of actual particles present in the field scanned will be the number of different train numbers used (which is 16–21 in FIGURE 11, or six different numbers) minus any train numbers which were "wasted" on mere branches of particles. In FIGURE 11 of the six different train numbers utilized, two (namely, 19 and 20) were "wasted" in that they were used to identify only branches of a particle 117 originally assigned train number 17 in scan line V.

By "looking into" the object data memory during the final counting operation (or end of frame period) after the entire scanning operation, the compare circuit can "tell" the object counter to disregard (i.e., not count) train numbers which were "wasted" by being assigned to mere branches of a particle. This is accomplished by feeding to the write register (from the initiate number counter) a number equal to a particular address of the object data memory (the memory being addressed also by this same number from the initiate number counter) and feeding from the memory to the read register a number equal to the contents at that address. If the numbers match, neither a WLR nor a RLR signal will be generated by the compare logic of FIGURE 8 so that the two upper inputs to AND gate 1063 will both receive a signal (because of the inversions caused by gates 1061 and 1071). Therefore, during the final counting period (i.e., end of frame signal, ENF, is present), when the BC′ timing pulse occurs, a write register equals read register (WER) signal will be generated so as to cause the object counter to count up one, since the train number involved corresponds to an actual discrete particle. On the other hand, if at the particular address (say, 20) a different number (e.g., 19) has been stored because of a determined junction as previously explained, there will be either a WLR (or a RLW) signal present and therefore (because of inversion gates 1061 and 1071) one of the two upper inputs to AND gate 1063 will not contain a signal. Therefore, a WER signal will not appear at output 1066 and no signal to the object counter of FIGURE 10 over lead 1076 will be given. Therefore, no object or particle will be counted despite the fact that the number 20 was used, to mark a train.

In a manner already partially explained, the number counter of FIGURE 4 will be stepped down from its setting at the end of the entire scan, and each time the operation will be repeated for the next lower address. For example, at the end of the scan of the FIGURE 11 field, the initiate number counter will have suplied number 21 to mark the first train of particle 121 in line VIII. After supplying this number to the write register for subsequent storage in the train memory as the identifying number for this train, the initiate number counter will step up one to number 22, so as to supply this number to any newly found particle parts not being continuous with any previous scanned particle parts. In this case, there are no such new noncontinuous trains so that number 22 will remain in the initiate number counter at the end of the scanning period. Therefore, the first number supplied in the final counting (end of frame) period as an address to the object data memory will be number 22, despite the fact that this number was never used to mark a train. The address and contents at location 22 in the object data memory will therefore be matching (i.e., both 22) so that a WER will be generated by AND gate 1063. For this reason the first WER signal will represent an "extra" particle never actually encountered in the scan. This error is compensated by starting the object counter at a value of minus one (−1) so that the first WER signal merely sets it to zero.

Since the end of frame flip-flop 92 (FIGURE 3) is set to its one state, the end of frame clock (elements 90, 94, and 99–103 in FIGURE 3) will cause repetitive operation of the memory timer 170. For this reason, AND gate 197 (FIGURE 4) will cause the initiate number counter to count down one every 24 microseconds (which is the repetition rate of the clock, the memory timer and therefore actuating pulse AB'). Therefore, the initiate counter will count down one (to 21) and the entire operation will be repeated. Specifically, the initiate number counter contents (21) will be fed into the write register and used to address the object data memory. The contents of address 21 in the object data memory will then be fed to the read register. Since there was no junction involving 21 as the larger train number (in fact, no junction involving number 21 at all), the contents at address 21 will have been undisturbed from their original setting of 21. Therefore, a WER signal will be generated to cause the object counter to count up one (to 1 in this case), as will be more apparent after description of the object counter of FIGURE 10. After this, the next pulse from the end of frame clock and the next memory timer pulses will cause the initiate number counter to count down one to 20, to store this number in the write register, and to address the object data memory at this (20) location. The object data memory will therefore supply its contents (in this case, 19) at address 20 to the read register. Because of the fact that the write register contents does not equal the read register contents, AND gate 1063 will not have a WER output at 1066, 1076. Therefore, the object counter of FIGURE 10 will not receive a WER signal and will not count up one. In this manner (as previously explained), "wasted" train numbers, used to mark trains which formed junctions with other trains having different (lower) numbers will not be counted, since they represent joining branches of a particle, rather than separate, discrete particles.

The initiate counter will then count down to 19. Since the originally matching relationship at address 19 in the object data memory has been disturbed (since trains marked with 19 did join with the lower numbered train 17), a WER signal will not occur when the address 19 (supplied by the initiate number counter) and the contents (17) at that address are compared. The object counter, therefore remains at one. When the initiate number counts down to 18 and addresses the object data memory, the address and contents will match, so that a WER signal will cause the object counter to count up to 2. Similarly, the next cycle (initiate number counter and therefore object data memory and write register all at 17) will cause a matching number (17) to be supplied to the read register from the object data memory at address 17, since trains marked with 17 did not join with *lower* numbered trains and therefore no mismatching number was stored at address 17. The WER signal caused by this still matching relationship therefore sets the object counter to the next higher count (3). Finally, the same operation for train number 16 causes another WER signal so that the object counter is set to 4. As soon as the initiate number counter is counted down to 16, the upper right hand AND gate 309 in FIGURE 4 will cause a cycle complete signal (CYC) to be generated at its output 310. This CYC signal is fed into input 93 of FIGURE 3 so as to reset the end of frame flip-flop 92 to its zero or off state. This resetting stops operation of the end of frame clock (elements 94 and 99–103) so that once the cycle already started (using train number 16) is finished, no further pulses from the clock will cause any new operation of the memory timer 170. Since the various timing pulses (AB', B, BC' and C) are therefore no longer generated, the entire apparatus ceases to perform any further operations. The number now contained in the object counter (namely, four) is thus the number of separate discrete particles contained in the entire field of FIGURE 11.

It has previously been stated that before the next scanning period each of the locations in the object data memory (i.e., addresses 16 through 63 in the memory store) are made to contain a number equal to its address. Although this could be accomplished as a separate operation, the illustrated embodiment does this match setting automatically as soon as the memory contents is read out from the memory. In particular, the initiate number counter buss (INC BUSS) No. 2 is not only connected to the memory store as an addressing input, but also as a storage or contents input. The particular timing of the memory operations allows the existing contents at the addressed location to be first moved from the memory to its output before the new number is stored therein. Thus, for example, when the address 20 is given by the initiate number counter, the number 20 will be offered to the input network at the same time. However, the input control AND gates of the memory will not allow this new information to reach the memory store itself until after the existing contents have been read out to the memory output. Thus, the existing contents (number 19) is first read out through the memory output into the read register and then the number 20 is allowed to reach the memory input and be stored at address 20 therein. The exact mechanism used for this timing will be described in conjunction with FIGURE 9. By this process of reading out the contents of each address (from the highest used down to 16) and then storing a number therein equal to the address, the object data memory is automatically returned to a state where each address has a matching contents. Therefore, the scanning of the next object field requires no further resetting of the object data memory.

It might be noted that in the particular illustrated embodiment, the larger number is always used as the address and the smaller number as the contents input to the object data memory whenever a junction takes place during the scanning period and is recorded. For this reason, during the final counting operation, the read register (supplying the contents of a given location) can never be larger than its location address (contained in the write register) during this end of frame counting operation. It would therefore appear that the connection 1060 from the RLW output (at 1960), inverter gate 1061 and input 1062 are unnecessary. Although in a sense this is true and a three-input AND gate could be substituted for AND gate 1063, the illustrated aparatus allows arbitrary choice of whether the larger train number is used as the address or contents information in storing in the object data memory an indication of a junction. In passing, it may be mentioned that although either rule may be followed (i.e., larger number for address and smaller as contents, or larger as contents and smaller as address), there is need for consistency, since otherwise it is possible for the apparatus to store two pieces of information at the same address. Thus, if the line IX junction of trains 20 and 19 (FIGURE 11) were stored as number 20 at address 19 (i.e., larger number contents at smaller number address) rather than as would occur in the illustrated specific embodiment, then in line X the opposite rule (i.e., smaller number contents at larger number address, as actually used consistently in the specific embodiment) would then store number 17 at the same address 19. This would cause the final count to be in error since there would be no record remaining of the first-mentioned junction, and therefore only one "wasted" train number would be subtracted or disregarded during the end of frame final counting operation wherein actually two such train numbers (19 and 20) were "wasted" by being used for branches joining another part of the same particle, already assigned a still different train number (namely, 17). It should be noted that the rule of storing the smaller train number in the larger train number address, coupled with assigning the smaller train number to the subsequent joined part of the particle, makes it impossible for a subsequent junction of the particle to attempt to store information at an already used address. For example, the junction information in line IX is stored at address 20 (higher number) but the resulting joined branches are assigned train number 19 (lower number); the later junction in line X causes storage at the higher address (19) but subsequent labeling of the joined train as the lower number (17). Thus the higher number is used as an address, but ceases to be used for any further train marking, and therefore the same address can never be required again. It is of course obvious that if the rule of storage is reversed (i.e., to putting the higher number in lower number address), then the rule of preserving the lower number for the joined train (accomplished by the transfer signal (TFR) at 1100 when appropriate) would also have to be reversed. In particular, if the reverse rule is used, the transfer signal should be made to occur when the read register contents is larger than the write register contents (i.e., RLW) rather than the converse (WLR) as in the illustrated embodiment. For such opposite operation, input 979 to OR gate 1069 should carry the RLW output from 960, input 968 to AND gate 1068 should be changed from RLW (960) to WLR (970), and input 978 to AND gate 1078 should be changed from WLR (970) to RLR (960). The actually utilized rule of recording the junction at the larger number address and using the lower number not only for storage there but for subsequent marking of the particle appears more logical, since this way each particle will be ultimately associated with the same number as was the very first part or branch thereof encountered by the scanner.

*Object counter of FIGURE 10*

The object counter comprises an array of counting flip-flops, interconnected by means of a series of AND gates so that a signal from the FIGURE 8 compare circuit over lead 1076 introduced at input 1106 to the object counter will cause the counter to count up to the next higher number. This input 1106, which receives the WER signal from the compare logic, is connected as the change state or switching input 1110 to the first or least significant flip-flop 1111. In the specific illustrated binary counter there are a total of five such flip-flops (namely, 1111–1115) so that the object counter has a capacity of 32. Since only 48 numbers (namely, 16–63) are utilized to mark trains, it is assumed that no more than 32 discrete particles are present in the field (some of these 48 train numbers being of course utilized to mark parts of particles that form joining branches as previously described). It is obvious, however, that where more particles are expected to be encountered, additional flip-flops may be supplied, not only in the final object counter, but in all of the circuits so as to allow handling of considerably more train numbers and therefore more particles. Input 1106, carrying the WER signal, is also connected by means of branch lead 1108 to the inputs 1121–1124 of count-up AND gates 1131–1134, respectively. The lower input to these AND gates (1131–1134) are supplied by the count-up output 1141–1144 from the first four flip-flops (1111–1114), respectively. As in the case with the flip-flops constituting the initiate number counter of FIGURE 4, flip-flops 1111–1114 supply at outputs 1141–1144 a signal whenever the corresponding flip-flop changes from the one state. For this reason these outputs 1141–1144 are illustrated as coming out of the top of the one side of the flip-flops, in the same manner as outputs 1171a–1175a for the initiate number counter flip-flops of FIGURE 4.

It should be noted that this method of illustrating the type of output utilized (i.e., from the top of the one state rather than from the side), for outputs carrying signals only when the flip-flops change from the one to the zero state, is not intended to imply that the counting flip-flops (illustrated as rectangles) are necessarily structurally different from the circular flip-flops (such as in FIGURE 1) which have outputs representing solely their condition or state. Rather, the illustration of these outputs as coming from the top of rectangular flip-flops rather than from the right-hand side is utilized solely to differentiate between the two types of signals that might be obtained from any conventional flip-flop. In other words, an output coming from the right-hand side of a flip-flop (whether represented as a circle or as a rectangle) means that the signal represents whether there is a, say, positive voltage at that particular side of the flip-flop. On the other hand, outputs coming from the top or bottom of rectangular flip-flops represent the leading edge of the voltage change occasioned by the flip-flop changing from that state. Assuming that the one side of the flip-flop will have a positive signal when the flip-flop is in the one state (therefore, the zero side having a negative signal which is considered to be equivalent to zero), a change of state output from the upper surface of the one side of the flip-flop would mean that the flip-flop is changing from having a positive voltage at that side (i.e., is in its one state) to having a negative voltage at that side. Thus, such an output as shown at 1141–1144 in FIGURE 10 would carry a signal whenever the upper side of the flip-flop changed from having a positive to a negative voltage. Practically, such an output may be obtained by simply passing the regular upper output through a differentiating circuit (thereby passing only changes in the voltage level) and then through a correctly oriented diode, thereby eliminating changes from, say, negative levels to positive levels, and only passing signals representing changes from posittive to negative levels of voltage.

Because of the connection so far described, flip-flop 1111 will always be caused to change its state by a signal at input 1110 whenever a WER signal appears at 1106 from the compare logic. For this reason an output will appear at 1141 if the flip-flop was originally in its one state. If the flip-flop is so changed from its one to its zero state, AND gate 1131 will have an output at 1151 since the WER signal is supplied to its upper input at 1121 concurrently. This output at 1151 is then fed as a change of state or switching input to the second flip-flop 1112. Therefore the second least significant flip-flop 1112 will change its state; and if it had been in its one state, the change will cause an output at 1142. This will in turn activate AND gate 1132 (which is still receiving a WER signal at upper input 1122) so as to produce at its output 1152 a switching signal to thereby cause the third least significant flip-flop 1113 to change its state. In a like manner, if the flip-flop 1113 was previously in its one state, it will produce an output at 1143 to cause AND gate 1133 to have an output at 1153, thereby switching the fourth least significant (i.e., second most significant) flip-flop 1114 to its other state. Finally, if the next to last flop-flop 1114 is thereby changed from its one state to the zero state, an output at 1144 will actuate the last AND gate 1134 at its output 1154. This will then cause the most significant flop-flop 1115 to change its state (presumably from zero to one). Since this operation is substantially the same (although somewhat simpler than) the operation of the previously described initiative number counter when it is caused to count up 1 by an initiate (INT) signal, further explanation of this counting up operation is deemed unnecessary. However, it should be recognized that the object counter illustrated has provision for storing only numbers from 0 through 31 (which may alternatively be thought of as numbers 1–32).

The previously referred to setting of the object counter to minus one, prior to its utilization during the final counting operation accomplished during the end of frame period, can now be seen as equivalent to saying that the 32 capacity counter should be set to number 31. Thus, all five of the flip-flops being in their one state would represent a binary number equal to 31 so that the first WER pulse will make the counter "count" to zero. As previously explained, it is necessary to have the object counter set to this "minus one" (or 31) value, because the first WER signal generated during the final counting operation does not actually represent a train number utilized (and therefore does not correspond to any particle part actually found and marked) during the scanning operation. In order to allow a simple resetting of the object counter to this value of "minus 1" or 31, a separate manual resetting (RST) input 1156 is supplied. The reset signal (RST) is supplied to resetting input 1161 of the "one" side of first flip-flop 1111 and is carried by lead 1157 to the various "one" side resetting inputs 1162–1165 of the other flip-flops 1112–1115. Representation of the inputs 1161–1165 as coming into the left-hand side of the "one" side of the flip-flops signifies that a signal at these inputs will cause the flip-flops 1111-1115 to be set to their one state regardless of their condition prior to this signal. Such inputs are analogous to the upper inputs to the continuity flip-flop 62 and the end of frame flop-flop 92 shown in FIGURE 3. Therefore, whenever the reset signal (RST) is caused to occur (by actuating a manual switch or button) a signal will be presented to each of the "one" state resetting inputs 1161–1165 so that all five of the flip-flops will be caused to assume their one state regardless of their existing state at the time.

It should be again noted that the representation of the inputs to the various flip-flops are more or less schematic ways of representing the function intended to be performed by the inputs and do not necessarily represent additional distinct inputs to a bistable flip-flop circuit. In other words, the fact that the switching inputs 1110 and 1151–1154 are shown as separate inputs to the center of the flip-flops and the change to "one" state resetting inputs 1161–1165 are shown as separate inputs to a different part of the flip-flops does not necessarily mean that this is representative of the structure utilized to cause the intended functions. Since in conventional flip-flop circuits a switching input (i.e., one which will cause the flip-flop to change its state) is usually supplied to both sides of the flip-flop, the representation of an input at the center of the flip-flop would, in such circuits, actually correspond to an input (having the shape of a spike voltage pulse, for example) to both halves of the flip-flop circuit. On the other hand, an input represented as going to merely one side of the flip-flop so as to always change the flip-flop to a particular state (whether or not it was previously in that particular state) may involve introduction to one side of a certain type of signal, introduction to the other side of a different (opposite sign) signal, or introduction to both sides of the flip-flop of opposite signals. For example, it is possible to utilize a positive signal supplied to one side of the flip-flop and/or a negative voltage pulse (simultaneously) supplied to the other side of the flip-flop to drive it to one particular state. Thus the representation of the inputs (as well as the previously explained representation of the outputs) is not necessarily intended to illustrate (except functionally) the manner in which these inputs are introduced into the flip-flop circuit. Since such types of input and output functions from flip-flop circuits are conventional, there is no need to specifically explain the actual structure involved in such operations. Similarly, the structure of the flip-flop circuits themselves, the various gates, and the delay means and other conventional circuit elements is deemed to be well known and therefore obvious to one skilled in the art.

Summarizing the operation of the object counter, it will normally be set so that each of the flip-flops is in its "one" state (which may be loosely referred to as "containing a one"). The object counter will then count up from this "minus 1" or 31 starting point a single unit each time a WER signal is introduced from the compare logic of FIGURE 8 over lead 1106. The setting to the original state of minus 1 (or 31) is normally accomplished by sending a RST signal over input lead 1156 as just explained. Therefore, the object counter will count from 31 to 0 (or minus 1 to 0) when the first WER signal is introduced and will then count from 0 to 1, from 1 to 2, from 2 to 3, etc., for each succeeding WER signal. Upon completion of the final counting operation (i.e., termination of the end of frame period by the generation of a cycle complete (CYC) signal by AND gate 309 in FIGURE 4 so as to cause the resetting of the end of frame flip-flop 92 in FIGURE 3 back to its zero state), the object counter will therefore contain a number equal to the number of WER pulses received less one. Since the number of WER pulses actually generated is one greater than the number of discrete particles actually present in the scanned field, the object counter will therefore contain at the end of the final counting operation a number equal to the number of discrete particles present in the scanned field. This number may then be read out to any conventional display or recording means from the final object counter prior to manually resetting this counter to minus one (or 31) in preparation for the next complete operation.

*Memory store circuit of FIGURE 9*

Figure 9B:
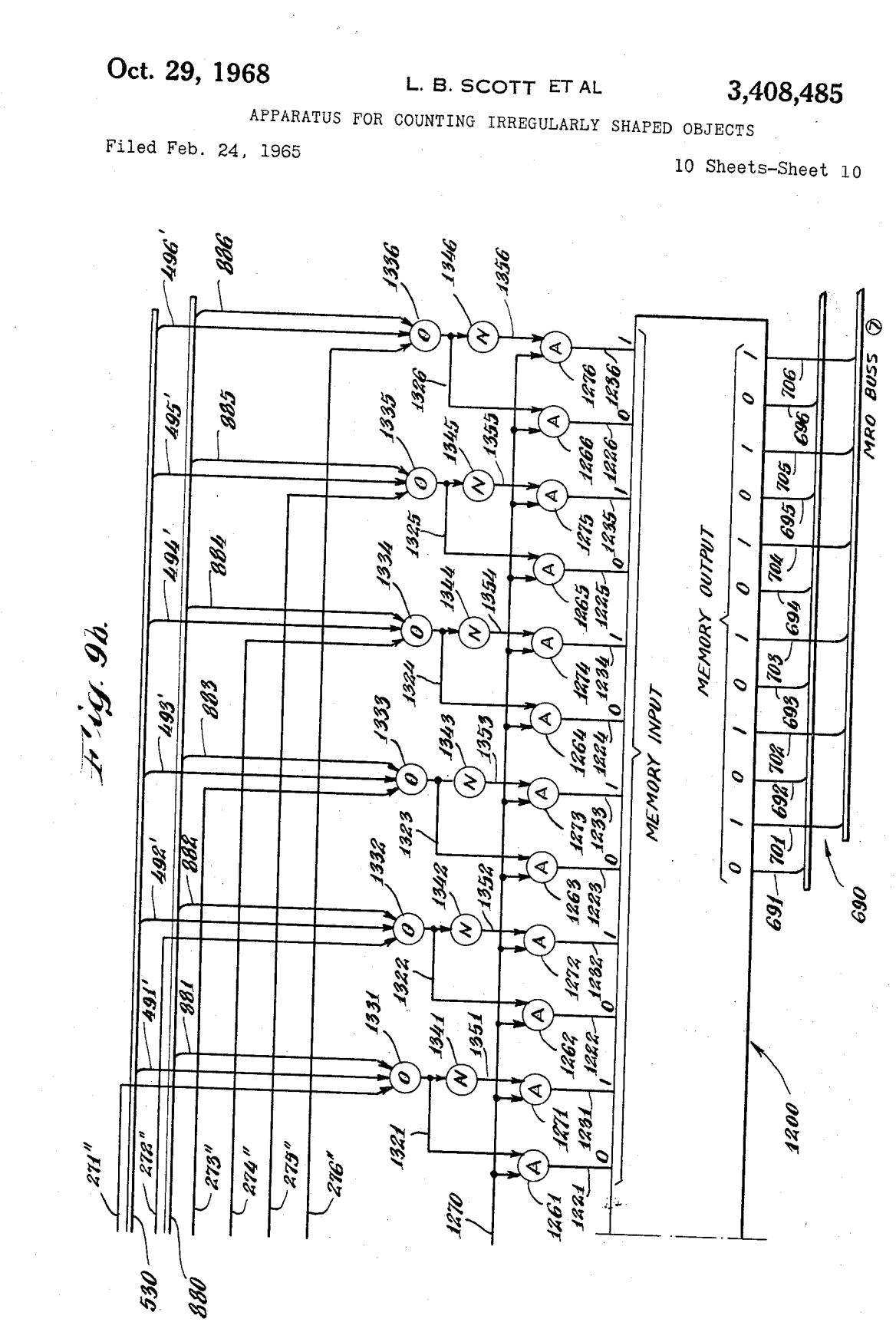

FIGURES 9a and 9b show the memory store, its various inputs, and the means for both gating its inputs and timing the various memory operations. The store itself is schematically illustrated by the long rectangular box near the bottom of the figures, designated by reference numeral 1200. This store 1200 contains, for example, 64 different locations, each of which can accommodate a six-binary-bit "word" (i.e., may accommodate a number from zero through 63 when expressed in binary data). The memory store is of the random access type, in that access to any desired one of its 64 locations may be obtained by supplying a number equal to that location address at the address input (shown at the left-hand upper part of store 1200). This random access store may be, for example, composed of square hysteresis loop magnetic cores, a suitable commercially available one being sold under the tradename, "Ministore" by Rese Engineering Company.

In particular the address input comprises six pairs of input leads. Each of these pairs represents one of the binary bits making up the six-bit binary "word," representing all the possible locations or addresses that may be utilized. For example, the first pair of address inputs 1201 and 1211 will determine whether the least significant bit in the desired memory location is a zero or a one, respectively (it should be noted that contrary to most conventional representations, the least significant figure in the binary word is always represented as at the left in all of the figures of this description except as to the upper part of the compare circuit shown in FIGURE 8). Similarly the next pair of address inputs 1202 and 1212 will supply the second least significant binary bit for the word representing the desired memory location. Input lead pairs 1203 and 1213, 1204 and 1214, and 1205 and 1215 will supply the value of the third, fourth, and fifth least singificant bits in the word representing the desired memory location; and the sixth input pairs 1206 and 1216 will supply the binary value of the most significant bit in the word giving the desired address.

At the right-hand part of the upper surface of the rectangle 1200 representing the memory store, are shown (see FIGURE 9b) the leads making up the informational or word input to the memory. These six pairs of leads will determine which of the 64 possible words (made up of the 64 different combinations of six binary bits) will be supplied to that memory location formed by the previously described addressing inputs 1201–1206 and 1211–1216. The first pair of informational inputs are 1221 and 1231, which together will supply the value of the least significant bit in the six-bit word to be stored in the memory store. Similarly the second least significant bit will be supplied by input leads 1222 and 1232; the third least significant bit by leads 1223 and 1233; the fourth least significant bit by inputs 1224 and 1234; and the fifth least significant bit (therefore the second most significant bit) by leads 1225 and 1235. Finally, the most significant bit in the word to be placed in the memory will be supplied by the last pair of input leads 1226 and 1236.

The manner in which the six pairs of address or location inputs (1201–1206 and 1211–1216) and the six pairs of informational or word inputs (1221–1226 and 1231–1236) supply the memory store with an address and the information to be placed at that address as the contents thereof is well-known. For example, if the very first memory address input 1201 carries a signal (which will automatically mean that its paired input 1211 does not carry a signal at this time) then the least significant bit in the address will be a zero. Similarly a signal at address input 1202 (and therefore none at 1212) will cause the second bit in the address to be a zero, rather than a one, also. Conversely, a signal present at address inputs 1211 or 1212 will cause the first or second least significant bit, respectively, to be a one rather than a zero. For this reason the various left-hand members of the address input pairs (namely 1201–1206) may be considered the zero bit inputs and the right-hand member of these pairs (1211–1216) may be considered the "one" bit input. Thus the absence of a signal on, say, inputs 1211–1214 and 1216 during the presence of a signal on "one" input 1215 would mean that the address desired consisted of the word having zero's in its first four least significant bits, a one in the fifth least significant bit (or the second most significant bit) and a zero in the sixth least (or most) significant bit. Obviously the address thereby given would be the thirty-second location in the memory. In a similar manner the informational or word inputs (1221–1226 and 1231–1236) will supply the necessary information to designate which of the six bit locations in the word to be stored should be a zero and which should be a one. In order to clarify the fact that each of the left-hand members of the input pairs represents a signal designating a zero for the bit location controlled, each of these members (1201–1206 and 1221–1226) in both the address and the informational inputs have associated therewith a zero (0) in the drawing. Conversely, each of the right-hand members of these pairs, which would cause the bit designated by the pair to be a one (namely, 1211–1216 and 1231–1236) has a one (1) associated therewith in the drawing.

The address "zero" inputs 1201–1206 will contain a signal whenever the output of the corresponding left-hand member of the six pairs of address input AND gates 1241–1246 exists. Thus, the zero address inputs 1201–1206 may be considered the presence of an output at the "zero" input AND gates 1241–1246. Similarly the "one" address inputs 1211–1216 are the outputs of the "one" address input AND gates 1251–1256. As will be more apparent hereinafter, one of each of the adjacent pairs of address input AND gates (i.e., 1241 and 1251; 1242 and 1252; 1243 and 1253; etc.) will necessarily have an output and the other of that pair will have no output any time an addressing operation is performed. In an analogous manner, the informational inputs (1221–1226 and 1231–1236) represent the outputs of six pairs of informational input AND gates. More specifically, each of the "zero" inputs 1221–1226 are the outputs of the corresponding left-hand member of the six pairs of informational input AND gates, namely, 1261–1266. Similarly, each of the "one" informational inputs forms the output of the right-hand or "one" member of the six pairs of informational input AND gates, these being designated 1271–1276. Thus, which of the two members of the first pair 1241, 1251, of address input AND gates contains an output will determine whether the least significant bit in the address is a zero or a one, respectively. Similarly if the left-hand or "zero" AND gate 1242 of the next pair contains a signal, the second least significant bit in the address will be a zero, while if the right-hand or "one" gate 1252 of this pair contains an output, then the second least significant bit in the address will be given as a one. Similarly the remaining pairs of address input AND gates (1243 and 1253, 1244 and 1254, 1245 and 1255, and 1246 and 1256) will determine whether each of the next more significant bits in the address given is a zero or a one, respectively. In a like manner, the pairs of informational input AND gates (1261 and 1271; 1262 and 1272; 1263 and 1273; etc.) will determine whether each of the six bits making up the word to be stored in the memory contains a zero or a one, respectively.

Each of the address input AND gates (1241–1246 and 1251–1256) and each of the informational input AND gates (1261–1266 and 1271–1276) have two inputs. The right-hand input to each of these AND gates may be considered as the contents input and the left-hand input may be considered the timing or gating input. The right-hand or contents input to each of the "zero" address AND gates (1241–1246) is designated 1281–1286, respectively, and represents the output of a series of OR gates 1291–1296. Therefore each of the zero contents inputs 1281–1286 will contain a signal if the corresponding OR gate (1291–1296) has a (positive) signal at its output. The output of each of OR gates 1291–1296 is also supplied in the input side of an inverter gate 1301–1306, respectively. The output (1311–1316, respectively) of these various inverter gates form the contents or right-hand input to each of the "one" address input AND gates 1251–1256. Because of these last-mentioned connections (1281–1286 and 1311–1316), the presence of an output at any particular one of OR gates 1291–1296 will cause a contents input (at 1281–1286) to the "zero" address input AND gate (1241–1246); and the absence of an output at these OR gates 1291–1296 will cause the presence of an output at the other side of the corresponding inverter gate (1301–1306) so as to supply a contents input at 1311–1316 to the "one" address input AND gate (1251–1256). Thus the presence of a signal at the output of OR gate 1291 will cause a signal to be present at input 1281 to the zero AND gate 1241, and no signal to be present at input 1311 to the "one" input AND gate 1251. Similarly the presence or absence of outputs at each of the remaining address OR gates 1292–1296 will cause a signal at the contents input to either the corresponding zero gate (1242–1246) or the corresponding "one" input AND gate 1252–1256.

In a manner exactly analogous to the address input network, the information input AND gates 1261–1266 and 1271–1276 are supplied with a signal at their contents or right-hand input, depending on the presence or absence of a signal from an OR gate associated with each pair of AND gates. Thus, the "zero" informational input AND gates 1261–1266 are supplied at their contents input directly from the outputs of OR gates 1331–1336 over leads 1321–1326. The right-hand or contents input to the "one" informational input AND gate 1271 is supplied from the output 1351–1356 of inverter gates 1341–1346, the inputs to which inverter gates being the outputs of OR gates 1331–1336, respectively. Therefore the presence of an output at each of the OR gates 1331–1336 will cause a signal to be present at the contents input to each of the "zero" informational AND gates 1261–1266, at 1321–1326, respectively; and the absence of a signal at the output of any OR gate (1331–1336) will cause the presence of a signal at the output of the corresponding inverter gate (1341–1346) so as to present a signal at the contents input 1351–1356 of the "one" informational AND gate (1271–1276).

Returning to the address input AND gates (1241–1246 and 1251–1256), the left-hand, timing or gating inputs are supplied from a common lead 1240 to all of the gating inputs to both members of the six pairs of AND gates. For this reason the presence of a signal over lead 1240 will cause an output at those of the address input AND gates which are at the same time receiving a signal at their right-hand or contents input. Therefore, the presence of a signal over lead 1240 will cause one (and only one) of the members of the six pairs of AND gates to have an output. Lead 1240 will contain a signal whenever there is present the B timing signal at input 1250. This input 1250 is a direct connection from the output of OR gate 108 of the memory timer circuit 170 of FIGURE 3. Thus there will be a signal present at 1250 and therefore over lead 1240 to the gating inputs of each of the address input AND gates (1241–1246 and 1251–1256) whenever there is a B timing signal actually present at the output of the memory timing circuit of FIGURE 3. Input 1250 is also connected by branch lead 1260 as an operational input to the memory, which input is labelled as the START (READ) operation. The significance of this operational input will be explained after the rest of the structure of FIGURE 9 has been described.

The left-hand, timing or gating inputs to each of the information input AND gates 1261–1266 and 1271–1276 is supplied by a common lead 1270, which carries a BC' timing pulse whenever this signal is present at the output of AND gate 131 of the memory timing circuit 170 of FIGURE 3. Therefore the presence of this BC' timing signal will cause one (i.e., 1261 or 1271; 1262 or 1272; 1263 or 1273; etc.) of the six pairs of AND gates to have a positive output (i.e., either 1221 or 1231; 1222 or 1232; etc.). Thus the presence of a BC' timing signal over input lead 1270 will cause a gating of the various informational input AND gates so as to indicate at their outputs the condition of the outputs of informational OR gates 1331–1336, just as the presence of a B timing signal at input 1250 will cause a similar gating of the address input AND gates over lead 1240 so as to transfer to their outputs an indication of the various address OR gates 1291–1296.

The first four (i.e., four least significant) OR gates 1291-1294 have inputs from both the write counter (WTC BUSS 360 and the read counter (RDC) BUSS 369, while the two most significant address OR gates 1295 and 1296 do not. In particular, the first (least significant) address OR gate 1291 has, as one of its inputs, lead 361 from WTC BUSS 360, which will contain a signal whenever the least significant AND gate 341 at the output of the write counter (see FIGURE 5) contains a signal. Specifically, output AND gate 341 of the write counter will contain a signal if the least significant flip-flop 311 is in its zero state (so that there is an output at 331) and at the same time a write-in-train-memory signal (WTM) has been supplied to the other input to AND gate 341 from the input and control circuit of FIGURE 3. Therefore when a write-in-train-memory operation has been ordered by the input and control logic of FIGURE 3, the address OR gate 1291 will receive an indication of whether the least significant flip-flop of the write counter is in its "zero" state or not (i.e., is therefore in its "one" state). If this least significant flip-flop 311 is in its "zero" state, the concurrence of a WTM signal and of a B timing signal (in FIGURE 9) will cause the first or least significant "zero" address input AND gate 1241 to have an output at 1201. Conversely, if the least significant flip-flop 311 in the write counter of FIGURE 5 is in its "one" state, the presence of a WTM signal and the B timing signal will cause actuation of the first (least significant) "one" address input AND gate 1251, so as to cause an output at 1211. In a similar manner the leads 362, 363 and 364 will carry information as to the state of the second least, third least and fourth least significant flip-flops in the write register, so as to cause the appropriate one of the next three pairs of address input AND gates (1242-1244 and 1252-1254 to have an output when a WTM signal and a B timing signal are present concurrently. In an analogous manner the RDC BUSS 369 will carry by means of its individual leads 365-368 the corresponding information as to the condition of the four flip-flops (315-318) in the read counter of FIGURE 5 whenever a read-from-train-memory signal (RTM) is present and the B timing pulse occurs.

Thus the presence of a WTM signal will cause the presenting of the contents of the write counter to the addressing input of the memory during the time interval that the B timing pulse exists, and the presence of the RTM signal will cause the presentation of the contents of the read counter as an address to the memory store during the time interval that the B signal exists. In this manner the WTM signal is utilized to give the address at which a train number will be stored in the train number memory part of memory store 1200, and the RTM signal is utilized to read out from a specifically given address (equal to the contents of the read register) a train number previously stored in this same train number memory part of the store. As will be recalled, the train number memory part of store 1200 comprises the first sixteen locations of this store, so that the writing in the train number memory (controlled as to location by WTC BUSS) and the reading from the train number memory (the location at which this reading is to be done being controlled by RBC BUSS) necessarily involves a location or address which can be expressed as a four-bit binary word. For this reason only the four least significant pairs of address input AND gates and their associated OR gates need be actuated in order to determine which of these sixteen locations is desired. For this reason the two most significant OR gates 1295 and 1296 (and their associated two pairs of address input AND gates) need not be utilized for an operation involving the write and read counters respectively. However, because of the peculiar manner in which the information giving the contents of the flip-flops is carried (as a positive signal if the flip-flops are in the "zero" stage and the absence of a signal or a negative signal if the flip-flops are in the "one" stage), the two most significant OR gates 1295 and 1296 (since they would have no input) would cause actuation of the "one" address input AND gates 1255 and 1256 respectively if no input is supplied to them during the writing and reading train number memory operations. For this reason the WTM signal and the RTM signal are introduced at inputs 1280 and 1290 respectively so as to cause a signal over lead 1300 when either of these inputs contain a signal. For this reason the inputs 1310 and 1320 to OR gates 1295 and 1296 respectively will be actuated whenever a write-in-train-memory or read-from-train-memory operation is occurring, so that these two most significant OR gates will have outputs, thereby actuating the two most significant "zero" address input AND gates 1245 and 1246 during any train memory writing or reading operation.

The next inputs to each of the addressing OR gates 1291-1296 are the individual leads 861-866, respectively, comprising the read register number 3 (RDR BUSS No. 3) at 360. As may be recalled from FIGURE 7, this read register BUSS No. 3 will contain on each of its individual leads a signal representative of the contents of the read register whenever a change read register signal (CHR) is supplied at input 850 in FIGURE 7 from the compare logic circuit of FIGURE 8. The appearance of such a CHR signal will actuate each of the AND gates 811-816 so as to cause a signal on each of leads 861-866 if the corresponding flip-flop in the read register is in its zero state. In this manner the contents of the read register will be introduced to the addressing input AND gates 1241-1246 and 1251-1256 so as to supply to the memory address inputs the contents of the read register. In this manner the location in the memory store corresponding to the contents of the read register will be made available for storage in such location the contents of the write register whenever the type of junction previously described between unlike numbered particles has occurred.

Another input to each of the addressing OR gates 1291-1296 in FIGURE 9 comprises the individual leads 481'-486' which constitute the write register (WTR) BUSS No. 2 at 490. As may be seen from FIGURE 6, write register BUSS No. 2 will carry on its individual leads an indication of the contents of the write register whenever a change write register signal (CHW) is supplied at input 509 from the compare circuit of FIGURE 8. At such times the contents of the write register (as represented by the presence of a signal on those leads 481'-486' which correspond to a flip-flop in the "zero" condition) will be introduced to the addressing AND gates 1241-1246 and 1251-1256 so as to supply to the memory address input an indication of the value in the write register. The memory address or location thus given will then be utilized to store a number or word equal to the contents of the read register for the type of junction between unlike numbered trains previously described.

The final or left-hand input to each of OR gates 1291-1296 in FIGURE 9 is supplied from the initiate number counter (INC) BUSS No. 2 at 280. More specifically, as may be seen from a comparison of FIGURE 9 and FIGURE 4, the inputs to addressing OR gates 1291-1296 comprise the individual leads 271'-276', which will indicate the state of the flip-flops making up the initiate number counter during the end of frame period. In particular, as may be recalled from the description of FIGURE 4, the presence of the end of frame signal (ENF) at input 259 will cause each of the AND gates 271-276 to have an output representing the contents of the initiate number counter during the entire end of frame interval. Because of these last inputs to the addressing OR gates 1291-1296 in FIGURE 9, the contents of the initiate number counter will be available to be used to address the memory store whenever timing pulse B is present. As mentioned previously the contents of the initiate number counter (which will be sequentially stepped down from its highest value at the end of the scanning operation) will be utilized to address the memory first at its highest value utilized and then at each next lower number so as to make available to the compare circuit the contents at each of these locations for the purpose of determining whether a junction between unlike numbered trains occurred (one of which bore the number equal to that particular location). As will be recalled if any location in the object data memory contains a contents unequal to the address of that location, this will signify that a junction occurred involving two unlike numbered trains (one having the address number and one having the contents number) and will be utilized to cause the final object counter of FIGURE 10 to recognize that this particular train number was utilized to mark merely a branch of a particle, and not a distinctly different particle, so as to avoid its being counted as a separate particle in the field.

Now considering that the various informational OR gates 1331-1336 in FIGURE 9, it will be noted that each of these OR gates has only three inputs. The left-hand one of these three inputs comprises a branch lead from each of the initiate number counter BUSS No. 2 leads 271'-276', these individual branch leads being referenced 271''-276''. From these connections it is obvious that during the end of frame period, the contents of the initiate number counter will be available to the inputs of the various informational input AND gates 1261-1266 and 1271-1276. In this manner the contents of the initiate number counter may be stored at that location equal to the same contents of the initiate number counter, thereby causing the word or information at that location to be made equal to the address of the location. As has been previously described this operation is utilized after the previously stored information at the given location has been removed and compared to determine whether or not it was matching (i.e., information equaled address), so as to subsequently reset the location with a word equal to the address of that location. Thus, the information in the object data memory at each address given by the initiate number counter (as it is repetitively stepped down from its highest utilized value) is compared to determine whether or not the word located at each of the addresses is equal to the address (and counted as a particle if so, and not counter as a particle if not); then that location is supplied with a number equal to the address, so that after the entire end of frame final counting operation is accomplished the object data memory will again have matching words in each of its addresses, thereby perparing it for the next scanning operation.

The middle inputs to the various information OR gates 1331-1336 are supplied by the individual leads 491'-496' making up write register (WTR) BUSS No. 3 at 530. Returning to FIGURE 6, it will be seen that whenever either a change read register signal (CHR) is present at input 528 or a write in train memory signal (WTM) is present at input 529, the contents of the write register will be supplied to the individual leads comprising the write register BUSS No. 3 (530). In this manner during the change read register or write in train number memory signals, the contents of the write register will be made available to the inputs of the informational input AND gates 1261-1266 and 1271-1276 in FIGURE 9. This will allow the contents of the write register to be stored at the address given by the read register (during a CHR signal) when a junction of a particular type has occurred, and to be stored whenever a write in train number memory signal (WTM) occurs during the scanning operation.

The third and last input to the informational OR gates 1331-1336 No. 4, 880. As may be seen from FIGURE 7, the condition or state of each of the individual flip-flops of the read register will be given by the various leads 881-886 making up the read register BUSS No. 4 whenever a change write register (CHW) signal is supplied at input 870 from the compare logic circuit of FIGURE 8. Thus the occurrence of a change write register signal will make available to the inputs of the informational input AND gates 1261-1266 and 1271-1276 of FIGURE 9 the contents of the read register (so this contents may be stored at the address given by the contents of the write register, as previously explained).

The output of the memory store 1200 of FIGURE 9 comprises a simple series of leads 691-696 and 701-706, shown at the lower right-hand corner of FIGURE 9 (i.e., the lower part of FIG. 9b). These output leads form the memory output (MRO) BUSS 690 shown at the lower right-hand corner of FIGURE 9 and in FIGURE 7. Output leads 691-696 will contain a signal whenever the word read out from the memory store contains a "zero" as the value of the first, second, third, fourth, fifth, sixth bit, respectively; and leads 701-706 will contain a signal if the corresponding one of the six bits is instead a "one."

Thus output leads 691 and 701 form a pair giving the value of the least significant bit of the binary word, and each of the successive pairs gives the next more significant bit in value. For example, if the number 17 were stored in a particular location in the memory store, then when that location is addressed, the memory output will have a signal on leads 701 and 705 (representing the presence of the one and 16-unit binary bits, respectively) but will have signals on output leads 692, 693, 694 and 696, since the two, four, eight and thirty-two unit binary bits are "zero" or absent. This information will then be carried over the memory output (MRO) BUSS 690 (made up of the individual leads 691–696 and 701–706) to the read register of FIGURE 7, which will accept this information into its flip-flops when there is a concurrence of both a in-strobe signal (STB) and the C timing signal at the inputs to its input control AND gate 720 as has been previously described.

In order to understand how the information is fed into the memory store 1200 and extracted therefrom, a short review of the memory timer 170 of FIGURE 3 and in particular the timing signals themselves as shown in FIGURE 3a is useful. In FIGURE 3, it should be noted that four different timing signals are supplied at the outputs of the timing circuit 170. Explicitly these timing signals are designated: AB', B, BC', and C. As is most clearly seen in FIGURE 3a, all four of these timing signals will be generated within a twenty-four microsecond time interval, each of the timing signals having a duration and relative time sequence as shown in the lower part of FIGURE 3a. More explicitly, the timing pulse C will start at the beginning of the twenty-four microsecond interval and will continue for ten microseconds, while timing signal B will start at this same beginning of the cycle but will last for thirteen microseconds. The derived timing signal AB' (where A is a timing pulse equal to the whole twenty-four microseconds) will therefore exist during that part of the twenty-four microsecond interval in which the B timing pulse does not; and therefore will start thirteen microseconds after the beginning of the timing interval, and will last eleven microseconds to the end thereof. Finally the derived timing pulse BC', which means that it is that part of the timing pulse interval B which does not include timing pulse C, will start ten microseconds after the beginning of the entire interval and will last for only three microseconds so as to cease when timing pulse B ends. Concerning the four timing pulses shown in the lower part of FIGURE 3a, it may be said that timing pulse C is the first to occur (along with beginning of B) followed in time by derived pulse BC', which in turn is followed by derived pulse AB'; and timing pulse B will include both timing pulse C and of course timing pulse BC'.

As may be seen in FIGURE 9, one of the two early timing pulses (namely, B) is introduced at input 1250 so as to time the operation of the addressing input AND gates 1241–1246 and 1251–1256; and is simultaneously presented over branch lead 1260 to an operational control input reference 1360 and labeled START (READ). This START input will cause the memory store 1200 to be put into receptive condition so that the addressing inputs 1201–1206 and 1211–1216 will not only receive a word representing the address or location, but the store 1200 will utilize this input to make available that location. During the time that timing pulse B is present at input 1250, timing pulse C will be supplied to input 1370 (except for the last three microsecond part of the timing pulse B). This timing pulse C will be carried from input 1370 by lead 1372 to the UNLOAD input 1380 of the memory store. Also any input present at 1370 will be presented over input lead 1374 to inverter gate 1376 so as to cause at the output 1378 thereof a signal whenever there is no pulse present at input 1370. Output 1378 of inverter 1376 forms the operational input LOAD 1379 to the memory store 1200. The final operational input to the store 1200 is shown in the lower left-hand corner at 1382, and is labeled STORE (WRITE). This STORE operational input will be activated by the presence of an AB' timing signal at input 1384.

The timing of the various operations of the memory store and of associated circuits is accomplished in the following manner. The beginning of timing pulse B at input 1250 will cause the information supplied to addressing OR gates 1291–1296 (by whichever of the busses is then carrying information) to be gated through the addressing input AND gates 1241–1246 and 1251–1256 so as to be available at the addressing inputs of the memory store itself. At the same time the timing pulse B will be introduced at the START (READ) operational input 1360 so as to cause the memory to accept the address being supplied at its addressing input so as to find that location. Simultaneously with the beginning of the timing pulse B, timing pulse C will be introduced at input 1370 so as to actuate the operational input UNLOAD at 1380. During the first ten microseconds when both timing pulses B and C are thus being supplied, the stored informational word found at the address given by the inputs at 1201–1206 and 1211–1216 will be made available at the memory input leads 691–696 and 701–706. The operational input UNLOAD may be considered as a switching operation allowing the stored word at the location given by the memory address inputs to be transferred to the memory output. At the end of the ten microsecond duration of timing pulse C, its disappearance will cause a signal to be generated at the output 1378 of the inverter gate 1376 so as to actuate the operational input LOAD at 1379. This operation may be considered as equivalent to opening the switch between the memory proper and its output, and at the same time closing the switch between the informational memory input and the particular location determined by the input at the memory address. As may be seen from the read register circuit of FIGURE 7, the memory output as carried by the memory output buss will be stored in the flip-flops 681–686 forming the read register during the C timing interval. In other words, by the time that the memory output is disconnected from the particular location which is being addressed (i.e., with the cessation of the C timing pulse) the information contained at that location will have already been transferred from the memory output by the MRO buss into the read register. Thus the reading out of the information contained at the location given by the memory address is accomplished during the C timing pulse, and any reloading (i.e., writing in) that location will be accomplished subsequently, after the C pulse has ceased.

As soon as the C pulse ceases, the BC' timing pulse will start (see FIGURE 3a). The appearance of this BC' pulse at input 1270 in FIGURE 9 will then cause the informational input AND gates 1261–1266 and 1271–1276 to allow transfer from OR gates 1331–1336 to the memory input leads 1221–1226 and 1231–1236 of the information being supplied by whichever of the three uppermost busses in FIGURE 9 is active. The particular commercially available memory store utilized has provisions for temporarily storing or holding information presented at its input so as to allow subsequent transfer into the particular location of the memory store proper upon subsequent command. This operational instruction to store the information just previously supplied to the informational input is given by the appearance of timing pulse AB' at input 1384 so as to cause a STORE input at 1382. Therefore during the last eleven microseconds of the twenty-four microsecond memory timing cycle, the information supplied at the memory input will be stored in that location given by the memory addressing inputs.

Summarizing briefly the timing of the memory circuit of FIGURE 9, we see that the address of the location desired is first supplied (at the beginning of timing interval B) and the contents of that particular location is made available at the memory output (and is usually transferred into the read register). At the end of timing pulse C the memory output is isolated from the rest of the memory and the informational input is made available to the memory input leads and temporarily stored at the memory input. Finally, after this BC′ signal ceases, the start of the AB′ signal will cause the information at the memory input to be stored (i.e., written) in the location still being addressed. It should be noted that the particular random access store chosen to be used in the illustrated embodiment of the invention has the ability to maintain the previously chosen address location, even after the memory address inputs have ceased. In this manner even after the address input AND gates 1241–1246 and 1251–1256 no longer contain outputs upon the cessation of timing pulse B, nevertheless the location requested by that address will remain available for supplying thereto the word contained or soon to be contained at the informational memory input.

We claim:

1. An improved apparatus for determining the number of discrete objects in a field of the type including: means for scanning said field in a repetitive scan pattern so that consecutive slices of said field are scanned; means for determining the presence and extent of all separate objects parts found in each scan line so as to determine the object content thereof; means for comparing the object content of a given scan line being processed with the object content of that previously scanned line which was of the geometrically adjacent slice of the object field; means for generating a discontinuity indication for each of the various object parts in said given line which are found not to be aligned with and therefore physically continuous with any object part in said previously scanned line; and means for counting those of said object parts in said given scan line for which said discontinuity indication exists, thereby producing a tentative count of all object parts which are apparently discrete objects; the improvement comprising:

means for assigning to each newly found object part in each given line an identifying trans number;
means for temporarily storing said train number;
means for retrieving said already assigned train number from storage during that time of the next succeeding scanning line when said object part is present in the now just previous scanning line;
means for comparing said retrieved already assigned train number with the train number newly assigned to any existing new concurrently occurring object part in the now being scanned line;
means for causing a junction signal to be provided whenever said compared already assigned train number and said newly assigned train number differ in quantity;
and means for correcting said tentative object count by reducing it by the number of junction count signals;
so that after completion of scanning, of tentative counting, of junction determining and of correcting, a correct final count of all discrete objects in said field, regardless of their shape, is provided.

2. Apparatus according to claim 1, in which:

a junction signal storage means is provided to store said junction signals;
and said means for temporarily storing said train numbers and said junction signal storage means comprise parts of the same memory store,
whereby only one memory store is required for these two storings.

3. Apparatus according to claim 1, in which:

a junction signal storage means having locations corresponding to numbers used as train numbers is provided for storing said junction signals;
said junction signal storage means being initially set with all of its various locations having contents matching the address of each said location;
said means for causing a junction signal being connected to said junction signal storage means in such manner as to store therein at the address given by one differing train number the other differing train number,
whereby each junction signal causes the originally matching contents at one location in said junction signal storage means to be changed to a mismatching contents,
thereby giving an indication of not only how many but also which train numbers were determined to be assigned to object parts later determined to join, and therefore be continuous with, other object parts.

4. Apparatus according to claim 3, in which:

a matching comparison means is provided to compare, after the object field has been completely scanned, the address and contents of said junction storage means for each location corresponding to a train number used during the scanning operation;
said matching comparison means thereby providing an indication of each occurrence of said address and contents being mismatched, so that a mismatch signal is produced for each junction signal originally caused by joining of differing train numbers,
whereby an indication of how many junction signals occurred is obtained, which may be utilized to reduce said tentative count of object parts by the number of such junction signals.

5. Apparatus according to claim 4, in which:

said means for comparing said retrieved already assigned train number with said newly assigned train number during the scanning operation, and said matching comparison means, which is utilized subsequent to the completion of said scanning operation, both comprise substantially the same structure,
whereby a substantial saving in apparatus components is effected.

References Cited

UNITED STATES PATENTS

| | | | |
|---|---|---|---|
| 2,948,470 | 8/1960 | Berkley | 235—92 |
| 2,958,464 | 11/1960 | Nassenstein | 235—92 |
| 3,088,036 | 4/1963 | Hobbs | 250—217 |

MAYNARD R. WILBUR, *Primary Examiner.*

G. J. MAIER, *Assistant Examiner.*